United States Patent
Shimoji et al.

(10) Patent No.: US 6,353,930 B1
(45) Date of Patent: Mar. 5, 2002

(54) DIGITAL BROADCASTING SYSTEM, DIGITAL BROADCASTING APPARATUS, AND RECEIVER APPARATUS FOR DIGITAL BROADCASTERS

(75) Inventors: Tatsuya Shimoji; Shinji Inoue, both of Neyagawa; Yuki Kusumi, Kashiba; Masahiro Oashi; Kazuo Okamura, both of Hirataka; Takashi Kakiuchi, Toyonaka; Junichi Hirai, Suita; Yoshiyuki Miyabe, Osaka; Ikuo Minakata, Souraku-gun; Masayuki Kozuka, Neyagawa; Yoshihiro Mimura, Hirakata; Yoshinori Matsui, Katano; Naoya Takao, Kadoma, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/907,405

(22) Filed: Aug. 7, 1997

(30) Foreign Application Priority Data

Aug. 7, 1996 (JP) .............................................. 8-208144
Feb. 28, 1997 (JP) .............................................. 9-062216

(51) Int. Cl.[7] .......................... H04N 7/173; H04N 7/16
(52) U.S. Cl. ...................... 725/110; 725/109; 725/112; 725/139
(58) Field of Search .............................. 348/10, 12, 13, 348/906, 461, 465, 468; 345/327; 709/217, 218, 219; 725/109, 110, 112, 113, 135, 138, 139, 142

(56) References Cited

U.S. PATENT DOCUMENTS 5,327,554 A    7/1994  Palazzi, III et al.
5,477,263 A *  12/1995 O'Callaghan et al. .......... 348/7
5,539,479 A *  7/1996  Bertram ....................... 348/564
5,539,822 A    7/1996  Lett
5,541,662 A    7/1996  Adams et al. ............... 348/460
5,594,492 A *  1/1997  O'Callaghan et al. ......... 348/10
5,671,226 A *  9/1997  Murakami et al. ........... 370/474
5,818,441 A *  10/1998 Throckmorton et al. .... 345/328
5,903,816 A *  5/1999  Broadwin et al. ........... 455/3.1
5,940,738 A *  8/1999  Rao ........................... 455/4.2
5,973,681 A *  10/1999 Tanigawa et al. ........... 345/327

FOREIGN PATENT DOCUMENTS

| EP | 680216 | 11/1995 |
|----|--------|---------|
| EP | 690400 | 1/1996 |
| WO | 9413107 | 6/1994 |
| WO | 9501060 | 1/1995 |

OTHER PUBLICATIONS

Hiroshi Seno, Kenjiro Kai, Tadashi Isobe, "Basic Functions of Multimedia Information Broadcasting Service", The Journal of The Institute of Television Engineers of Japan, Mar. 20, 1995, vol. 49, No. 3, pp. 336–343, with translation.

(List continued on next page.)

*Primary Examiner*—Andrew Faile
*Assistant Examiner*—Kieu-Oanh Bui
(74) *Attorney, Agent, or Firm*—Price and Gess

(57) ABSTRACT

A data transmission apparatus has a multiplexing unit that cyclically multiplexes presentation information and navigation information stored in a transmission data storage unit according to control by a multiplexing control unit and a transmission unit that transmits the multiplexed stream. The reception control unit of a data reception apparatus sets filter conditions in a filter condition storage unit of a TS decoder unit in accordance with user operation indications. The presentation information and navigation information separated by the TS decoder unit are outputted via a reproduction unit to a display unit and an audio output unit.

26 Claims, 47 Drawing Sheets

OTHER PUBLICATIONS

Kenjiro Kai, Hiroshi Seno, Tadashi Isobe, "Navigation Methods in Multimedia Information Broadcasting Services", Information Processing Society of Japan Research Report, Sep. 14, 1995, vol. 95, No. 90, pp. 9–16, with translation.

Tadashi Isobe, "Multimedia Services Through Broadcasting", Proceedings of the 1994 IEICE Fall Conference, September 1994, SB–9–8, pp. 633–364.

* cited by examiner still5.m2v 201

WEATHER FORECAST

TOMORROW THE WHOLE OF JAPAN SHOULD ENJOY FINE WEATHER.

still1.m2v 202

TOKYO'S WEATHER

TOMORROW WILL BE SUNNY WITH CLOUDY SPELLS. THERE IS A 10% PROBABILITY OF RAIN.

FIG. 8

501 CONSTRUCTION INFORMATION TABLE

| CONTENT NUMBER | IMAGE DATA | NAVIGATION INFORMATION |
|---|---|---|
| 0 | still0.m2v | navi0.nif |
| 1 | still1.m2v | navi1.nif |
| 2 | still2.m2v | navi2.nif |
| ⋮ | ⋮ | ⋮ |
| 5 | still5.m2v | navi5.nif |
| ⋮ | ⋮ | ⋮ |

ENTRY INFORMATION 502

| ENTRY CONTENT NUMBER | 5 |
|---|---|

FIG. 10

701 CONTENT IDENTIFIER ASSIGNING TABLE

| CONTENT NUMBER | orig_nw_id | ts_id | VE_svc_id | VE_event_id | VE_id | AE_svc_id | AE_event_id | AE_id | NE_svc_id | NE_event_id | NE_id |
|---|---|---|---|---|---|---|---|---|---|---|---|
| 0 | 0x0001 | 0x0001 | 0x0001 | 0x0001 | 0x0000 | — | — | — | 0x0001 | 0x0001 | 0x0000 |
| 1 | 0x0001 | 0x0001 | 0x0001 | 0x0001 | 0x0001 | — | — | — | 0x0001 | 0x0001 | 0x0001 |
| 2 | 0x0001 | 0x0001 | 0x0001 | 0x0001 | 0x0002 | — | — | — | 0x0001 | 0x0001 | 0x0002 |
| .. | .. | .. | .. | .. | .. | .. | .. | .. | .. | .. | .. |
| 5 | 0x0001 | 0x0001 | 0x0001 | 0x0001 | 0x0005 | — | — | — | 0x0001 | 0x0001 | 0x0005 |
| .. | .. | .. | .. | .. | .. | .. | .. | .. | .. | .. | .. |

801 DISPLAY IMAGE INFORMATION IDENTIFIER ASSIGNING TABLE

| VE_id | component_tag | PID | stream_id | IMAGE DATA FILE |
|---|---|---|---|---|
| 0x0000 | 0x00 | 0x0084 | 0xe0 | still0.m2v |
| 0x0001 | 0x00 | 0x0084 | 0xe1 | still1.m2v |
| 0x0002 | 0x00 | 0x0084 | 0xe2 | still2.m2v |
| ⋮ | ⋮ | ⋮ | ⋮ | ⋮ |
| 0x0005 | 0x00 | 0x0084 | 0xe5 | still5.m2v |
| ⋮ | ⋮ | ⋮ | ⋮ | ⋮ |
| 0x000f | 0x00 | 0x0084 | 0xef | still15.m2v |
| 0x0010 | 0x00 | 0x0084 | 0xe0 | still16.m2v |
| ⋮ | ⋮ | ⋮ | ⋮ | ⋮ |

FIG. 13

NVT(5)

Object Definition Table: 1001 / 1002

| Index | type   | X   | Y   | Handler | NormalBitmap | FocusedBitmap |
|-------|--------|-----|-----|---------|--------------|---------------|
| 0     | Button | 400 | 300 | 2       | 6            | 7             |
| 1     | Button | 400 | 400 | 3       | 8            | 9             |

Handler Definition Table: 1003

| Index | Script                 |
|-------|------------------------|
| 2     | goto_content (index 4) |
| 3     | goto_content (index 5) |

Hyperlink Table: 1004

| Index | orig_nw_id | ts_id | VE_service_id | VE_event_id | VE_id  | AE_service_id | AE_event_id | AE_id | NE_service_id | NE_event_id | NE_id  |
|-------|------------|-------|---------------|-------------|--------|---------------|-------------|-------|---------------|-------------|--------|
| 4     | —          | —     | —             | —           | 0x0001 | —             | —           | —     | —             | —           | 0x0001 |
| 5     | —          | —     | —             | —           | 0x0002 | —             | —           | —     | —             | —           | 0x0002 |

Bitmap Table: 1005

| Index | Bitmap Data |
|-------|-------------|
| 6     | TOKYO       |
| 7     | TOKYO       |
| 8     | OSAKA       |
| 9     | OSAKA       |

FIG. 14

NVT(1)                      1101

Object Definition Table :

| Index | type | X | Y | Handler | Normal Bitmap | Focused Bitmap |
|---|---|---|---|---|---|---|
| 0 | Button | 400 | 300 | 3 | — | 7 |

Handler Definition Table :

| Index | Script |
|---|---|
| 3 | goto_entry |

Bitmap Table :

| Index | Bitmap Data |
|---|---|
| 7 | RETURN |

FIG. 15A

VET(5) /1201

| first_pts | 112500 |
|---|---|
| last_pts | 112500 |
| stream_id | 0xe5 |
| component_tag | 0x00 |

FIG. 15B

VET(1) /1202

| first_pts | 45000 |
|---|---|
| last_pts | 45000 |
| stream_id | 0xe1 |
| component_tag | 0x00 |

FIG. 15C

VET(15) /1203

| first_pts | 360000 |
|---|---|
| last_pts | 360000 |
| stream_id | 0xef |
| component_tag | 0x00 |

FIG. 18A

Network Information Table 1301 table_id=0x40
:
network_id=0x0001
:

| original_network_id | transport_stream_id | descriptor |
|---|---|---|
| ... | ... | ... |
| 0x0001 | 0x0001 | TRANSFER PREFACE |
| ... | ... | ... |

FIG. 18B

Service Description Table 1302 table_id=0x42
:
transport_stream_id=0x0001
:

| service_id | descriptor |
|---|---|
| ... | ... |
| 0x0001 | SERVICE NAME AND OTHER INFORMATION |
| ... | ... |

FIG. 18C

Event Information Table 1303 table_id=0x4c
:
service_id=0x0001
:

| event_id | descriptor |
|---|---|
| ... | ... |
| 0x0001 | EVENT NAME AND OTHER INFORMATION |
| ... | ... |

FIG. 19

Program Association Table  1401

| table_id=0x00 | |
| --- | --- |
| ⋮ | |
| transport_stream_id=0x0001 | |
| ⋮ | |
| program_no | PMT_pid |
| ⋮ | ⋮ |
| 0x0001 | 0x0080 |
| ⋮ | ⋮ |

FIG. 20

Program Map Table  1501 table_id=0x02
⋮
program_number=0x0001
⋮
PCR_PID=0x0081
⋮
Entry_Descriptor
⋮
　　　　1502

| PID | stream_type | descriptor |
| --- | --- | --- |
| 0x0082 | 0x05 | NE_Component_Descriptor |
| 0x0083 | 0x05 | VE_Information_Component_Descriptor |
| 0x0084 | 0x02 | stream_identifier_descriptor |

Entry_Descriptor

NE_Component_Descriptor

VE_Information_Component_Descriptor stream_identifier_descriptor

FIG. 26A

| FILTER IDENTIFICATION NUMBER | START/STOP | PID | stream_id | table_id_extension | OUTPUT DESTINATION |
|---|---|---|---|---|---|
| 0 | STOP | — | — | | AV DECODER UNIT |
| 1 | STOP | — | — | | AV DECODER UNIT |
| 2 | START | 0x0083 | | 0x0005 | STREAM CORRESPONDENCE INFORMATION TABLE STORAGE UNIT |
| 3 | START | 0x0082 | | 0x0005 | NAVIGATION INFORMATION TABLE STORAGE UNIT |

FIG. 26B

| FILTER IDENTIFICATION NUMBER | START/STOP | PID | stream_id | table_id_extension | OUTPUT DESTINATION |
|---|---|---|---|---|---|
| 0 | START | 0x0084 | 0xe5 | | AV DECODER UNIT |
| 1 | STOP | — | — | | AV DECODER UNIT |
| 2 | STOP | — | — | — | STREAM CORRESPONDENCE INFORMATION TABLE STORAGE UNIT |
| 3 | START | 0x0082 | | 0x0005 | NAVIGATION INFORMATION TABLE STORAGE UNIT |

FIG. 34A

MIT(0) — 3451

| VE_id | component_tag | stream_id |
|---|---|---|
| 0 | 0x00 | 0xe0 |
| 1 | 0x00 | 0xe1 |
| 2 | 0x00 | 0xe2 |
| 3 | 0x00 | 0xe3 |
| 4 | 0x00 | 0xe4 |
| 5 | 0x00 | 0xe5 |
| 6 | 0x00 | 0xe6 |
| 7 | 0x00 | 0xe7 |

FIG. 34B

MIT(1)

| VE_id | component_tag | stream_id |
|---|---|---|
| 8 | 0x00 | 0xe8 |
| 9 | 0x00 | 0xe9 |
| 10 | 0x00 | 0xea |
| 11 | 0x00 | 0xeb |
| 12 | 0x00 | 0xec |
| 13 | 0x00 | 0xed |
| 14 | 0x00 | 0xee |
| 15 | 0x00 | 0xef |

FIG. 34C

MIT(2)

| VE_id | component_tag | stream_id |
|---|---|---|
| 16 | 0x00 | 0xe0 |
| 17 | 0x00 | 0xe1 |
| 18 | 0x00 | 0xe2 |
| 19 | 0x00 | 0xe3 |
| 20 | 0x00 | 0xe4 |
| 21 | 0x00 | 0xe5 |
| 22 | 0x00 | 0xe6 |
| 23 | 0x00 | 0xe7 |

FIG. 40

3001 CONSTRUCTION INFORMATION TABLE

| CONTENT NUMBER | IMAGE DATA | AUDIO DATA | NAVIGATION INFORMATION |
|---|---|---|---|
| 0 | still0.m2v | BGM0.m2a | navi0.nif |
| 1 | still1.m2v | BGM0.m2a | navi1.nif |
| 2 | still2.m2v | BGM2.m2a | navi2.nif |
| ⋮ | ⋮ | ⋮ | ⋮ |
| 5 | still5.m2v | BGM1.m2a | navi5.nif |
| ⋮ | ⋮ | ⋮ | ⋮ |

3002 ENTRY INFORMATION

| ENTRY CONTENT NUMBER | 5 |
|---|---|

FIG. 41

3101 MULTIPLEXING INFORMATION TABLE

| Bitrate | 6000000bps |
|---|---|
| original_network_id | 0x0001 |
| transport_stream_id | 0x0001 |
| service_id | 0x0001 |
| event_id | 0x0001 |
| PMT_PID | 0x0080 |
| PCR_PID | 0x0081 |
| NE_component_pid | 0x0082 |
| VE_information_component_pid | 0x0083 |
| VE_component_pid | 0x0084 |
| AE_component_Bitrate0 | 500000 bps |
| AE_component_pid0 | 0x0085 |
| AE_component_Bitrate1 | 500000 bps |
| AE_component_pid1 | 0x0086 |
| AE_component_Bitrate2 | 500000 bps |
| AE_component_pid2 | 0x0087 |

3102 AE_component_Bitrate0
3103 AE_component_pid0
3104 AE_component_Bitrate1
3105 AE_component_pid1
3106 AE_component_Bitrate2
3107 AE_component_pid2

FIG. 42

3201 CONTENT IDENTIFIER ASSIGNING TABLE

| CONTENT NUMBER | orig_nw_id | ts_id | VE_svc_id | VE_event_id | VE_id | AE_svc_id | AE_event_id | AE_comp_tag | NE_svc_id | NE_event_id | NE_id |
|---|---|---|---|---|---|---|---|---|---|---|---|
| 0 | 0x0001 | 0x0001 | 0x0001 | 0x0001 | 0x0000 | 0x0001 | 0x0001 | 0x00 | 0x0001 | 0x0001 | 0x0000 |
| 1 | 0x0001 | 0x0001 | 0x0001 | 0x0001 | 0x0001 | 0x0001 | 0x0001 | 0x00 | 0x0001 | 0x0001 | 0x0001 |
| 2 | 0x0001 | 0x0001 | 0x0001 | 0x0001 | 0x0002 | 0x0001 | 0x0001 | 0x02 | 0x0001 | 0x0001 | 0x0002 |
| .. | .. | .. | .. | .. | .. | .. | .. | .. | .. | .. | .. |
| 5 | 0x0001 | 0x0001 | 0x0001 | 0x0001 | 0x0005 | 0x0001 | 0x0001 | 0x01 | 0x0001 | 0x0001 | 0x0005 |
| .. | .. | .. | .. | .. | .. | .. | .. | .. | .. | .. | .. |

NVT(5) 3301

Object Definition Table:

| Index | type | X | Y | Handler | Normal Bitmap | FocusedBitmap |
|---|---|---|---|---|---|---|
| 0 | Button | 400 | 300 | 2 | 6 | 8 |
| 1 | Button | 400 | 400 | 3 | 7 | 9 |

Handler Definition Table:

| Index | Script |
|---|---|
| 2 | goto_content (index 4) |
| 3 | goto_content (index 5) |

Hyperlink Table: 3302

| Index | orig_nw_id | ts_id | VE_service_id | VE_event_id | VE_id | AE_service_id | AE_event_id | AE_comp_tag | NE_service_id | NE_event_id | NE_id |
|---|---|---|---|---|---|---|---|---|---|---|---|
| 4 | — | — | — | — | 0x0001 | — | — | 0x00 | — | — | 0x0001 |
| 5 | — | — | — | — | 0x0002 | — | — | 0x02 | — | — | 0x0002 |

Bitmap Table:

| Index | Bitmap Data |
|---|---|
| 6 | TOKYO |
| 7 | TOKYO |
| 8 | OSAKA |
| 9 | OSAKA |

FIG. 45A

Program Map Table  3401 table_id=0x0002
...
program_number=0x0001
...
PCR_PID=0x0081
...
Entry_Descriptor  3402

| PID | stream_type | descriptor |
|---|---|---|
| 0x0082 | 0x05 | NE_Component_Descriptor |
| 0x0083 | 0x05 | VE_Information_Component_Descriptor |
| 0x0084 | 0x02 | stream_identifier_descriptor |
| 0x0085 | 0x03 | stream_identifier_descriptor |
| 0x0086 | 0x03 | stream_identifier_descriptor |
| 0x0087 | 0x03 | stream_identifier_descriptor |

FIG. 45B

Entry_Descriptor  3402 descriptor_tag=0x98
.........

| entry_VE_id | entry_AE_comp_tag | entry_NE_id |
|---|---|---|
| 0x0005 | 0x01 | 0x0005 |

DIGITAL BROADCASTING SYSTEM, DIGITAL BROADCASTING APPARATUS, AND RECEIVER APPARATUS FOR DIGITAL BROADCASTERS

BACKGROUND OF THE INVENTION

1. Field of the Invention

The present invention relates to a digital broadcasting system.

2. Description of the Related Art

Digital broadcasting has been developed in recent years so that a wide variety of programs can be provided on a large number of channels. For satellite digital broadcasting, large numbers of channels are possible by multiplexing the channels together into a single frequency band. This multiplexing is performed using what is called a "transport stream" under MPEG2 (Moving Pictures Experts Group2) standard. This technique is described in detail in the documentation for ISO/IEC Standard 13818-1 (MPEG2 system).

These satellite digital broadcasts consist of the one-way transmission of image information and other data from a transmitter station, so that no interaction with the receiver is possible. However, a greater variety of services would be possible if it were possible to enable the user of a receiver terminal to perform interactive operations for the image information.

As a result, various interactive systems have developed which use a telephone line or the like to connect the receiver terminal to the transmitter station. However, these systems require the provision of a separate communication line between each receiver terminal and the transmitter station, incurring significant connection charges.

SUMMARY OF THE INVENTION

In view of the stated problems, it is a primary object of the present invention to provide digital broadcasting system which can achieve the effects of interactive reproduction of received image information in a two-way communication system using image information which is transmitted by a transmitter in a one-way communication system.

The stated object can be achieved by a digital broadcasting apparatus which achieves simulated interaction using a digital broadcast, the digital broadcasting apparatus including: an image information storage unit for storing a plurality of sets of image data, each of which has an image data identifier; a control information storage unit for storing a plurality of sets of control information, each of which has a control information identifier, and each of which includes link destination information that shows a set of image data and a set of control information for a link destination for a corresponding set of image data; and a transmission unit for repeatedly transmitting a plurality of sets of the image data and a plurality of sets of the control information.

The stated object can also be achieved by a digital broadcasting apparatus which achieves simulated interaction using a digital broadcast, the digital broadcasting apparatus including: an image information storage unit for storing a plurality of sets of image data, each of which has an image data identifier; a control information storage unit for storing a plurality of sets of control information, each of which has a control information identifier, and each of which includes link destination information that shows a set of image data and a set of control information for a link destination for a corresponding set of image data; and a multiplexing transmission unit for repeatedly transmitting a plurality of sets of the image data and a plurality of sets of the control information as a multiplexed stream.

With the stated construction, a user can freely switch from a displayed set of image data to another set of image data in accordance with the link destination information when image data is one-directionally transmitted from a digital broadcasting apparatus. An interactive digital broadcast can thereby be achieved.

Here, the digital broadcasting apparatus may also include a correspondence information storage unit for storing correspondence information showing correspondence between the sets of image data and the sets of control information, the multiplexing transmission unit including a retrieval unit for retrieving a set of image data and a corresponding set of control information shown in the correspondence information, and a multiplexing unit for successively multiplexing image data and control information retrieved by the retrieval unit.

With the stated construction, a plurality of sets of image data and control information can be repeatedly transmitted.

Here, the link destination information may show a combination of an image data identifier of the set of the image data for the link destination and a control information identifier of a corresponding set of control information for the link destination.

With the stated construction, the image data of a link destination and the corresponding control information can be specified.

Here, the multiplexing unit, when multiplexing a set of image data and a set of control information, may assign and write first image data identification information into the set of image data and control information identification information into the set of control information.

With the stated construction, a digital broadcast reception apparatus can extract a desired set of image data and control information using the respective sets of identification information.

Here, at least one set of control information may include supplementary image information which is used to select a set of image data for a link destination indicated by the link destination information.

With the stated construction, interactive operations can be easily achieved by the user.

Here, at least one set of control information may include script information for supporting an interactive function performed by a reception apparatus which receives the digital broadcast.

With the stated construction, the interactive function of the digital broadcast reproduction apparatus can be better supported.

Here, the digital broadcasting apparatus may also include an entry information storage unit for storing entry information which shows a combination of a set of image data and a set of control information which are to be reproduced first for a program, with the multiplexing transmission unit repeatedly transmitting the entry information.

With the stated construction, the image data and control information which are to be reproduced at the start of a program can be clearly established, thereby facilitating user interactive operations by the digital broadcast reception apparatus.

The stated object can also be achieved by a digital broadcasting apparatus which achieves simulated interaction using a digital broadcast, the digital broadcasting apparatus including: an image information storage unit for storing a plurality of sets of image data, each of which has an image data identifier; a control information storage unit for storing a plurality of sets of control information, each of which has a control information identifier, and each of which includes link destination information that shows a set of image data and a set of control information for a link destination for a corresponding set of image data, the link destination information showing a combination of an image data identifier of the set of the image data for the link destination and a control information identifier for the set of the control information; a correspondence information storage unit for storing correspondence information showing correspondence between the sets of image data and the sets of control information; and a multiplexing transmission unit for repeatedly transmitting a plurality of sets of the image data and a plurality of the control information as a multiplexed stream, the multiplexing transmission unit including: a retrieval unit for retrieving a set of image data and a corresponding set of control information shown in the correspondence information; a multiplexing subunit for successively multiplexing image data and control information retrieved by the retrieval unit, in doing so assigning and writing first image data identification information into the set of image data and control information identification information into the set of control information, an image correspondence table generation unit for generating an image correspondence table for each set of image data, each image correspondence table being given identification information found from the image data identifier of the corresponding set of image data, each image correspondence table including second image data identification information specifying a corresponding set of image data; and an image correspondence table multiplexing unit for reading an image correspondence table corresponding to a set of image data and multiplexing the image correspondence table such that the image correspondence table will be transmitted by the multiplexing transmission unit at a time which precedes a transmission of the corresponding set of image data by at least a predetermined time period, the predetermined time period being defined as a time period which allows a digital broadcast reception apparatus which receives the digital broadcast to obtain the second image data identification information specifying a set of image data before starting to extract the corresponding set of image data.

With the stated construction, the image correspondence tables are referred to by a digital broadcast reception apparatus so that it can then properly extract the image data. The digital broadcast reception apparatus is also able to make effective use of the first and second image data identification information and, despite using small amounts of identification information, is able to verify the correspondence between image data and image correspondence tables, even when there are many sets of image data, some of which are assigned the same identification information.

Here, the multiplexing transmission unit may further include a retrieval control unit for controlling the retrieval unit to retrieve at least one set of image data which has first image data identification information that differs from the image data specified by second image data identification information included in the image correspondence table, during a time period between a multiplexing of the image correspondence table into the multiplexed stream by the image correspondence table multiplexing unit and a multiplexing of the set of image data corresponding to the image correspondence table.

With the stated construction, the efficiency of the transmission of image data can be improved.

Here, the multiplexing subunit may include a null data generation unit for generating, when a number of sets of image data stored in the image information storage unit is less than a predetermined number, a number of sets of null data to make up the predetermined number, with the multiplexing subunit successively multiplexing the sets of null data generated by the null data generation unit after a final set of image data and a final set of control information have been read by the retrieval unit.

With the stated construction, an interval time which is no shorter than a predetermined transmission time interval is maintained between the transmission of an image correspondence table and the corresponding image data. By doing so, the desired image data can be properly extracted by the digital broadcast reception apparatus.

Here, the multiplexing subunit may further include an area assigning unit for assigning, when a set of image data and a set of control information are multiplexed, a bit rate to the set of image data and to the corresponding set of control information, each bit rate being determined in accordance with a ratio of a data amount of each set of image data to an information amount of the corresponding set of control information, and the multiplexing subunit may multiplex the set of image data and the set of control information using the respective bit rates assigned by the area assigning unit.

With the stated construction, the control information corresponding to the image data can be transmitted at approximately the same time, so that the digital broadcast reception apparatus will be able to extract the image data and control information at roughly the same time.

Here, the multiplexing subunit may further include a multiplexing start position calculation unit for calculating multiplexing start positions for when an image correspondence table, a set of image data, and a set of control information are multiplexed, using a predetermined equation, with the image correspondence table multiplexing unit multiplexing an image correspondence table starting at the multiplexing start position calculated by the multiplexing start position calculation unit, and the multiplexing subunit multiplexing a set of image data and a set of control information at the respective multiplexing start positions calculated by the multiplexing start position calculation unit.

With the stated construction, the multiplexing start positions of sets of image data, sets of control information, and image correspondence tables can be clearly established.

Here, the first image data identification information and the second image data identification information may be the same.

Here also, the first image data identification information and the second image data identification information may also be combinations of a stream identifier ("stream_id") and a packet identifier ("PID") in accordance with MPEG2 (Moving Pictures Experts Group2) standard.

With the stated construction, the digital broadcast reception apparatus is able to extract sets of image data without referring to a correspondence table.

Here, the first image data identification information may be a combination of a stream identifier ("stream_id") and a packet identifier ("PID") in accordance with MPEG2 (Moving Pictures Experts Group2) standard, and the second image data identification information may be a combination of a stream identifier in accordance with MPEG2 (Moving Pictures Experts Group2) standard and a component tag ("component_tag") in accordance with DVB (Digital Video Broadcasting) standard, with the multiplexing transmission unit repeatedly transmitting a correspondence table for the packet identifier and the component tag.

With the stated construction, the image data can be indirectly specified using the image correspondence table, so that even if the packet identifiers assigned to image data are changed by the digital broadcast system, the digital broadcast reception apparatus will be able to refer to the image correspondence table, obtain the first image data identification information, and use this to obtain the desired image data.

Here, the multiplexing transmission unit may further include an image data identifier appending unit for writing, when a set of image data retrieved by the retrieval unit is multiplexed, an image data identifier into a private area of the corresponding set of image data.

With the stated construction, the digital broadcasting reception apparatus can judge whether it has extracted the correct set of image data.

Here, the image correspondence table multiplexing unit, after multiplexing an image correspondence table, may multiplex the same image correspondence table a plurality of times before a set of image data which corresponds to the image correspondence table is multiplexed.

With the stated construction, the digital broadcast reception apparatus may reproduce image data at high speed when its load is not substantial.

Here, the stated object can also be achieved by a digital broadcasting apparatus which achieves simulated interaction using a digital broadcast, the digital broadcasting apparatus including: an image information storage unit for storing a plurality of sets of image data, each of which has an image data identifier; an audio information storage unit for storing a plurality of sets of audio data, each of which has an audio data identifier; a control information storage unit for storing a plurality of sets of control information, each of which has a control information identifier, and each of which includes link destination information that shows a set of image data, a set of audio data, and a set of control information for a link destination for the corresponding set of image data; and a multiplexing transmission unit for repeatedly transmitting a plurality of sets of the image data, a plurality of sets of audio data, and a plurality of the control information as a multiplexed stream.

With the stated construction, audio data can be subjected to interactive operations by the digital broadcast reception apparatus, in addition to image data.

Here, the digital broadcasting apparatus may further include a correspondence information storage unit for storing correspondence information showing correspondence between the sets of image data, the sets of audio data, and the sets of control information, and the multiplexing transmission unit may include a retrieval unit for retrieving a set of image data and a corresponding set of audio data and a corresponding set of control information shown in the correspondence information and a multiplexing unit for successively multiplexing image data, audio data and control information retrieved by the retrieval unit.

With the stated construction, a plurality of sets of image data, a plurality of sets of audio data, and a plurality of sets of control information can be repeatedly transmitted.

Here, the link destination information may show a combination of an image data identifier for the set of image data of a link destination, an audio data identifier for the set of audio data of the link destination, and a control information identifier for the control information of the link destination.

With the stated construction, the audio data of the link destination and the corresponding control information can be specified.

Here, when multiplexing a set of image data, a set of audio data, and a set of control information, the multiplexing unit may assign and write first image data identification information into the set of image data, first audio data identification information into the set of audio data, and control information identification information into the set of control information.

With the stated construction, a desired set of audio data can be extracted using the identification information.

Here, the multiplexing transmission unit may further include: an image correspondence table generation unit for generating an image correspondence table for each set of image data, each image correspondence table being given identification information found from the image data identifier of the corresponding set of image data, each image correspondence table including second image data identification information specifying a corresponding set of image data; an audio correspondence table generation unit for generating an audio correspondence table for each set of audio data, each audio correspondence table being given identification information found from the audio data identifier of the corresponding set of audio data, each audio correspondence table including second audio data identification information specifying a corresponding set of audio data, an image correspondence table multiplexing unit for reading an image correspondence table corresponding to a set of image data and multiplexing the image correspondence table such that the image correspondence table will be transmitted by the multiplexing transmission unit at a time which precedes a transmission of the corresponding set of image data by at least a predetermined time period, the predetermined time period being defined as a time period which allows a digital broadcast reception apparatus which receives the digital broadcast to obtain the second image data identification information specifying a set of image data before starting to extract the image data; and an audio correspondence table multiplexing unit for reading an audio correspondence table corresponding to a set of audio data and multiplexing the audio correspondence table such that the audio correspondence table will be transmitted by the multiplexing transmission unit at a time which precedes a transmission of the corresponding set of audio data by at least a predetermined time period, the predetermined time period being defined as a time period which allows a digital broadcast reception apparatus which receives the digital broadcast to obtain the second audio identification information specifying a set of audio data before starting to extract the audio data.

With the stated construction, the digital broadcast reception apparatus is able to refer to the image correspondence table and the audio correspondence table and properly extract the desired image data and audio data.

The stated object can also be achieved by a digital broadcasting apparatus which achieves simulated interaction using a digital broadcast, the digital broadcasting apparatus including: an image information storage unit for storing a plurality of sets of image data, each of which has an image data identifier; a control information storage unit for storing a plurality of sets of control information, each of which has a control information identifier, and each of which includes link destination information that shows a set of image data and a set of control information for a link destination for the sets of image data, the link destination information showing a combination of an image data identifier of the set of the image data for the link destination and a control information identifier for the set of control information; a correspondence information storage unit for storing correspondence information showing correspondence between the sets of image data and the sets of control information; and a multiplexing transmission unit for repeatedly transmitting a plurality of sets of the image data and a plurality of the control information as a multiplexed stream, the multiplexing transmission unit including: a retrieval unit for retrieving a plurality of sets of image data and corresponding sets of control information shown in the correspondence information; a multiplexing subunit for successively multiplexing image data and control information retrieved by the retrieval unit, in doing so assigning and writing first image data identification information into the set of image data and control information identification information into the set of control information; an image correspondence table generation unit for generating an image correspondence table for each set of image data, using a value equal to the image data identifier of the set of image data as the identification information of the image correspondence table, each image correspondence table including second image data identification information specifying a corresponding set of image data and reproduction time information for the corresponding set of image data; and an image correspondence table multiplexing unit for reading an image correspondence table corresponding to a set of image data and multiplexing the image correspondence table such that the image correspondence table will be transmitted by the multiplexing transmission unit at a time which precedes a transmission of the corresponding set of image data by at least a predetermined time period, the predetermined time period being defined as a time period which allows a digital broadcast reception apparatus which receives the digital broadcast to obtain the second image data identification information specifying a set of image data before starting to extract the image data.

With the stated construction, the digital broadcast reception apparatus can be informed of time information for the reproduction of the image data.

Here, the image correspondence table generation unit may include: a reproduction time calculation unit for calculating reproduction time information at which a set of image data corresponding to an image correspondence table is to be reproduced, in accordance with a predetermined equation; and a reproduction time writing unit for writing the reproduction time information calculated by the reproduction time calculation unit into the image correspondence table.

With the stated construction, the timing of the extraction and reproduction of image data by the digital broadcast reception apparatus can be properly managed.

The stated object can also be achieved by a digital broadcasting apparatus which achieves simulated interaction using a digital broadcast, the digital broadcasting apparatus including: an image information storage unit for storing a plurality of sets of image data, each of which has an image data identifier; a control information storage unit for storing a plurality of sets of control information, each of which has a control information identifier, and each of which includes link destination information that shows a set of image data and a set of control information for a link destination for the sets of image data, the link destination information showing a combination of an image data identifier of the set of the image data for the link destination and a control information identifier for the control information; a correspondence information storage unit for storing correspondence information showing correspondence between the sets of image data and the sets of control information; and a multiplexing transmission unit for repeatedly transmitting a plurality of sets of the image data and a plurality of the control information as a multiplexed stream, the multiplexing transmission unit including: a retrieval unit for retrieving a plurality of sets of image data and corresponding sets of control information shown in the correspondence information; a multiplexing unit for successively multiplexing image data and control information retrieved by the retrieval unit, in doing so assigning and writing first image data identification information into the set of image data and control information identification information into the set of control information; a module information generation unit for generating a set of module information for a plurality of sets of image data, the module information including second image data identification information for identifying each set of image data in the plurality of sets of image data; and a module information multiplexing unit for reading module information generated by the module information generation unit and multiplexing the module information such that the module information will be transmitted by the multiplexing transmission unit at a time which precedes a transmission of the sets of image data, which are identified by the second image data identification information in the module information, by at least a predetermined time period, the predetermined time period being defined as a time period which allows a digital broadcast reception apparatus which receives the digital broadcast to obtain the second image data identification information specifying a set of image data before starting to extract the corresponding set of image data.

With the stated construction, the digital broadcast reception apparatus is able to extract the proper set of image data by referring to the module information.

The stated object can also be achieved by a digital broadcast reception apparatus for receiving a repeatedly transmitted digital broadcast of a plurality of sets of image data and sets of control information which correspond to the sets of image data, each set of control information including link destination information showing a set of image data which is a link destination for a link attached to a set of image data corresponding to the set of control information, the digital broadcast reception apparatus including: a reception unit for receiving the digital broadcast; an extraction unit for extracting one set of image data and a corresponding set of control information from the received digital broadcast; a storage unit for storing the extracted set of control information; a reproduction unit for reproducing the extracted set of image data; an operation unit for receiving a user selection operation of link destination information included in the set of control information; and an extraction control unit for controlling the extraction unit to extract a set of image data and a corresponding set of control information which are indicated by the link destination information selected by the user selection operation.

With the stated construction, a user can freely switch from a displayed set of image data to another set of image data in accordance with the link destination information included in the control information when image data is one-directionally transmitted from a digital broadcasting apparatus. An interactive digital broadcast can thereby be achieved.

Here, each set of image data may be appended with first image data identification information and each set of control information may be appended with control information identification information, the operation unit including an indication reception unit for receiving an operation indicating a switching from a currently displayed set of image data to a set of image data for a link destination, the extraction control unit reading the link destination information in the set of control information stored in the storage unit, and setting an extraction condition for the extraction unit based on an image data identifier for a set of image data of the link destination to which switching has been indicated by the indication reception unit and a control information identifier for a corresponding set of control information, each set of control information including an image data identifier for identifying a set of image data for a link destination and a control information identifier for identifying a set of control information for the link destination as the link destination information, the extraction unit extracting a set of image data and a set of control information according to the extraction condition set by the extraction control unit.

With the stated construction, the digital broadcast reception apparatus can extract the desired image data and corresponding control information sent from the digital broadcasting apparatus according to the user switching indication for image data.

Here, the plurality of sets of image data and plurality of sets of corresponding control information are transmitted having been multiplexed into a multiplexed stream, the reproduction unit including a supplementary image reproduction unit for combining supplementary image information included in the control information stored in the storage unit with a set of image data and reproducing the combined image, the supplementary image information including a supplementary image which is used to select a switching of image data from a present set of image data to a link destination set of image data.

With the stated construction, the user can easily make image data switching indications to link destinations while viewing supplementary images on the display screen.

Here, the plurality of sets of image data and plurality of sets of corresponding control information may be transmitted having been multiplexed into a multiplexed stream, and each set of control information may include script information for supporting an interactive function, the reproduction unit including: a script information interpreting unit for interpreting script information; and a script execution unit for executing scripts in the script information, in accordance with an interpretation of the script information interpreting unit.

With the stated construction, user interactive functions can be easily realized by executing the scripts.

Here, the plurality of sets of image data and corresponding sets of control information may be transmitted having been multiplexed into a multiplexed stream, with entry information, showing an image data identifier of a set of image data to be reproduced first when the reproduction of the multiplexed stream is commenced and a control information identifier of a set of control information corresponding to the set of image data, being multiplexed into the multiplexed stream, the extraction unit including an entry information extraction unit for receiving an indication from the extraction control unit and extracting the entry information, with the storage unit including an entry information storage unit for storing the entry information extracted by the entry information extraction unit, and the extraction control unit setting the extraction condition in the extraction unit based on the image data identifier and the control information identifier written in the entry information.

With the stated construction, the set of image data and control information which are to be reproduced at the start of the reproduction of the multiplexed stream can be clearly established.

The stated object can be achieved by a digital broadcast reception apparatus for receiving a repeatedly transmitted digital broadcast of a plurality of sets of image data and sets of control information which correspond to the sets of image data, each set of control information including link destination information showing a set of image data which is a link destination for a link attached to a set of image data corresponding to the set of control information, each set of image data having first image data identification information, each set of control information having control information identification information, the plurality of sets of image data and corresponding sets of control information being multiplexed into a multiplexed stream and transmitted, the multiplexed stream including an image correspondence table for each set of image data, each image correspondence table including second image data identification information specifying a corresponding set of image data, each image correspondence table having identification information found from the image data identifier of the corresponding set of image data, the image correspondence tables being repeatedly transmitted in the same way as the sets of image data, the digital broadcast reception apparatus including: a reception unit for receiving the digital broadcast; an extraction unit for extracting one set of image data and a corresponding set of control information from the received digital broadcast, the extraction unit including an image correspondence table extraction unit for extracting an image correspondence table with the image correspondence table identification information which matches a set extraction condition; a storage unit for storing the extracted set of control information, the storage unit including an image correspondence table storage unit for storing the extracted image correspondence table; a reproduction unit for reproducing an extracted set of image data; an operation unit for receiving user selection operations for link destination information included in sets of control information, the operation unit including an indication receiving unit for receiving an indication for a switching from a set of image data presently being reproduced to a set of image data for a link destination; and an extraction control unit for controlling the extraction unit to extract a set of image data and a set of corresponding control information indicated by the link destination information included in the control information, for reading the link destination information in the set of control information stored in the storage unit, and for setting an extraction condition in the extraction unit based on an image data identifier of a set of image data of a link destination to which switching has been indicated by the indication receiving unit and a control information identifier of a corresponding set of control information, each set of control information including an image data identifier of a set of image data of a link destination and a control information identifier of a corresponding set of control information as the link destination information, the extraction unit extracting a set of image data and a set of control information indicated by the extraction condition in the extraction unit, and the extraction control unit including an extraction condition setting unit for setting image correspondence table identification information found from an image data identifier of a set of image data of the link destination as the extraction condition.

The extraction control unit may further include: an image data extraction control unit for reading the second image data identification information written in the image correspondence table stored in the image correspondence table storage unit and setting the extraction condition in the extraction unit using the read second image data identification information, and-the extraction unit may further include an image data extraction unit for extracting a set of image data which matches the extraction condition set by the image data extraction control unit.

With the stated construction, the digital broadcast reception apparatus can refer to the image correspondence table and obtain second image data identification information to indirectly specify the desired set of image data which it then extracts.

Here, the sets of image data may be such that identical first image data identification information have been repeatedly assigned to different sets of image data, and the reproduction unit may include an identifier extraction unit for extracting an image data identifier included in the image data extracted by the image data extraction unit, the image data identifier having been written into a private area of the image data, the extraction control unit may further include: an image data judgement unit for judging whether the image data identifier of the set of image data extracted by the image data extraction unit matches the image data identifier of the set of image data for the link destination in the read link destination information; a reproduction termination indicating unit for sending, when the image data judgement unit judges that the identifiers do not match, the reproduction unit an indication to terminate reproduction, with the reproduction unit terminating the reproduction on receiving the indication; and an image correspondence table extraction indicating unit for indicating an extraction of an image correspondence table to the image correspondence table extraction unit when the reproduction termination indicating unit has sent a reproduction termination indication.

With the stated construction, when a plurality of sets of image data have the same first image data identification information, the digital broadcast reception apparatus can properly extract the desired image data even when other data is first mistakenly extracted.

Here, the extraction control unit may further include an extraction termination indicating unit for indicating a termination of an extraction of a set of image data by the image data extraction unit when the image data judgement unit judges that the identifiers match, with the image data extraction unit terminating the extraction on receiving the indication.

With the stated construction, once a desired set of image data has been extracted, the extraction of other sets of image data is prevented.

Here, each image correspondence table may include a reproduction start time for the corresponding set of image data, and the reproduction unit may further include: a clock unit for measuring time, the reproduction unit decoding and reproducing the extracted set of image data, in doing so notifying the extraction control unit of a completion of decoding on completing a decoding of one set of image data, the extraction control unit also including: a reproduction start time judgement unit for judging whether a notification of the completion of decoding has been received from the reproduction unit before the reproduction start time of the set of image data written in the image correspondence table; and an extraction indicating unit for indicating a termination of an extraction of image data to the image data extraction unit when the reproduction start time judgement unit judges that no notification has been received, and for indicating an extraction of an image correspondence table to the image correspondence table extraction unit.

With the stated construction, reproduction which starts midway through the image data can be prevented.

Here, the first image data identification information may be a combination of a stream identifier ("stream_id") and a packet identifier ("packet_id") according to MPEG2 (Moving Pictures Experts Group2) standard, the second image data identification information may be a combination of a stream identifier in accordance with MPEG2 standard and a component tag ("component_tag") in accordance with DVB (Digital Video Broadcasting) standard, and a correspondence table for the component tags and packet identifiers may be multiplexed into the multiplexed stream and repeatedly transmitted, with the extraction unit extracting the correspondence table and the extraction control unit referring to the correspondence table, converting the second image data identification information to the first image data identification information, and setting the extraction condition in the image data extraction unit.

With the stated construction, the digital broadcast reception apparatus can extract image data which has been multiplexed into the multiplexed stream according to MPEG2 standard.

Here, the control information identification information may be a table identifier extension ("table_id_extension"), in accordance with MPEG2 standard, which has a same value as the control information identifier.

With the stated construction, the digital broadcast reception apparatus can properly extract the control information.

Here, the first image data identification information and the second image data identification information may be identical, with the image data extraction control unit setting the read second image data identification information as the extraction condition in the extraction unit.

With the stated construction, the digital broadcast reception apparatus can set the second image data identification information of the image correspondence table as the extraction condition, meaning that the desired image data can be properly extracted.

Here, a reproduction end time of the corresponding set of image data may be written into the image correspondence table, with the reproduction unit further including a clock unit for measuring time, and the extraction control unit may further include: an end time judgement unit for judging whether the reproduction end time written in the image correspondence table has been reached; and an extraction termination indicating unit for indicating a termination of extraction of a set of image data to the image data extraction unit, when the end time judgement unit judges that the reproduction end time has been reached.

With the stated construction, the digital broadcast reception apparatus can stop the extraction of image data whose reproduction time has already passed.

The stated object can also be achieved by a digital broadcast reception apparatus for receiving a repeatedly transmitted digital broadcast of a plurality of sets of image data and sets of control information which correspond to the sets of image data, each set of control information including link destination information showing a set of image data which is a link destination for a link attached to a set of image data corresponding to the set of control information, each set of image data having first image data identification information, each set of control information having control information identification information, the plurality of sets of image data and corresponding sets of control information being multiplexed into a multiplexed stream and transmitted, the multiplexed stream including an image correspondence table for each set of image data, each image correspondence table including second image data identification information specifying a corresponding set of image data, each image correspondence table having identification information found from the image data identifier of the set of image data, the image correspondence tables being repeatedly transmitted in the same way as the sets of image data, the digital broadcast reception apparatus including: a reception unit for receiving the digital broadcast; an extraction unit for extracting one set of image data and a corresponding set of control information from the received digital broadcast, the extraction unit including an image correspondence table extraction unit for extracting an image correspondence table with image correspondence table identification information which matches a set extraction condition, a reproduction end time for a corresponding set of image data being written in each image correspondence table, and an image data extraction unit for extracting sets of image data which match the set extraction condition from the multiplexed stream; a storage unit for storing the extracted set of control information, the storage unit including an image correspondence table storage unit for storing the extracted image correspondence table; a reproduction unit for reproducing an extracted set of image data, with the reproduction unit including a clock unit for measuring time; an operation unit for receiving user selection operations for link destination information included in sets of control information, the operation unit including an indication receiving unit for receiving an indication for a switching from a set of image data presently being reproduced to a set of image data for a link destination; and an extraction control unit for controlling the extraction unit to extract a set of image data and a set of corresponding control information indicated by the link destination information included in the control information, for reading the link destination information in the set of control information stored in the storage unit, and for setting an extraction condition in the extraction unit based on an image data identifier of a set of image data of a link destination to which switching has been indicated by the indication receiving unit and a control information identifier of a corresponding set of control information, with each set of control information including an image data identifier of a set of image data of a link destination and a control information identifier of a corresponding set of control information as the link destination information, with the extraction unit extracting a set of image data and a set of control information indicated by the extraction condition in the extraction unit, and the extraction control unit including an extraction condition setting unit for setting image correspondence table identification information found from an image data identifier of a set of image data as the extraction condition; an end time judgement unit for judging whether the reproduction end time of a set of image data which is written in the image correspondence table has been reached; and an extraction state control unit for controlling the image data extraction unit to extract sets of image data which correspond to the extraction condition from the multiplexed stream, for a time period from a setting of the extraction condition by the extraction condition setting unit to a point when the end time judgement unit judges that the reproduction end time of the image data has been reached.

With the stated construction, the extraction of sets of image data which match the extraction condition but whose reproduction times have already passed can be prevented.

The stated object can also be achieved by a digital broadcast reception apparatus for receiving a repeatedly transmitted digital broadcast of a plurality of sets of image data, a plurality of sets of audio data and sets of control information which each correspond to one set of image data and one set of audio data, each set of control information including link destination information showing a set of image data and a set of audio data of a link destination for a link attached to a set of image data corresponding to the set of control information, the digital broadcast reception apparatus including: a reception unit for receiving the digital broadcast; an extraction unit for extracting one set of image data, one set of audio data and a corresponding set of control information from the received digital broadcast; a storage unit for storing the extracted set of control information; a reproduction unit for reproducing the extracted set of image data and extracted set of audio data; an operation unit for receiving a user selection operation of link destination information included in the set of control information; and an extraction control unit for controlling the extraction unit to extract a set of image data, a set of audio data, and a corresponding set of control information which are indicated by the link destination information selected by the user selection operation.

With the stated construction, audio data can be subjected to interactive operations, in addition to the image data.

The stated object can also be achieved by a digital. broadcast reception apparatus for receiving a repeatedly transmitted digital broadcast of a plurality of sets of image data and sets of control information which each correspond to one set of image data, each set of control information including link destination information showing a set of image data of a link destination for a link attached to a set of image data corresponding to the set of control information, each set of image data having first image data identification information, each set of control information having control information identification information, the plurality of sets of image data and corresponding sets of control information being multiplexed into a multiplexed stream and transmitted, a plurality of sets of module information, into which correspondence between a plurality of image data identifiers and a plurality of second image data identification information is written, being multiplexed into the multiplexed stream, the digital broadcast reception apparatus including: a reception unit for receiving the digital broadcast; an extraction unit for extracting one set of image data and a corresponding set of control information from the received digital broadcast, the extraction unit including a module information extraction unit for extracting module information after an extraction condition for module information has been set; a storage unit for storing the extracted set of control information, the storage unit including a module information storage unit for storing the extracted module information; a reproduction unit for reproducing an extracted set of image data; an operation unit for receiving user selection operations for link destination information included in sets of control information, the operation unit including an indication receiving unit for receiving an indication for a switching from a set of image data presently being reproduced to a set of image data for a link destination; and an extraction control unit for controlling the extraction unit to extract a set of image data and a set of corresponding control information indicated by the link destination information included in the control information, for reading the link destination information in the set of control information stored in the storage unit, and for setting an extraction condition in the extraction unit based on an image data identifier of a set of image data of a link destination to which switching has been indicated by the indication receiving unit and a control information identifier of a corresponding set of control information, each set of control information including an image data identifier of a set of image data of a link destination and a control information identifier of a corresponding set of control information as the link destination information, the extraction unit extracting a set of image data and a set of control information indicated by the extraction condition in the extraction unit, and the extraction control unit further including: an image data identifier judgement unit for judging whether there is an image data identifier, which matches an image data identifier of the set of image data of the link destination read from the link destination information, in the module information stored in the module information storage unit; an image data extraction control unit for reading, when the image data identifier judgement unit judges that a matching image data identifier is present, second image data identification information corresponding to the image data identifier from the module information and for setting an extraction condition for image data in the extraction unit, using the second image data identification information; and a module information re-extraction indicating unit for indicating an extraction of new module information to the module information extraction unit when the image data identifier judgement unit judges that a matching image data identifier is not present, with the module information extraction unit, on receiving an indication from the module information re-extraction indicating unit, extracting new module information, and updating the module information stored in the module information storage unit, at which point the image data identifier judgement unit performs a judgement for the updated module information.

With the stated construction, the digital broadcast reception apparatus can refer to the module information and extract a desired set of image data.

The stated object can also be achieved by a digital broadcasting system, which achieves simulated interaction using a digital broadcast, including a digital broadcasting apparatus and a digital reception apparatus, the digital broadcasting apparatus including: an image information storage unit for storing a plurality of sets of image data, each of which has an image data identifier; a control information storage unit for storing a plurality of sets of control information, each of which has a control information identifier, and each of which includes link destination information that shows a set of image data and a set of control information for a link destination for a corresponding set of image data; and a transmission unit for repeatedly transmitting a plurality of sets of the image data and a plurality of sets of the control information, the digital broadcast reception apparatus including: a reception unit for receiving the digital broadcast; an extraction unit for extracting one set of image data and a corresponding set of control information from the received digital broadcast; a storage unit for storing the extracted set of control information; a reproduction unit for reproducing the extracted set of image data; an operation unit for receiving a user selection operation of link destination information included in the set of control information; and an extraction control unit for controlling the extraction unit to extract a set of image data and a corresponding set of control information which are indicated by the link destination information selected by the user selection operation.

The stated object can also be achieved by a digital broadcasting system, which achieves simulated interaction using a digital broadcast, including a digital broadcasting apparatus and a digital reception apparatus, the digital broadcasting apparatus including: an image information storage unit for storing a plurality of sets of image data, each of which has an image data identifier; a control information storage unit for storing a plurality of sets of control information, each of which has a control information identifier, and each of which includes link destination information that shows a set of image data and a set of control information for a link destination for a corresponding set of image data, the link destination information being a combination of an image data identifier for the set of image data of the link destination and a control information identifier for the set of control information for the link destination; a correspondence information storage unit for storing correspondence information showing correspondence between the sets of image data and the sets of control information; and a multiplexing transmission unit for reading a set of image data and a corresponding set of control information given in the correspondence information, and for repeatedly transmitting the read set of image data and the read set of control information as a multiplexed stream, having assigned image data identification information-and written the image data identification information into the image data, and having assigned control information identification information and written the control information identification information into the control data, the digital broadcast reception unit including: a reception unit for receiving the digital broadcast; an extraction unit for extracting one set of image data and a corresponding set of control information from the received digital broadcast; a storage unit for storing the extracted set of control information; a reproduction unit for reproducing the extracted set of image data; an operation unit for receiving a user selection operation of link destination information included in the set of control information; and an extraction control unit for controlling the extraction unit to extract a set of image data and a corresponding set of control information which are indicated by the link destination information selected by the user selection operation.

With the stated construction, a user can freely switch from a displayed set of image data to another set of image data in accordance with the link destination information when image data is one-directionally transmitted from a digital broadcasting apparatus. An interactive digital broadcast system can thereby be achieved.

The stated object can also be achieved by a recording medium for use by a reception apparatus, the reception apparatus including: reception unit which receives a repeatedly transmitted digital broadcast of a plurality of sets of image data and sets of control information which correspond to the sets of image data, each set of control information including link destination information showing a set of image data which is a link destination for a link attached to a set of image data corresponding to the set of control information; an extraction unit for extracting one set of image data and a corresponding set of control information from the received digital broadcast; a storage unit for storing the extracted set of control information; reproduction unit for reproducing the extracted set of image data; an operation unit for receiving a user operation; and a program execution unit for executing a program recorded on the recording medium, the program including the following steps: a selection operation judgement step for judging a user selection operation for link destination information included in a set of control information; and an extraction control step for controlling the extraction unit to extract a set of image data and a corresponding set of control information indicated by link destination information selected by the user.

With the stated construction, a digital broadcast reception apparatus which is not equipped with an interactive function can use the stated recording medium and so allow a user to freely switch from a displayed set of image data to another set of image data in accordance with the link destination information when image data is one-directionally transmitted from a digital broadcasting apparatus. An interactive digital broadcast can thereby be achieved.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 8 shows an example of the construction information table and the entry information which are stored in the construction information storage unit of the present embodiment;

FIG. 10 shows an example of the content identifier assigning table generated by the multiplexing control unit of the present embodiment;

FIG. 11 shows an example of the display image information identifier assigning table which is generated by the multiplexing control unit of the present embodiment;

FIG. 13 shows an example of the navigation information table generated by the navigation information table generating unit of the present embodiment;

FIG. 14 shows another example of the navigation information table generated by the navigation information table generating unit of the present embodiment;

FIG. 15A shows an example of the stream correspondence table generated by the stream correspondence information table generating unit in the present embodiment;

FIG. 15B shows another example of the stream correspondence table generated by the stream correspondence information table generating unit in the present embodiment;

FIG. 15C shows another example of the stream correspondence table generated by the stream correspondence information table generating unit in the present embodiment;

FIG. 18A shows an example of the NIT generated by the system information table generating unit of the present embodiment;

FIG. 18B shows an example of the SDT generated by the system information table generating unit of the present embodiment;

FIG. 18C shows an example of the EIT generated by the system information table generating unit of the present embodiment;

FIG. 19 shows an example of the PAT generated by the system information table generating unit of the present embodiment;

FIG. 20 shows an example of the PMT generated by the system information table generating unit of the present embodiment;

FIG. 26A shows examples of the filter conditions which are stored by the filter condition storage unit of the TS decoder unit of the present embodiment;

FIG. 26B shows other examples of the filter conditions which are stored by the filter condition storage unit of the TS decoder unit of the present embodiment;

FIG. 34A shows an example of the module information generated by the module information generation unit of the present embodiment;

FIG. 34B shows an example of the module information generated by the module information generation unit of the present embodiment;

FIG. 34C shows an example of the module information generated by the module information generation unit of the present embodiment;

FIG. 40 shows the construction information table and the entry information stored in the construction information storage unit of the present embodiment;

FIG. 41 shows the multiplexing information table stored by the multiplexing information storage unit of the present embodiment;

FIG. 42 shows the content identifier assigning table generated by the multiplexing control unit of the present embodiment;

FIG. 43 shows an example of the navigation information table generated by the navigation information table generating unit of the present embodiment;

FIG. 45A shows an example of the PMT generated by the system information table generating unit of the present embodiment;

FIG. 45B shows the details for the Entry_Descriptor of the PMT;

DESCRIPTION OF THE PREFERRED EMBODIMENTS

Fundamental Principles of the Present Invention

The fundamental principles of the present invention are explained below with reference to FIGS. 1 to 3, prior to the description of the construction of the digital broadcasting system of the present invention.

Figure 1:
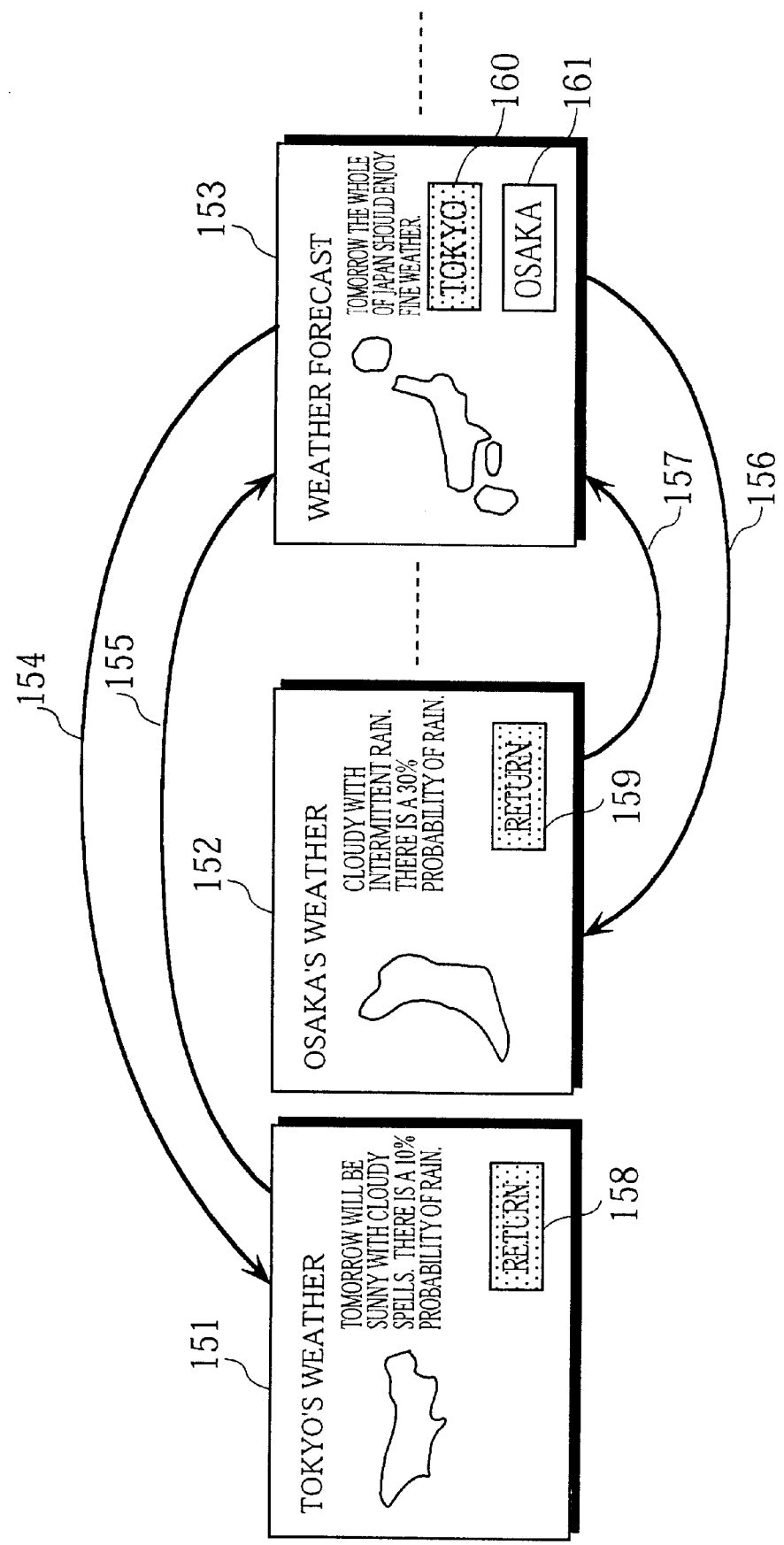
FIG. 1 shows examples of contents which are each displayed as one frame on the display screen of the reception apparatus.

FIG. 1 shows several examples of "contents" which are displayed by the display screen of a receiver apparatus, with these example contents representing weather forecasts. Here, the example contents 151 to 153 show weather forecasts for the whole of Japan (153) and for different regions (151, 152). This term "content" is the unit of information used when interactive operations are made by a user. The arrows 154 to 157 which have been drawn between pairs of these contents 151 to 153 show the switching of display which can be performed in response to user operations.

When the content 153 which gives the weather forecast for the whole of Japan is being displayed on the display screen, if the user makes a selection and confirmation operation for the button 16-1 which represents "Tokyo", the display on the display screen will switch as shown by the arrow 154 to content 151 which shows the weather forecast for Tokyo. Should the user then select and confirm the "Return" button 158, the display screen will switch from the content 151 to the content 153, as shown by the arrow 155.

In the same way, if the user selects and confirms the button 161 representing "Osaka" in the content 153, the display screen will switch from the content 153 to the content 152, as shown by the arrow 156. Once again, should the user then select and confirm the "Return" button 159, the display screen will switch from the content 152 to the content 153, as shown by the arrow 157. In order to perform these display switching operations, the contents 151 to 153 are provided with the buttons 158 to 161.

In order to allow the user to make display switching operations which switch the display between contents, the transmission apparatus transmits each content according to the procedure described below.

Figure 2:
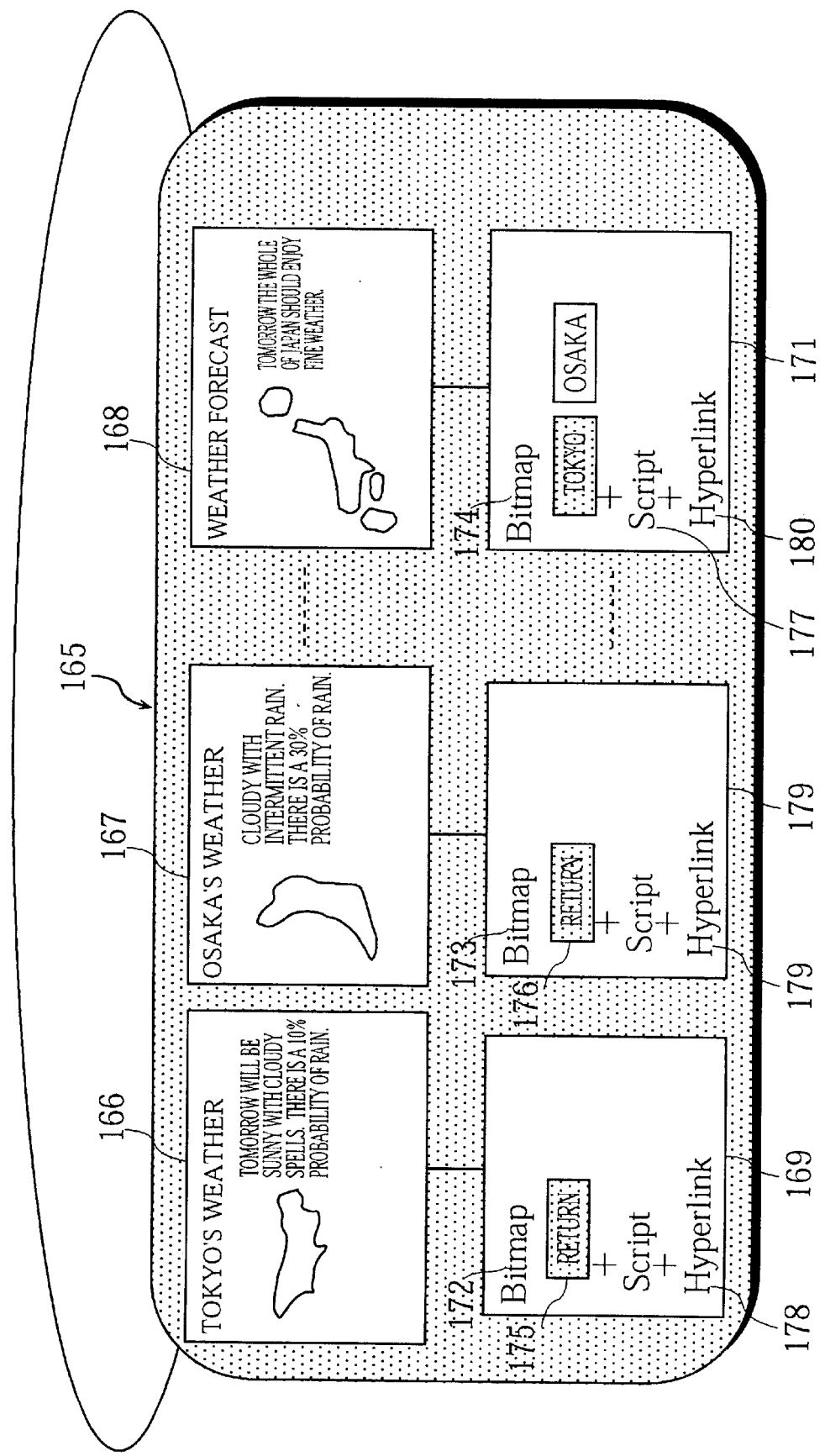
FIG. 2 is a model representation of the transmission data transmitted by the transmission apparatus.

FIG. 2 is a pictorial representation of the transmission data which is transmitted by the transmission apparatus. The transmission data 165 is made up of data representing a plurality of contents, and is repeatedly transmitted in its entirety. This transmission data 165 is composed of a plurality of sets of image data 166, 167, 168 . . . and a plurality of sets of navigation information 169, 170, 171 . . . corresponding to the sets of image data.

Each set of image data (166 onwards) is composed of a main image of one of the contents (151 onwards) which is to be displayed on the display screen of the reception apparatus. Here, the same example weather forecasts are shown in the drawings.

Each set of navigation information is 169 to 171 includes a set of bitmap data 172 to 174 such as a button which is superimposed on the corresponding image 166 to 168, a set of script information 175 to 177 which describes the operations to be executed in accordance with user operations, and a set of hyperlink information 178 to 180 which shows the contents which can be switched to as a result of a display switching operation made by the user.

As examples, the content 151 shown in FIG. 1 is composed of the image data 166 and the navigation information 169. In the same way, the content 152 shown in FIG. 1 is composed of the image data 167 and the navigation information 170, while the content 153 is composed of the image data 168 and the navigation information 171. Putting this into other words, each set of image data (such as 166) has a corresponding set of navigation information (such as 169).

Figure 3:
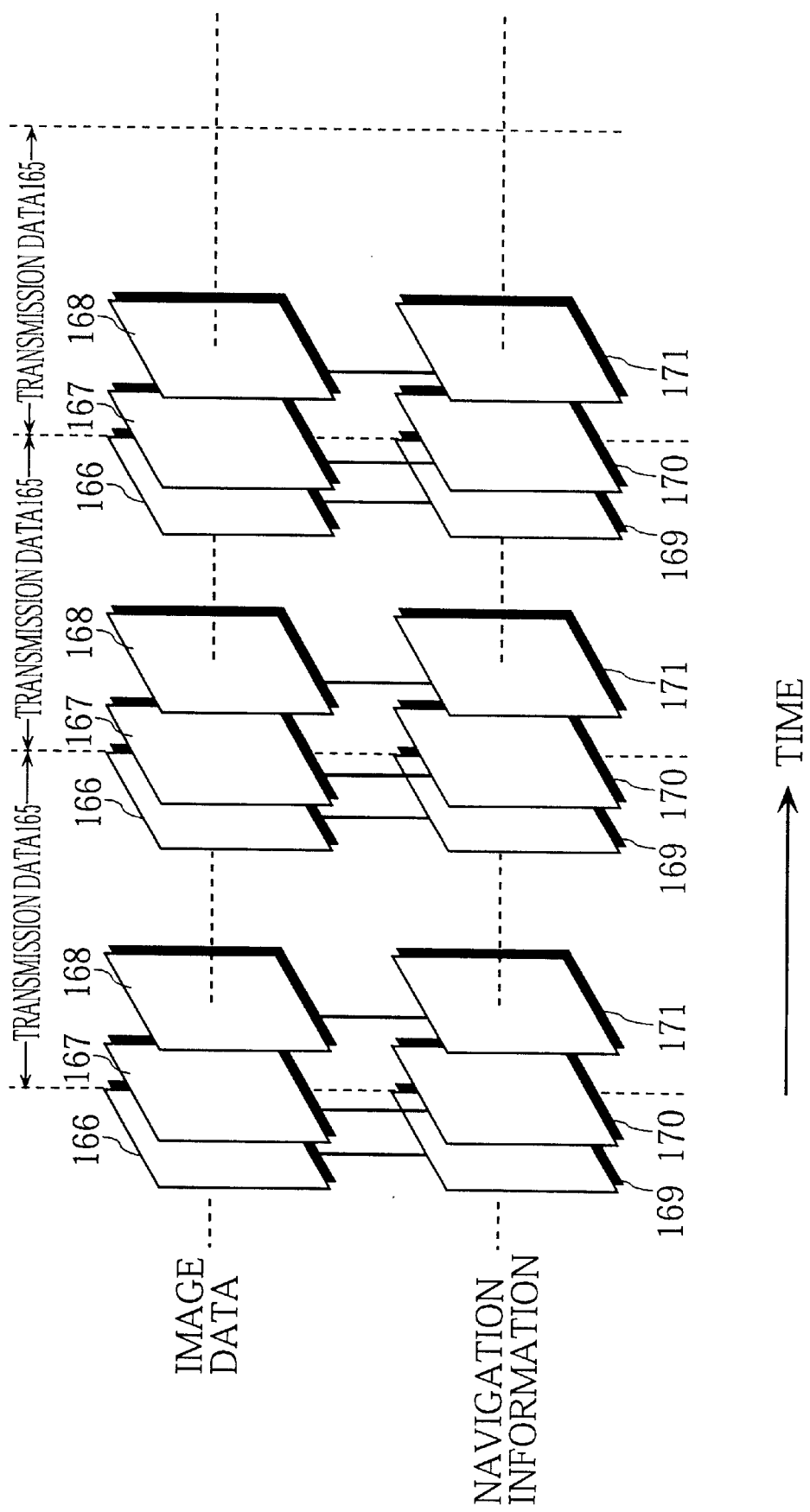
FIG. 3 a model representation of the transmission of the transmission data from the transmission apparatus.

FIG. 3 is a pictorial representation of the transmission of the transmission data 165 by the transmission apparatus. As shown in FIG. 3, the transmission apparatus repeatedly transmits the transmission data. From this it can be seen that the transmission data 165 is cyclically transmitted.

It should be noted here that while the image data and navigation information have been illustrated in frame format, the image data and corresponding navigation information are in fact digitized and multiplexed together, before being transmitted as an MPEG2 transport stream. FIGS. 2 and 3 are therefore somewhat different from the actual transmission data which is transmitted by the present system.

Also, while not illustrated in the drawings, each of the transmitted sets of image data 166 onwards is assigned identification information to distinguish the image data from the other sets of image data. In the same way, each set of navigation information 169 onwards is also assigned identification information to distinguish the navigation information from the other navigation information.

The receiver apparatus refers to these sets of identification information in the transmission data 165 and obtains the image data and navigation information which include the appropriate identification information. The obtained information is then reproduced and displayed as one content, such as the content 151 shown in FIG. 1. Here, the obtained navigation information, such as the navigation information 171, is stored in readiness for user operations.

The following is a description of several embodiments of the digital broadcasting system to which the present invention relates, with reference to the drawings.

First Embodiment

1-1 Outline of the Construction

Figure 4:
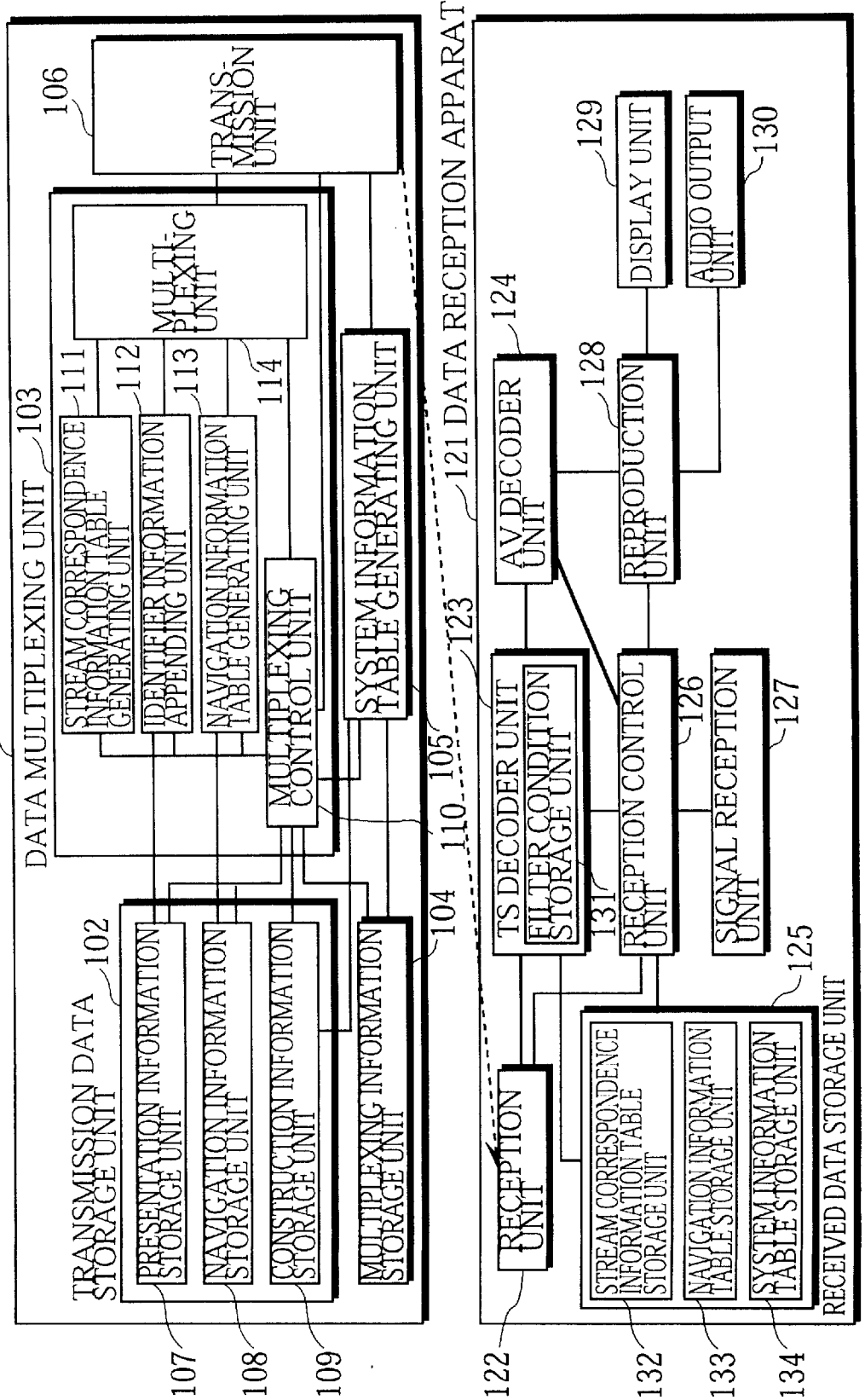
FIG. 4 shows the construction of the data transmission apparatus and the data reception apparatus in the first embodiment of the present invention.

FIG. 4 shows the construction of the digital broadcasting system of the first embodiment of the present invention. This digital broadcasting system is composed of a data transmission apparatus 101 and a plurality of data reception apparatuses 121.

The data transmission apparatus 101 is constructed to multiplex data for a plurality of contents, which feature hyperlinks to one another, into an MPEG2 transport stream and repeatedly transmit the multiplexed data. This data transmission apparatus 101 is composed of a transmission data storage unit 102, a data multiplexing unit 103, a multiplexing information storage unit 104, a system information table generating unit 105, and a transmission unit 106.

The data reception apparatus 121 is constructed to selectively obtain and reproduce a content from the MPEG2 transport stream transmitted by the data transmission apparatus 101, in accordance with an interactive operation made by the user. This data reception apparatus 121 is composed of a reception unit 122, a TS decoder unit 123, an AV decoder unit 124, a received data storage unit 125, a reception control unit 126, a signal reception unit 127, a reproduction unit 128, a display unit 129, and an audio output unit 130.

1-2 Data Transmission Apparatus 101

1-2-1 Construction of Transmission Data Storage Unit 102

The transmission data storage unit 102 is composed of a recording medium such as a magnetic disc, and stores data for a plurality of contents which compose one interactive program and construction information. This transmission data storage unit 102 includes a presentation information storage unit 107, a navigation information storage unit 108, and a construction information storage unit 109. Here, an "interactive program" refers to an "event" or "program" which is included in the MPEG2 transport stream used as the transmission data.

The transmission data storage unit 102 separately stores the image data (presentation information) and the navigation information in the transmission data 165 shown in FIG. 2. The transmission data storage unit 102 further stores a composition correspondence table which shows the correspondence between sets of image data and navigation information.

1-2-1-1 Presentation Information Storage Unit 107

Figure 5A:
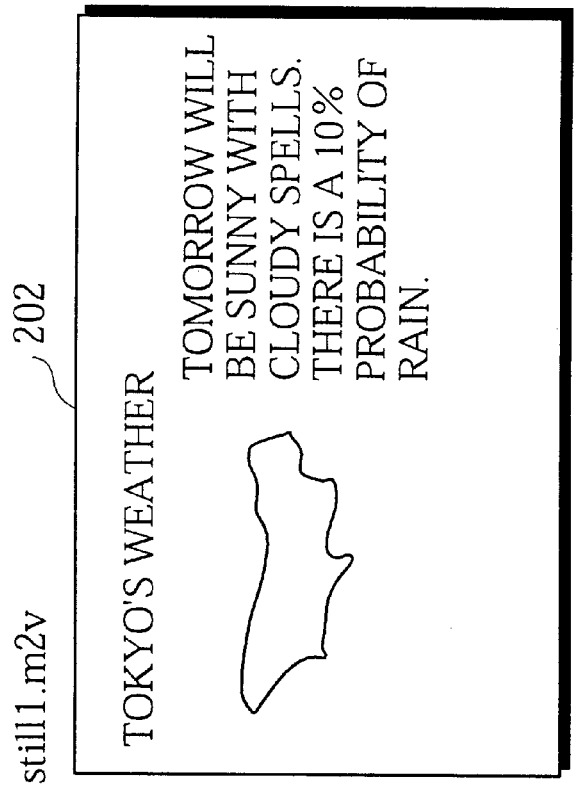
FIG. 5A shows an example of the image data stored by the presentation information storage unit in the present embodiment.
Figure 5B:
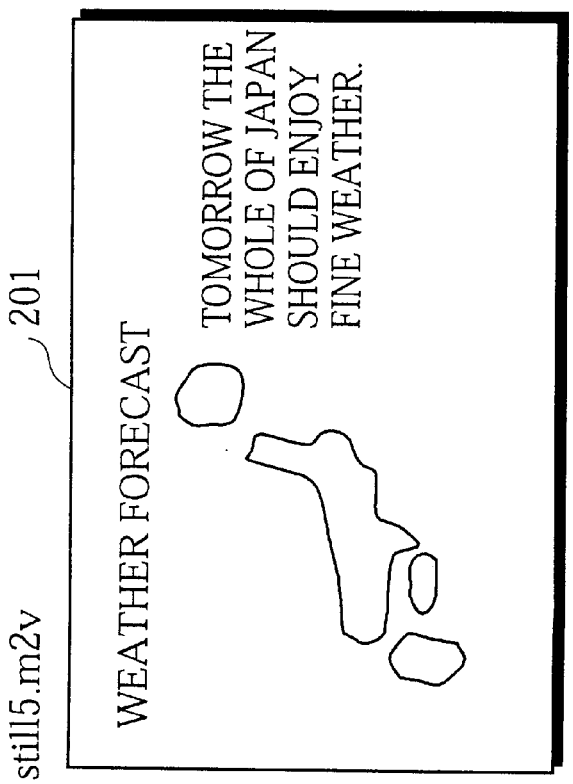
FIG. 5B shows another example of the image data stored by the presentation information storage unit in the present embodiment.

The presentation information storage unit 107 stores presentation information, such as image data and audio data, which is included in each content. FIGS. 5A and 5B show sets of still image data which are examples of the presentation information for contents 153 and 151. FIG. 5A shows the still image data 201 which is given the filename "still5.m2v", while FIG. 5B shows the still image data 202 which is given the filename "still1.m2v". These sets of still image data 201, 202 are stored having been digitally encoded according to ISO/IEC 13818-2 (MPEG2 video) standard. However, other encoding methods for image data may be used.

1-2-1-2 Navigation Information Storage Unit 108

The navigation information storage unit 108 stores the navigation information which is included in the transmitted contents. This navigation information can include hyperlink information for links to other contents, and describes objects which allow the user to interactively select link destinations. An example of this navigation information is shown in FIG. 6, with the figure showing the navigation information 301 of content 153 which has been given the filename "navi5.nif".

Figure 6:
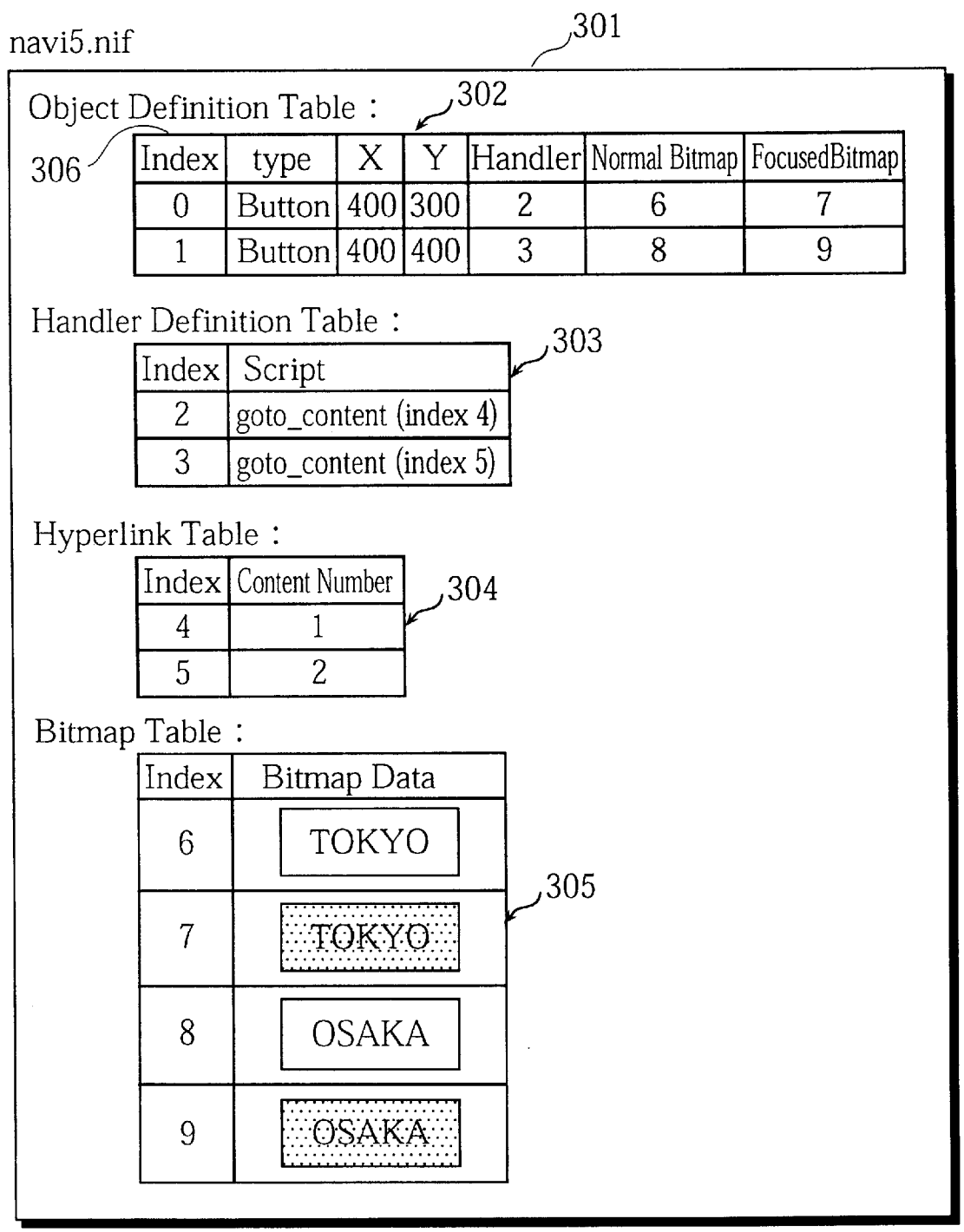
FIG. 6 shows an example of the navigation information which is stored in the navigation information storage unit of the present embodiment.

It should be noted that information showing that the still image data 201 shown in FIG. 5A and the navigation information 301 shown in FIG. 6 form one content 153 is given in the construction correspondence table 501 shown in FIG. 8. This is described in more detail later in this text.

The navigation information 301 includes an object definition table 302, a handler definition table 303, a hyperlink table 304, and a bitmap table 305 which are each given in table format.

The object definition table 302 is a list of information which shows the type and attributes of graphic objects such as buttons that are to be displayed on the display screen. The "Index" column in the object definition table 302 shows an index number. The "Type" shows the type used to classify the graphic objects. The values in the "X"and "Y" columns show the respective X and Y coordinates of the standard display position on the display screen. The "Handler" column shows the index number of the handler which is to be activated by the data reception apparatus 121 when the object shown by the present index number is selected by the user. The "Normal Bitmap" column shows the index number of the bitmap for when the object is displayed in a normal state, while the "Focused Bitmap" column shows the index number of the bitmap when the object is displayed in a selection state. Here, the "normal state" is a state where an object is merely displayed, while the "selection state"is the state which is attained by selecting one of the displayed objects.

As one example, on the index number "0" line of the object definition table 302, the type is "Button", with the coordinates of the top-left corner of the display position being given as X=400, Y=300, and the handler having the index number "2" being activated by the data reception apparatus 121 when the button is selected. In the normal state, the bitmap with the index number "6" is used to display the object, while in the selection state, the object is displayed using the bitmap with the index number "7". This is also the case for the line with the index number "1".

The handler definition table 303 shows the script which describes the operation to be executed by the data reception apparatus 121 when the user operation with the corresponding index number is performed.

As one example, the index number "2" line of the handler definition table 303 includes script "goto content (index 4)" indicating a switching to the content expressed by the index number "4". Here, such script may indicate other operations, such as the reproduction of a given sound.

The hyperlink table 304 shows the hyperlinks to contents with content numbers which are given for each index number.

As one example, the index number "4" line of the hyperlink table 304 indicates a hyperlink to the content which has the content number "1".

The bitmap table 305 shows, for each index number given in the object definition table 302, bitmap data which shows the graphics information to be displayed by the data reception apparatus 121 superimposed onto the image data of the presentation information.

As one example, the index number "6" corresponds to the bitmap data for the normal bitmap of the "button" with the index number "0" in the object definition table 302.

Figure 7:
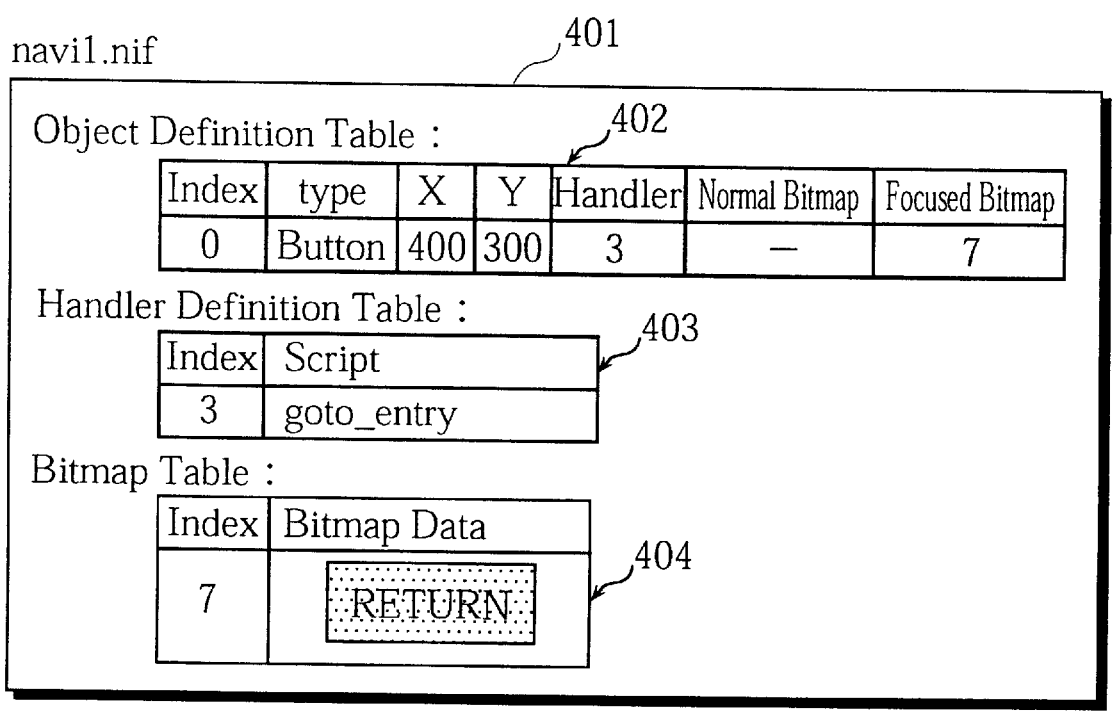
FIG. 7 shows another example of the navigation information which is stored in the navigation information storage unit of the present embodiment.

FIG. 7 shows the navigation information 401 which is given the filename "navi1.nif". This navigation information 401 includes an object definition table 402, a handler definition table 403, and a bitmap table 404.

The index number "0" line of the object definition table 402 has "–" as the index number of the normal bitmap, showing that no bitmap is defined for the normal state of this object. The object definition table 402 only defines one object, and since the object with the index number "0"is always displayed in the selection state, there is no need for a bitmap for the normal state.

The handler definition table 403 shows the script to be executed when the handler with the index number "3" is activated. The script for the index number "3" is "goto_entry" which represents a switching of display to an entry content that is to be displayed in the initial state. Here, the expression "entry content" refers to the content which is to be reproduced first when the reproduction of an interactive program is commenced.

The bitmap table 404 shows the bitmap data which has the index number "7".

1-2-1-3 Construction Information Storage Unit 109

The construction information storage unit 109 stores the construction information table and the entry information. The construction information table is information showing a combination of the presentation information and navigation information for each content. The entry information is information showing an entry content.

The construction information table 501 shown in FIG. 8 stores information which shows a combination of the presentation information and navigation information for each content, with each corresponding content number. These content numbers are used to identify each content among the plurality of contents stored in the transmission data storage unit 102. As shown in FIG. 8, the first line of construction information table 501 is for the content with the content number "0", which is composed of a combination of the still image data with the filename "still0.m2v" which is stored in the presentation information storage unit 107 and the navigation information with the filename "navi0.nif" which is stored in the navigation information storage unit 108. This is also the case for the other lines in the construction information table 501.

The entry information 502 shown in FIG. 8 shows that the entry content representing the first content to be displayed in the application stored in the transmission data storage unit 102 is the content with the content number "5".

1-2-2 Multiplexing Information Storage Unit 104

Figure 9:
FIG. 9 shows an example of the multiplexing information table stored in the multiplexing information storage unit of the present embodiment.

The multiplexing information storage unit 104 stores assigning information for resources, such as identifiers and areas when multiplexing the transmission data stored in the transmission data storage unit 102 into an MPEG2 transport stream for broadcasting, in the form of a multiplexing information table. An example of this multiplexing information table 601 is shown in FIG. 9.

The item "Bit_Rate" stored on line 1 of multiplexing information table 601 shows the assigned transfer rate when multiplexing the transmission data stored in the transmission data storage unit 102 into an MPEG2 transport stream. Here, 6 Mbps is assigned as the transfer rate.

The "original_network_id", the "transport_stream_id", the "service_id", and the "event_id" on lines 2 through 5 of the multiplexing information table 601 show the respective values of the "original_network_id", the "transport_stream_id", the "service_id", and the "event_id"when the application stored in the transmission data storage unit 102 is multiplexed into an MPEG2 transport stream as an event. In this multiplexing information table 601, the value "0x0001" has been assigned to each of these values, although it is customary for fixed values which have been assigned to different services to be used.

In a standard satellite digital broadcasting system, transmission of one or more MPEG2 transport streams is performed from a single satellite (network) using carrier waves on separate frequency bands. Here, each broadcast program is multiplexed into the MPEG2 transport stream having been assigned its own "original_network_id", "transport_stream_id", "service_id", and "event_id" in accordance with ETS 300 468 Standard (hereinafter, referred to as "DVB-SI Standard"). The original_network_id is a unique identifier which identifies the network. The transport_stream_ID is a unique identifier which identifies the transport stream in a network. The event_ID is a unique identifier which identifies one event on a transport stream. Here, an event is a collection of a number of components, and is the equivalent of the concept of a "program" which is used in conventional analog broadcasting.

A component is a stream (program element) identified by a PID (packet identifier) under ISO/IEC 13818-1 Standard (hereinafter referred to as "MPEG2 system standard"), and represents one compositional element of a program, such as video or audio. In the present embodiment, a service is a collection of sequences of events, which is the equivalent of one channel in conventional analog broadcasting.

These programs are broadcast on a digital broadcasting system in accordance with DVB-SI standard, and are indicated by a combination of an original_network_ID, a transport_stream_id, a service_id, and an event_id. As a result, programs can be specified in a manner which is common to all digital broadcasting systems. The details of this "original_network_id", "transport_stream_id", "service_id", and "event_id" are given in the documentation of DVB-SI Standard.

Lines 6 through 10 of the multiplexing information table 601 show the values of the PIDs assigned to each of the components which compose the event when the application stored in the transmission data storage unit 102 is multiplexed into a broadcast MPEG2 transport stream as an event. It should be noted here that PMT_PID and PCR_PID represent the values of the PIDs which are assigned to the PMT (Program Map Table) and PCR (Program Clock Reference), respectively. These are explained later in this text.

The NE_component_pid (navigation information component packet identifier) shows the value of the PID assigned to the component into which the navigation information stored in the navigation information storage unit 108 of the transmission data storage unit 102 is multiplexed.

The VE_information_component_pid (stream correspondence information component packet identifier) shows the value of PID assigned to the components into which the stream correspondence table generated by the stream correspondence information table generating unit 111 (described later in this text) is multiplexed.

The VE_component_pid (image data component identifier) shows the value of the PID assigned to the component into which the image data stored in the presentation information storage unit 107 is multiplexed.

It should be noted that in the present embodiment, the NE_component_pid, the VE_information_component_pid and the VE_component_pid are each assigned only one PID, although it is also possible for each to be assigned a plurality of PIDs. This is to say, while FIG. 6 shows the case when the NE_component_pid is "0x0082", the VE_information_component_pid is "0x0083", and the VE_component_pid is "0x0084", the NE_component_pid can be additionally assigned the value "0x0085", the VE_information component_pid the value "0x0086", and the VE_component_pid the value "0x0087".

Also, while not present in the present embodiment, when audio information is included in the transmission data, an AE_information_component_pid and an AE_component_pid will also be assigned.

1-2-3 Construction of the Data Multiplexing Unit 103

The data multiplexing unit 103 is composed of a multiplexing control unit 110, a stream correspondence information table generating unit 111, an identifier information appending unit 112, a navigation information table generating unit 113, and a multiplexing unit 114.

The data multiplexing unit 103 performs the processing described below to generate the transmission data 165 shown in FIG. 3.

1-2-3-1 Multiplexing Control Unit 110 (part 1)

On being activated by the transmission unit 106, the multiplexing control unit 110 first reads the construction information table 501 and the multiplexing information table 601 stored in the construction information storage unit 109 and the multiplexing information storage unit 104, before generating an identifier assigning table which assigns an image data identifier VE_id and a navigation information identifier NE_id to each content number of contents in the digital broadcast.

FIG. 10 shows content identifier assigning table 701 which is an example of this content identifier assigning table. In the content identifier assigning table 701, "orig_nw_id" 703 and "ts_id" 704 are the values of the identifiers of the network and the transport stream in which the image data, audio data, and navigation information that compose each content are transmitted. Similarly, "VE_svc_id" 705 and "VE_event_id" 706 represent the values of the identifiers for the service and event to which the image data belongs, while "VE_id" 709 shows the value of the identifier for uniquely identifying each set of image data in an event. "NE_svc_id" 707 and "NE_event_id" 708 represent the values of the identifiers for the service and event to which the navigation information belongs, with "NE_id" 710 showing the value of the identifier for uniquely identifying each set of navigation information in an event. "AE_svc_id" 711, "AE_event_id" 712, and "AE_id" 713 perform the same roles for audio data. Here, since contents are made up of combination of image data, audio data, and navigation information, each content can be uniquely identified by a combination of the identifiers described above.

In the content identifier assigning table 701, the values of the "original_network_ID", "transport_stream_ID", "service_ID", and "event_ID" in the multiplexing information table 601 stored in the multiplexing information storage unit 104 are respectively written into the "orig_nw_id" 703, the "ts_id" 704, the "VE_svc_id" 705, and the "VE_event_id" 706 corresponding to each content number 702. In the same way, the "service_id" and "event_id" of multiplexing information table 601 are written into the "NE_svc_id" 707 and "NE_event_id" 708.

The "VE_id" 709 and "NE_id" 710 are assigned the same value as the content number 702. However, the values of "VE_id" 709 and "NE_id" 710 do not need to match the value of the content number 702, so long as each they are assigned different values for each pairing of a set of image data and set of navigation information.

In the present embodiment, no audio data is present, so that no identifiers are assigned to "AE_svc_id" 711, "AE_event_id" 712, "AE_id" 713 and "–" is written into the table. When audio data is present, these values are assigned in the same way as for the image data and navigation information.

On completing the generation of the content identifier assigning table 701, the multiplexing control unit 110 generates the display image information identifier assigning table which assigns values to "PID", "component tag", and "stream_ID". An example of this display image information identifier assigning table, display image information identifier assigning table 801, is shown in FIG. 11. In the display image information identifier assigning table 801, the "VE_id" 709 is the same as that assigned in the content identifier assigning table 701, while the "PID" 803 is assigned the same value (here, the value "0x0084") as the "VE_component_pid" 607 in the multiplexing information table 601. Each "component_tag" 802 is assigned the same value for each value of the "PID" 803 (so that in the present example "0x00" is assigned to the "component_tag" 802 for each value "0x0084" of the "PID" 803). Each entry in the "stream_id" 804 column is assigned a hexadecimal value which is cyclically incremented by "1" between "e0" and "ef". Finally, the filename of the image data which is identified by this value of "VE_id" 709 and which is stored in the presentation information storage unit 107 is written into the image data file column 805.

It should be noted here that when a plurality of identifiers are assigned to the VE_component_pid of FIG. 9, the "PID" and "stream id" can be assigned in the manner described below. First, each value of "PID" is set by extracting one value from the VE_Component pid, while the "stream id" is set a hexadecimal value which is incremented between "e0" and "ef". After each set of stream ids, a new VE_component_pid is extracted from the multiplexing information table and is set in the "PID" 803. When there are no more new values of VE_component_pid, the process returns to the value of the VE_component_pid that was assigned first. Here, a different value is set in the "component tag" 802 for each PID 803.

In the present embodiment, all sixteen of the possible values between "e0" and "ef" are used as values of the stream_id for image data, although it is equally possible for only some of such possible values to be used. For audio data, thirty-two hexadecimal values between "c0" and "df" may be used for stream_ids in accordance with MPEG2 standard.

It should be noted that the value of the "component_tag" 802 is used to indirectly refer to the "PID". As described above, the."component_tag" 802 may be set any values which one-to-one correspond to values of the PID, with the correspondence between component tags and PIDs being written into the PMT which is described later in this text. Here, if the value of the PID is not found directly from the navigation information or stream correspondence information, but is instead indirectly found using the "component_tag", it becomes no longer necessary to change the navigation information or stream correspondence information when multiplexing the data with other programs, even when the value of the PID is changed by the transmission unit 106 (described later).

On completing the generation of the display image information identifier assigning table 801, the multiplexing control unit 110 gives an indication to the stream correspondence information table generating unit 111 to generate the stream correspondence table, an indication to the identifier information appending unit 112 to add the identifier VE_id to private area of the image data, and an indication to the navigation information table generating unit 113 to generate a navigation information table.

1-2-3-2 Identifier Information Appending Unit 112

On receiving an indication from the multiplexing control unit 110 to add identifier information, the identifier information appending unit 112 retrieves the image data stored in the presentation information storage unit 107. The identifier information appending unit 112 then writes the image data identifier VE_id into the private area of the retrieved image data bitstream. It should be noted here that the identifier information appending unit 112 obtains this identifier VE_id by referring to the display image information identifier assigning table 801 generated by the multiplexing control unit 110. The identifier information appending unit 112 then adds a filename to the image data bitstream with the appended VE_id and stores it in a storage region (not illustrated).

Figure 12:
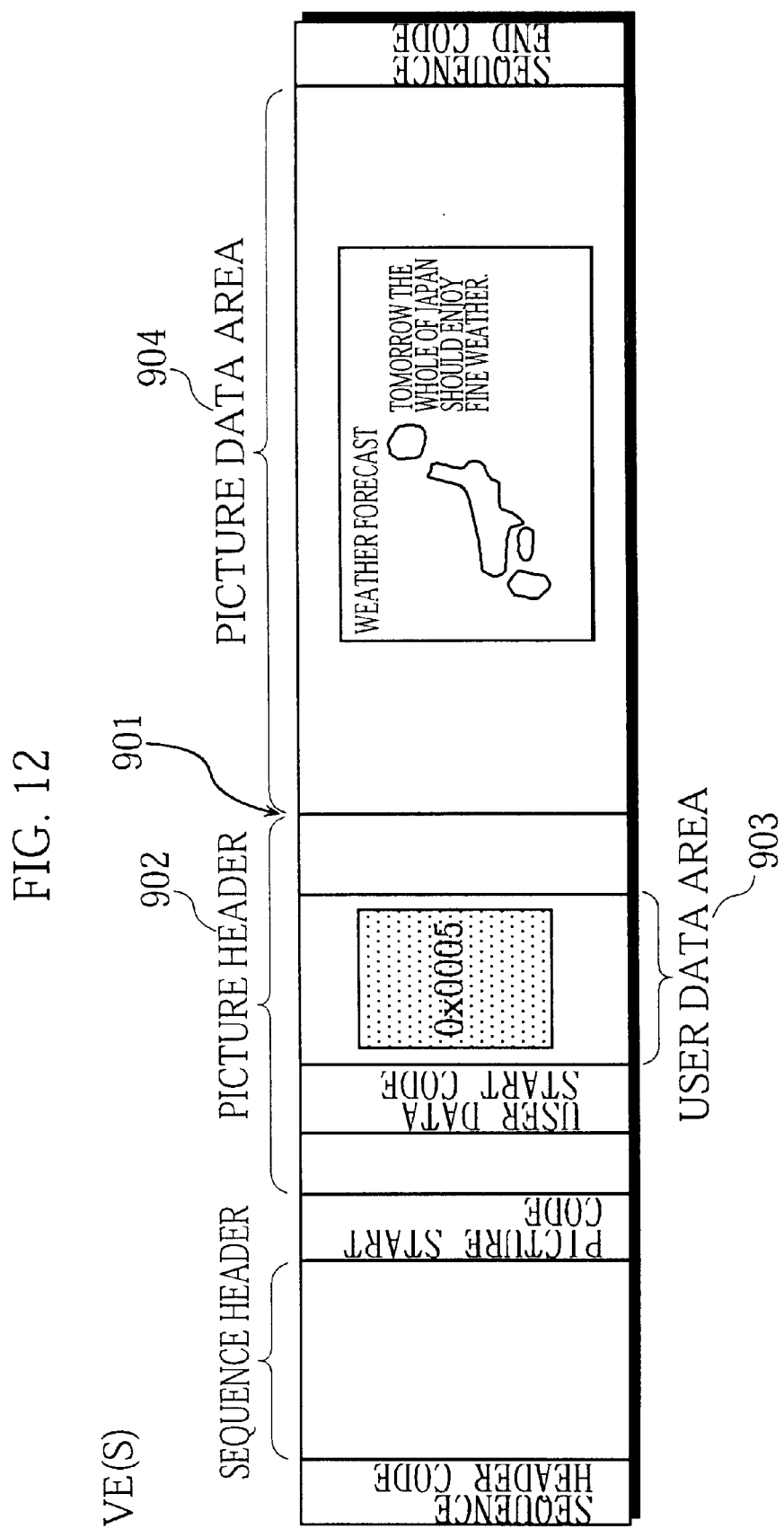
FIG. 12 shows the state when the identifier information appending unit of the present embodiment has appended the identifier VE_id to the private area of the bitstream for the image data.

FIG. 12 shows a bitstream 901 which is an example of the image data with the filename "VE(5)" to which identifier information has been appended. This bitstream 901 is encoded according to MPEG2 standard, with the value "0x0005"of the VE_id being recorded in the user data area 903 of the picture header 902. The still image data 201 shown in FIG. 5A, meanwhile, is recorded in the picture data area 904. Once identifier information has been appended to every set of image data, the identifier information appending unit 112 gives the multiplexing control unit 110 an indication showing that the appending process has been completed.

It should be noted here that while the present embodiment describes the case when the VE-id is written into the user data area, it may instead be written into any area which may be used for recording private data.

1-2-3-3 Navigation Information Table Generating Unit 113

On receiving an indication to generate the navigation information table, the navigation information table generating unit 113 reads the navigation information stored in the navigation information storage unit 108. When the read navigation information includes a hyperlink table, the navigation information table generating unit 113 refers to the content identifier assigning table 701 for the information regarding link destinations which are expressed using content numbers. The navigation information table generating unit 113 then converts all of the identifiers to generate the navigation information table. When no hyperlink table is included, the navigation information table generating unit 113 generates the navigation information table using the original navigation information as it is, changing only the filenames. The generated navigation information is then stored in a storage area (not-illustrated).

FIG. 13 shows the generated navigation information table 1001 which has the filename "NVT(5)". This navigation information table 1001 has been generated from the navigation information with the filename "navi5.nif" which was shown in FIG. 6. The navigation information table 1001 includes the object definition table 1002, the handler definition table 1003, the hyperlink table 1004, and the bitmap table 1005.

It should be noted here that the omission of identifiers and the inclusion of "–" marks in the columns such as "orig_nw_id" of the hyperlink table 1004 are due an omission made when the link source and link destination of a content are the same. By omitting items in this way, the storage area used by the navigation information table can be reduced. If the link destination is a different service, values will be written into each of the "VE_service_id", "VE_event_id", "NE_service_id" and "NE_event_id". In the illustrated example, the values of the "VE_id" and "NE_id" for the index number "4" are both written in as "0x0001" by referring to the content identifier assigning table 701, while the values of the "VE_id" and "NE_id" for the index number "5" are both written in as "0x0002".

FIG. 14 shows the navigation information table 1101 for the filename "NVT(1)". This navigation information table 1101 has been generated from the navigation information "navi1.nif" shown in FIG. 7, and does not include a hyperlink table, so none has been shown.

1-2-3-4 Stream Correspondence Information Table Generating unit 111

On receiving an indication from the multiplexing control unit 110 to generate a stream correspondence table, the stream correspondence information table generating unit 111 refers to the display image information identifier assigning table 801 and generates a stream correspondence table for each set of image data. These stream correspondence tables are used to extract sets of image data from the stream transmitted to the data reception apparatus 121 from the data transmission apparatus 101.

FIG. 15A shows the stream correspondence table [VET (5)] 1201 which is used by the data reception apparatus 121 to extract the image data "VE(5)". The item "first_pts" in this stream correspondence table 1201 represents the reproduction starting time information in units of one ninety-thousandth of one second for the time at which the first frame in the corresponding image data is to be reproduced. This "first_pts" can be obtained, as one example, using the formula given below as Formula 1.

$$\text{first\_pts}(N) = \left[\sum_{x=0}^{N} \{S\_VE(x) + S\_NVT(x) + S\_VET * R\}/B\right] * 90000 \quad \text{Formula 1}$$

Here, S_VE(x) is the size when the image data VE(x) stored in a storage area of the identifier information appending unit 112 has been converted into a transport stream packet in accordance with MPEG2 system standards. S_NVT(x) is the size when the navigation information table NVT(x) stored in a storage area of the navigation information table generating unit 113 has been converted into a transport stream packet. S_VET is the size when one stream correspondence table stored in a storage area of the stream correspondence information table generating unit 111 has been converted into a transport stream packet. Here, these sizes are expressed as numbers of bits. Here, the variable "R" represents the number of times a stream correspondence table has been multiplexed, and is an integer in the range from "1" to "(P*S)". The variable "P" is the number of PIDs which have been assigned to each component which has been allocated by the multiplexing information storage unit 104 for transferring the image data, the value of P being "1" in the present embodiment. The variable "S" represents the number of different stream_id values which are used in the display image information identifier assigning table 801, with this being "16" in the present embodiment. Finally, the variable "B" represents the bit rate, which is "6 Mbps" in the present embodiment.

It should be noted here that the S_VE(x) is found by the adding the sizes of the PES packet header and the trailer information which are required by each PES packet, and the sizes of the transport packet header and trailer information part which are required by each transport packet to the size of VE(x). S_NVT(x) is found by adding the sizes of the section header and trailer header required by each section and the sizes of the transport packet header and trailer information part which are required by each transport packet to the size of NVT(x). S_VET, meanwhile, is found by adding the sizes of the section headers and the like to the size of the VET, in the same way as S_NVT(x). It should be noted here that in the present embodiment, all of the VETs are of the same size. A detailed description of the PES packet, the transport packet, and the sections is given in the documentation for MPEG2 system standard.

The "last_pts" in the stream correspondence table 1201 gives information for the time at which the final frame in the corresponding image data is to be reproduced as the reproduction end time. This "last_pts" is expressed in units of 1/90000 of one second. In the present embodiment, the image data is composed of still images, so that the "last_pts" (reproduction end time information) is the same as the "first_pts".

The "component_tag" and "stream_id" in stream correspondence table 1201 are set at the values of the component_tag and the stream_id assigned to the corresponding image data by referring to the display image information identifier assigning table 801.

FIG. 15B shows the first stream correspondence table 1202 for the image data, while FIG. 15C shows the fifteenth stream correspondence table 1203 for the image data.

It should be noted here that the time "0" which is the standard for the "first_pts" and the "last_pts" in the stream correspondence tables 1201, 1202, and 1203 is the time at which the data stored in the transmission data storage unit 102 is first multiplexed into the transport stream and transmitted.

In the present embodiment, the stream correspondence information table generating unit 111 is described as referring to the display image information identifier assigning table 801 and writing the value of the assigned component_tag into the stream correspondence table, although the value of the assigned VE_component_pid in the multiplexing information table 601 may be directly written in place of the value of the VE_component_pid.

1-2-3-5 Multiplexing Control Unit 110 (part 2)

On receiving notification from the identifier information appending unit 112, the navigation information table generating unit 113, and the stream correspondence information table generating unit 111 indicating that they have completed their respective processes, the multiplexing control unit 110 determines the number of contents "T" to be used as the unit for repetition. Here, put simply the number of contents used as the unit for repetition T is a total given by adding the number M of contents included in the transmission data 165 to the number of dummy contents, or more precisely is set at T where M≦P*S*n=T with M as the total number of contents stored in the construction information storage unit 109. As described above with reference to Formula 1, "P" is the number of PIDs which are assigned to a component for transferring the image data by the multiplexing information storage unit 104, while "S" is the number of stream_ids. Also, "n" is the smallest integer which enables the condition M≦T to be satisfied. In the present embodiment, P=1, S=16, and M=63, so that T=64. Note here that when the number of contents T in each repetition is greater than the total number of contents M, the multiplexing control unit 110 multiplexes T–M null packets of a size which is at least equal to the smallest content after first multiplexing all of the contents into the transport stream. By doing so, it is possible to maintain at least a predetermined interval D (at least (P*S–1) times the size of the smallest content) between the multiplexing positions of the image data and the stream correspondence table corresponding to the image data.

The multiplexing control unit 110 uses Formula 2 below to find the length L of one cycle of the number of contents T in each repetition. The value L is expressed in units of 1/90000 of one second and is the length of the transport stream when multiplexing all of the contents and null packets of a size equivalent to (T–M) contents into the transport stream at the bit rate B stored in the multiplexing information storage unit 104.

$$L = \left[\left[\sum_{x=0}^{M-1} \{S\_VE(x) + S\_NVT(x) + S\_VET * R\} + \{S\_VE(0) + S\_NVT(0) + S\_VET * R\} * (T-M)\right]/B\right] * 90000 \quad \text{Formula 2}$$

As described above, M and T are the total number of contents and the number of contents in one repetition, with S_VE(x), S_NVT(x), S_VET, R, and B being the same as defined in Formula 1.

The multiplexing control unit 110 sets the content counter i at "0" and sets the multiplexing start position pointer wp at "0". This value of "wp" shows the time from the first information position of the contents multiplexed into the transport stream.

The multiplexing control unit 110 next sets the value of the VET counter j at "0". The value of this VET counter j is then used to find the cycle number C and the content number N. The cycle number C is the integer of the quotient given by $\{i+(P*S)-1-j\} \div T$, while the content number is the remainder of $\{i+(P*S)-1-j\} \div T$. Following this, the multiplexing control unit 110 judges whether an Nth stream correspondence table VET(N) is stored in the stream correspondence information table generating unit 111, and if so, adds a value, which is a multiple of length L of one cycle of the number of contents T in one repetition and a number of cycles C, to the "first_pts" and "last_pts" of VET(N).

The multiplexing control unit 110 then instructs the multiplexing unit 114 to multiplex VET(N) into the transport stream. In doing so, the multiplexing control unit 110 informs the multiplexing unit 114 of the multiplexing start position wp and the bit rate B, as well as the value of the "VE_information_component_pid" in the multiplexing information table 601 as the PID value and the value of the "VE_id" corresponding to the content number N in the content identifier assigning table 701 as the table_id_extension.

When VET(N) is not stored in the stream correspondence information table generating unit 111, the multiplexing control unit 110 instructs the multiplexing unit 114 to multiplex a null packet with the same size as S_VET, and informs the multiplexing unit 114 of the multiplexing start position wp and the bit rate B.

After instructing the multiplexing unit 114 to perform multiplexing, the multiplexing control unit 110 calculates the multiplexing start position wp using the equation wp=wp+S_VET/B. After this, the multiplexing control unit 110 adds "1" to the value of the VET counter j and judges whether the VET counter j coincides with the value of the number of repeated multiplexing R in the stream correspondence table. When the values match, the multiplexing control unit 110 recalculates the number of cycles C and the contents number N, before continuing with the multiplexing process for VET(N).

On judging that the values do not match, the multiplexing control unit 110 calculates the number of cycles C and the contents number N according to the method described above and judges whether there is a content with the content number N stored in the identifier information appending unit 112 or in the navigation information table generating unit 113. On judging that such a content is being stored, the multiplexing control unit 110 instructs the multiplexing unit 114 to multiplex VE(N). At this point, the multiplexing control unit 110 informs the multiplexing unit 114 of the values of the multiplexing start position wp, the bit rate Bv(N), the PID, and the stream_id. Here, to find the values of the PID and the stream_id, the multiplexing control unit 110 fetches the values of the PID and of the stream_id from "PID" and the "stream_id" assigned to the image data whose "VE_id" is "N"from the display image information identifier assigning table 801. On the other hand, the multiplexing control unit 110 calculates the bit rate Bv(N) according to Formula 3 below.

$$\text{bit rate } Bv(N)=\{S\_VE(N)*B\}/\{S\_VE(N)+S\_NVT(N)\} \quad \text{Formula 3}$$

The symbols in the above Formula 3 are the same as those in Formula 1.

The multiplexing control unit 110 also instructs the multiplexing unit 114 to multiplex NVT(N). In doing so, the multiplexing control unit 110 informs the multiplexing unit 114 of the values of the multiplexing start position wp, the bit rate Bn(N), the PID, and the table_id_extension. Here, to find the value of the PID, the multiplexing control unit 110 refers to the multiplexing information storage unit 104 and extracts the PID which has been assigned to the component assigned to the transfer of the navigation information. To find the value of the table_id_extension, the multiplexing control unit 110 extracts the value of "NE_id" assigned to the contents identifier N from the content identifier assigning table 701. The multiplexing control unit 110, calculates the bit rate Bn(N) according to Formula 4 given below.

$$\text{Bit rate } Bn(N)=\{S\_NVT(N)*B\}/\{S\_VE(N)+S\_NVT(N)\} \text{ Formula 4}$$

The symbols in the above Formula 3 are the same as those in Formula 3.

The multiplexing control unit 110 next finds the multiplexing start position wp according to the formula $$[wp=wp+\{S\_VE(N)+S\_NVT(N)\}/B].$$

When content N is not stored, the multiplexing control unit 110 instructs the multiplexing unit 114 to multiplex a null packet of a size given as S_VE(0)+S_NVT(0). In doing so, the multiplexing control unit 110 informs the multiplexing unit 114 of the multiplexing start position wp.

While the above explanation gives the size of a null packet to be multiplexed as the combined size of S_VE(0) and S_NVT(0) for content number "0", the size of the null packet may instead be set at a size S_VE(k) +S_NVT(k) where this represents the smallest combined size out of all of the contents.

The multiplexing control unit 110 next finds the multiplexing start position wp according to the formula $$[wp=wp+\{S\_VE(0)+S\_NVT(0)\}/B].$$

The multiplexing control unit 110 next adds "1" to the value of the content counter i, recalculates the value of the VET counter j, and repeats the processing from the multiplexing of VET(N) onwards.

1-2-3-6 Multiplexing Unit 114

Figure 16:
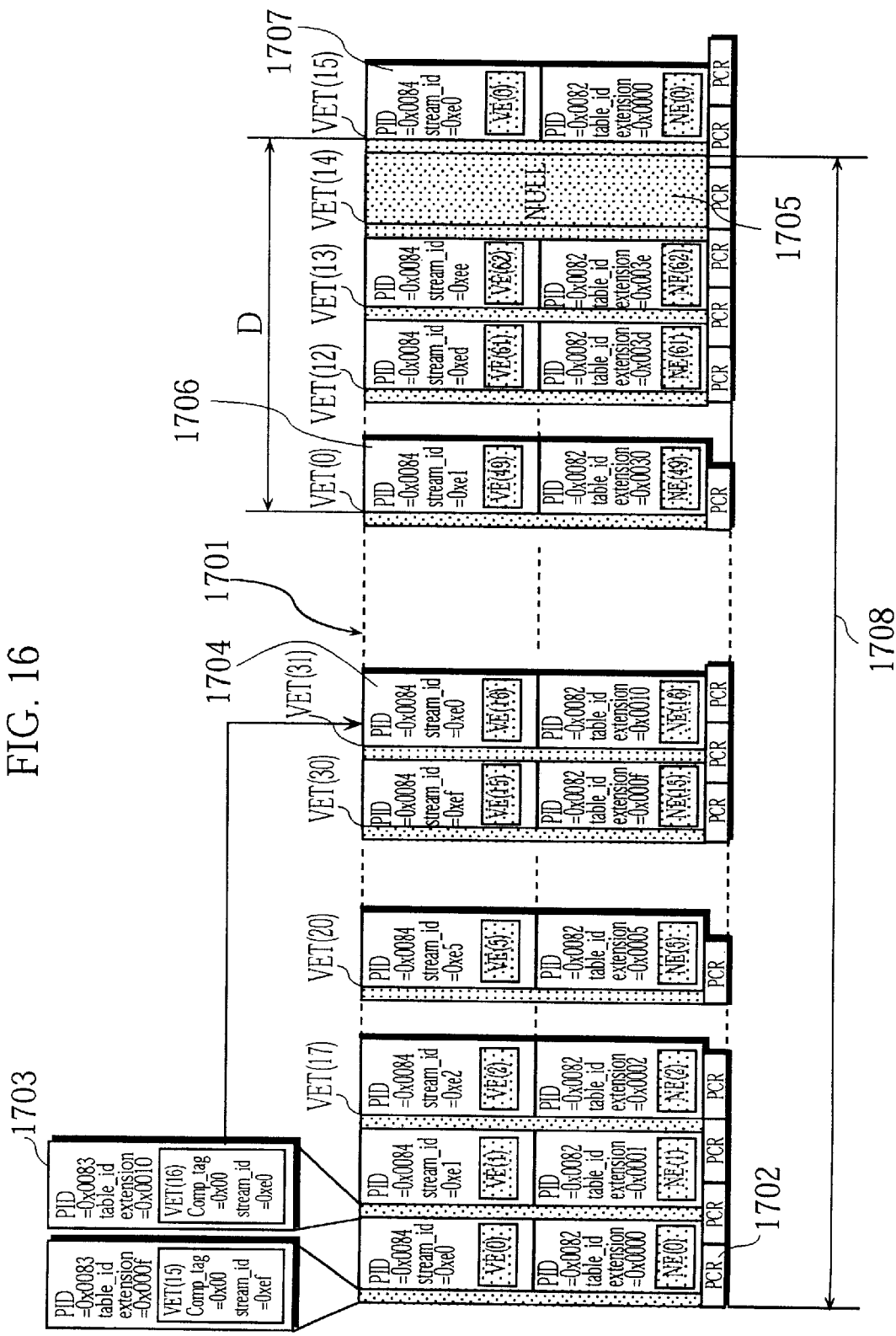
FIG. 16 is a model representation of a transport stream which has been multiplexed by the multiplexing unit of the present embodiment.
Figure 17:
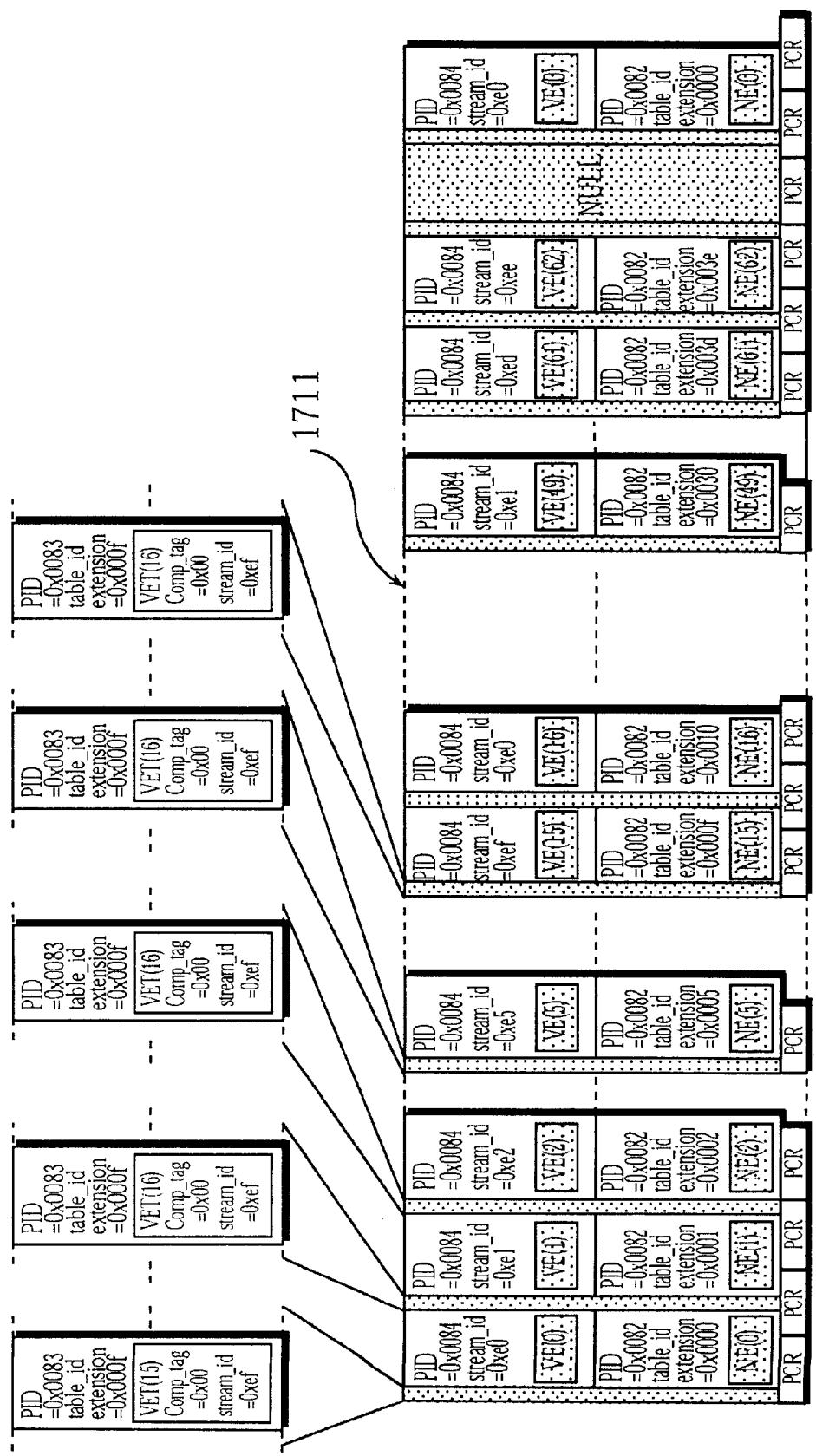
FIG. 17 is a model representation of another transport stream which has been multiplexed by the multiplexing unit of the present embodiment.

The multiplexing unit 114 multiplexes the transmission data 165 shown in FIG. 3 into an MPEG2 transport stream. FIGS. 16 and 17 show model representations of multiplexed streams where identification information has been added to the data shown in FIG. 3. This is described in detail below.

When instructed by the multiplexing control unit 110, the multiplexing unit 114 multiplexes data into an MPEG2 transport stream using a method which has been standardized according to MPEG2 system standards. On receiving instructions from the multiplexing control unit 110 to multiplex a stream correspondence table VET(N), the multiplexing unit 114 reads the stream correspondence table VET(N) from the stream correspondence information table generating unit 111 and multiplexes it into the transport stream at a position starting from the indicated multiplexing start position wp, using the indicated PID, table_id_extension, and bit rate B. On receiving an indication from the multiplexing control unit 110 to multiplex the image data VE(N), the multiplexing unit 114 reads the image data which has been appended with the corresponding identifier from the identifier information appending unit 112 and multiplexes the image data into the transport stream at a position starting from the indicated multiplexing start position wp, using the indicated PID, stream_id, and bit rate Bv(N). On receiving an indication from the multiplexing control unit 110 to multiplex the navigation information NVT(N), the multiplexing unit 114 reads the navigation information table from the navigation information table generating unit 113 and multiplexes it into the transport stream at a position starting from the indicated multiplexing start position wp, using the indicated PID, table_id_extension, and bit rate Bn(N). Also, on receiving an indication from the multiplexing control unit 110 to multiplex a null packet, the multiplexing unit 114 multiplexes a null packet of the indicated size at a position starting from the multiplexing start position wp at the indicated bit rate.

The multiplexing unit 114 multiplexes the PCR at the front of the generated transport stream with the initial value "0", using the PCR_PID indicated by the multiplexing control unit 110.

FIG. 16 shows an example of a transport stream generated by the multiplexing unit 114. Here, the 63 contents stored in the transmission data storage unit 102 have been multiplexed into this transport stream 1701. These 63 sets of image data have been assigned the values "0x0084" shown in the multiplexing information table 601 as their PID, with each set of image data having been assigned a value which has been cyclically incremented between "0xe0" and "0xef".

Each stream correspondence table VET(N) has been assigned the value "0x0083" given in the multiplexing information table 601 as its PID, and a value each to the image data identifier "VE_id" as its table_id_extension. As shown in FIG. 16, one stream correspondence table VET(N) is multiplexed for each set of image data VE(N). Accordingly, the number of repeated multiplexing R for the stream correspondence table is "1".

The sixty-three navigation information tables NE(0) to NE(62) are multiplexed by the multiplexing unit 114 having been each assigned the value "0x0082" given in multiplexing information table 601 as their PID, and the value of the navigation information identifier "NE_id" as their table_id_extension. PCRs 1702, which include standard information for time, are also multiplexed into the transport stream.

As one example, the transmission data 165 shown in FIG. 3 extends between the stream correspondence table VET(15) to the null packet 1705, as shown in FIG. 3.

Each stream correspondence table VET(N) in the transport stream 1701 is multiplexed at a position at the equivalent of fifteen sets of image data ahead of the corresponding image data VE(N). Since each set of image data is cyclically assigned one of sixteen stream_ids, no image data which has the same PID and stream_id as image data VE(N) will be multiplexed between the stream correspondence table VET(N) and the corresponding image data VE(N). As a result, the data reception apparatus 121 is able to extract the desired image data VE(N) from the transport stream by first obtaining the stream correspondence table VET(N) and then separating the first set of image data in the transport stream which has been assigned the indicated PID and stream_id, out of the many sets of image data with this PID and stream_id.

As one example, there is no image data with the PID "0x0084" and the stream_id "0xe0" between the stream correspondence table VET(16) 1703 and the image data VE(16) 1704. Accordingly, despite there being four sets of image data VE(0), VE(16), VE(32), and VE(48) with the same PID "0x0084" and stream_id "0xe0", the data reception apparatus 121 will separate only the first set of image data with the indicated PID and stream_id which appears after the stream correspondence table VET(16) 1703, which means that the desired image data VE(16) will be obtained.

The transport stream 1701 is also composed so that data equivalent to fifteen contents is multiplexed between each stream correspondence table VET(N) and its corresponding image data VE(N). Accordingly, it can be ensured that the time D taken from the appearance of the stream correspondence table VET(N) to the appearance of the corresponding image data VE(N) is at least the time taken by the transmission of fifteen contents of the smallest size. Accordingly, if the data reception apparatus 121 can perform the necessary processes for the interpretation of the stream correspondence table and the preparation for separating the image data within this time period D, proper reproduction of the desired image data can be ensured. In the present example, a null packet 1705 whose size is equivalent to one content has been multiplexed into the transport stream 1701 to ensure that time D is maintained at a value equivalent at least the transmission time of fifteen contents, even at a part of the transport stream near the end of a transmission cycle. By doing so, it can be ensured that a time interval which is equivalent to the transmission of a least fifteen of the smallest contents is present, even when a stream correspondence table VET(N) and its corresponding image data VE(N) are in different transmission cycles, such as VET(0) 1706 and VE(0) 1707 in FIG. 16.

FIG. 17 shows an example of the transport stream generated by the multiplexing unit 114 when the number of repeated multiplexing R for the stream correspondence tables is "16".

The transport stream 1711 is constructed so that each stream correspondence table VET(N) is multiplexed sixteen times between a position which is the equivalent of fifteen contents ahead of the corresponding image data VE(N) and the multiplexing start position of this image data VE(N). As a result, the data reception apparatus 121 first obtains the stream correspondence table and, in reproducing the corresponding image data VE(N), can reproduce the desired image data faster the shorter the time D between the stream correspondence table VET(N) and the corresponding image data. However, if the time D is reduced, the data reception apparatus 121 has to interpret the stream correspondence table and perform the necessary preparations for the separation of the image data faster. Here, if each stream correspondence table is repeatedly multiplexed, as shown in the transport stream 1711, the data reception apparatus 121 will be able to obtain the stream correspondence table from a position which is close to the image data when the load of the data reception apparatus 121 is light, allowing high-speed reproduction, or from a position which is further from the image data when the load of the data reception apparatus 121 is great. By performing such control, proper reproduction of the image data can be maintained.

On generating a transport stream, such as transport stream 1701 shown in FIG. 16, the multiplexing unit 114 outputs the stream in order to the transmission unit 106.

1-2-4 System Information Table Generating unit 105

The system information table generating unit 105 refers to the multiplexing information storage unit 104 and generates the NIT (Network Information Table), the EIT (Event Information Table), the SDT (Service Description Table), the PAT (Program Association Table), and the PMT (Program Map Table). These tables compose the program specification information which is used by the data reception apparatus 121 in selecting a program.

On being instructed by the multiplexing control unit 110, the system information table generating unit 105 refers to the multiplexing information storage unit 104 and generates the NIT, the EIT, the SDT, and the PAT in accordance with DVB-SI standard and MPEG2 system standard. These tables include information which is required by the data reception apparatus 121 to select the events which are composed of the data stored in the transmission data storage unit 102.

The NIT stores information which relates to the transfer path for each transport stream transmitted from a network identified as the specified network. An example, NIT 1301, of the NIT generated by the system information table generating unit 105 is shown in FIG. 18A. In this example, the transport stream identified by the transport_stream_id "0x0001" for the original_network_id "0x0001" is transmitted on the network identified by the network_id "0x0001", with the "transfer preface" expressing the frequency and modulation method of the transmission.

The SDT stores information, such as service names, for each service included in a specified transport stream. An example, SDT 1302, of the SDT generated by the system information table generating unit 105 is shown in FIG. 18B. In this example, the service identified by the service_id value "0x0001" in the transport_stream_id "0x0001" is included, with information such as the service names being written into the column headed "Service name and other information".

The EIT stores information, such as event names, starting times, and ending times, for each of the events in a specified service. An example, EIT 1303, of the EIT generated by the system information table generating unit 105 is shown in FIG. 18C. In this example, the event identified by the event_id "0x0001" on the service identified by the service_id "0x0001" is included, with information such as the event name being written into the column headed "Event name and other information".

The PAT includes information for the PIDs of the PMT (Program Map Table) for each program included in a specified transport stream. An example, PAT 1401, of the PAT generated by the system information table generating unit 105 is shown in FIG. 19. In this example, the program identified by the program_no "0x0001" in the transport stream with the transport_stream_id "0x0001" is included, with the PID of this PMT being given as "0x0080". Here, the program_no matches the service_id, and a "program" is equivalent to an "event".

The system information table generating unit 105 refers to the multiplexing information storage unit 104, the multiplexing control unit 110, and the construction information storage unit 109 and generates, in accordance with MPEG2 system standards, the PMTs corresponding to the multiplexed programs which use the image data stored in the transmission data storage unit 102. An example of a PMT generated by the system information table generating unit 105 is shown in FIG. 20. In this example, "program_number" is a value showing the program number of a program in which transmission data is multiplexed, with the value "0x0001" of the "service_id" in the multiplexing information table 601 being extracted and written in as this item.

The "PCR_PID" in FIG. 20 is a value showing the PID of the packet which includes the clock information (PCR) which is used as the standard for decoding the present program. In the present example, the value "0x0081" of the "PCR_PID" in multiplexing information table 601 is extracted and is written into this item.

Figure 21A:
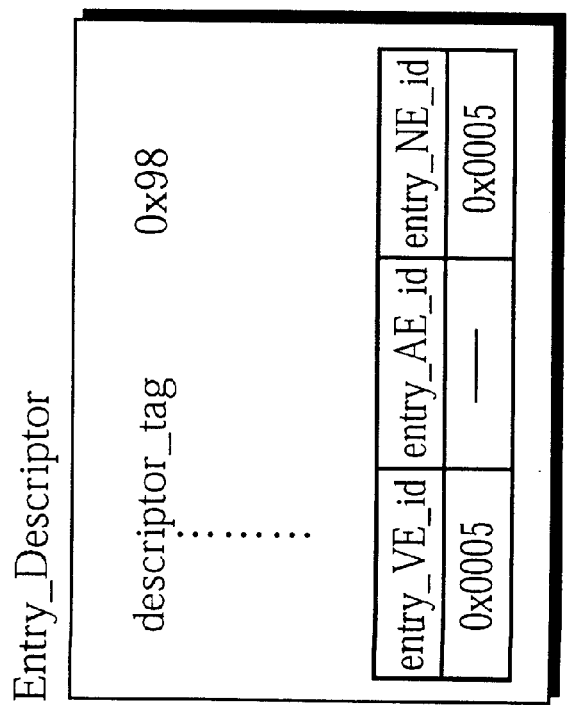
FIG. 21A shows the details of the Entry_Descriptor in the PMT generated by the system information table generating unit of the present embodiment.

The "Entry_Descriptor" in FIG. 20 is the descriptor which includes information for the identifier of an entry content which is the first to be reproduced when the present program is selected. An example of this "Entry_Descriptor" is shown in FIG. 21A. In this example, the "descriptor_tag" is an identifier showing the type of descriptor, with this value being given a value (here, "0x98") which is predetermined for an "Entry_Descriptor".

In FIG. 21A, the "entry_VD_id", the "entry_AE_id", and the "entry_NE_id" show the values of the identifiers which respectively identify the image data, audio data, and navigation information which compose the entry content. The system information table generating unit 105 refers to the entry information 502 in the construction information storage unit 109 and obtains the content number "5" of the entry content, before referring to the content identifier assigning table 701 of the multiplexing control unit 110 and extracting the value "0x0005" of the "VE_id", the value "–" of the "AE_id", and the value "0x0005" of the "NE_id" corresponding to the content number "5". The system information table generating unit 105 then writes the respective values into the "entry_VE_id", the "entry_AE_id", and the "entry_NE_id".

The list table 1502 in the PMT 1501 has a column "PID" which shows the values of the PIDs which identify each of the components which compose the present program, a column "stream type" which shows the type of data transferred in each component, and a "descriptor" column which shows information for the descriptors which are linked to each component.

Figure 21B:
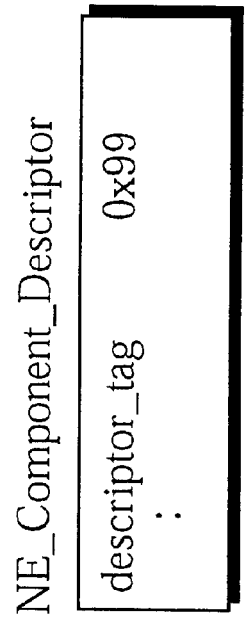
FIG. 21B shows the details of the NE_Component_Descriptor in the PMT generated by the system information table generating unit of the present embodiment.

For components which are used to transfer navigation information, the system information table generating unit 105 first extracts the value "0x0082" corresponding to the "NE_component_pid" from the multiplexing information table 601 and writes this into the "PID" column of the PMT 1501, before writing in the value "0x05" as the "stream type", showing that the type of data transferred by this component is section data. The system information table generating unit 105 also writes NE_Component_Descriptor into the "descriptor" column showing that this component is used to transfer navigation information. An example of an "NE_Component_Descriptor" is shown in FIG. 21B. In this example, a value (here, "0x99") which is predetermined for an "NE_Component_Descriptor" is written into the descriptor_tag.

Figure 21C:
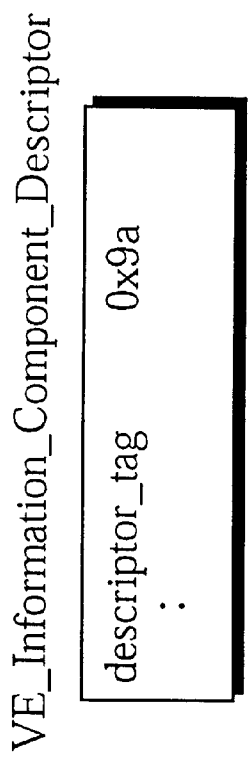
FIG. 21C shows the details of the VE_Information Component_Descriptor in the PMT generated by the system information table generating unit of the present embodiment.

The system information table generating unit 105 then extracts a value "0x0083" corresponding to the "VE_information_component_pid" from the multiplexing information table 601 and writes it into the "PID" column of the list table 1502, before writing the value "0x05", showing that the type of data to be transferred in this component is section data, into the "stream_type" column of list table 1502. The system information table generating unit 105 also writes in VE_Information_Component_Descriptor, showing that this component is used to transfer a stream correspondence table, into the "descriptor" column of the list table 1502. An example of this "VE_Information_Component_Descriptor" is shown in FIG. 21C. In this example, the value (here, "0x9a") which is predetermined for a "VE_Information_Component_Descriptor" is written in as the "descriptor_tag".

Figure 21D:
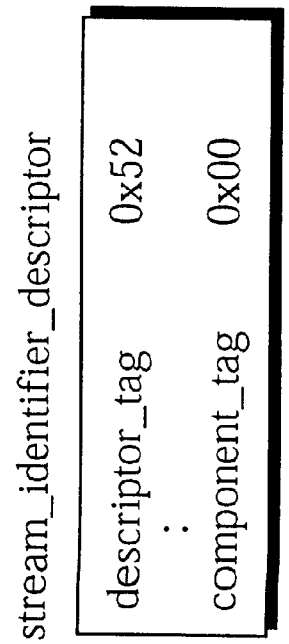
FIG. 21D shows the details of the stream_identifier_descriptor in the PMT generated by the system information table generating unit of the present embodiment.

The system information table generating unit 105 then extracts the value "0x0084" corresponding to the "VE_component_pid" from the multiplexing information table 601 for the components used for transferring image data and writes the value as the "PID" in the list table 1502. The system information table generating unit 105 also writes the value "0x02" into the "stream_type" column showing that the type of data transferred in this component is a video stream, and writes in "stream_identifier_descriptor" into the "descriptor" column showing the value of the component tag of this component. An example of a "stream_identifier_descriptor" is shown in FIG. 21D. Here, a value (here, "0x52") which is predetermined for a "stream_identifier_descriptor" is written into the "descriptor tag". Finally, the system information table generating unit 105 refers to the display image information identifier assigning table 801 in the multiplexing control unit 110 and extracts the value "0x00" of the component_tag assigned to the component whose "PID" is "0x0084" and writes this into the "component_tag".

1-2-5 Transmission Unit 106

The transmission unit 106 includes a scheduler, and is activated by the multiplexing control unit 110 at a predetermined time before the transmission start time of an event, such as five minutes before transmission. When the transmission start time is reached, the transmission unit 106 repeatedly multiplexes information such as the NIT, PAT, PMT, SDT, and EIT generated by the system information table generating unit 105 into the transport stream outputted by the multiplexing unit 114 at a predetermined interval using predetermined PIDs in accordance with DVB-SI standard and MPEG2 system standard. The transmission unit 106 then performs modulation and other processes, before transmitting the data to a plurality of data reception apparatuses 121.

Figure 22:
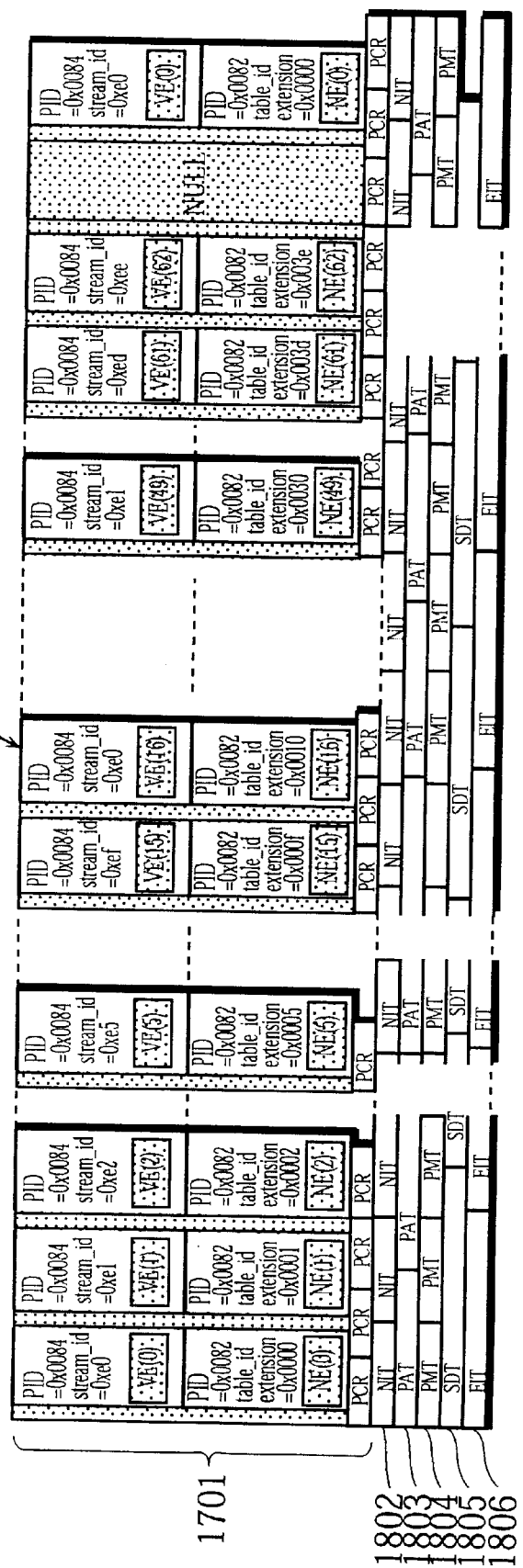
FIG. 22 is a model representation of the transport stream multiplexed by the transmission unit of the present embodiment.

FIG. 22 gives a model representation of a multiplexed transport stream 1801. In this example, the NIT 1802, the PAT 1803, the PMT 1804, the SDT 1805, and the EIT 1806 have been additionally multiplexed into the transport stream 1706 multiplexed by the multiplexing unit 114.

1-2-6 Operation of the Data Transmission Apparatus 101

Figure 23:
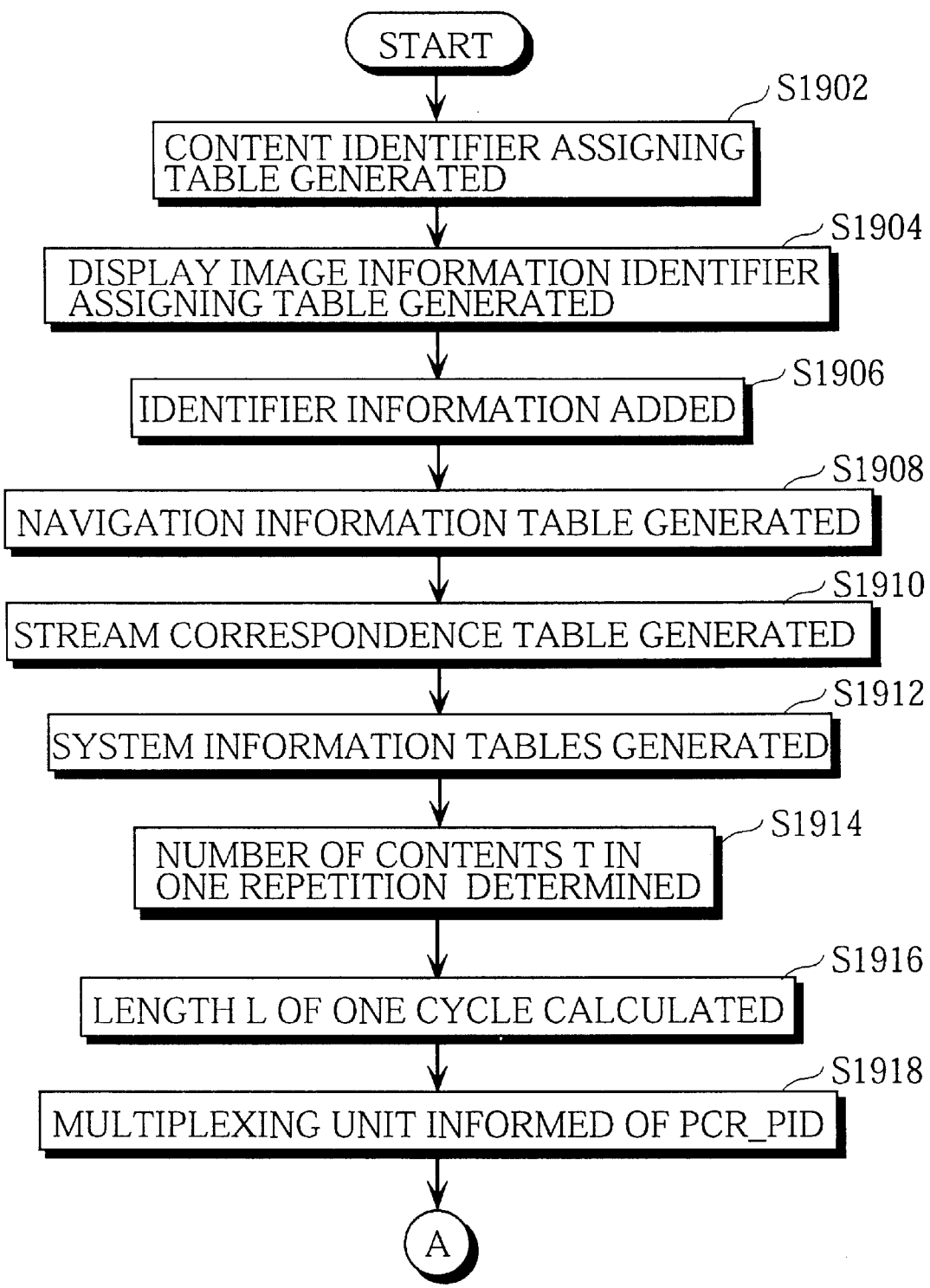
FIG. 23 is a flowchart showing the operation of the data transmission apparatus of the present embodiment.
Figure 24:
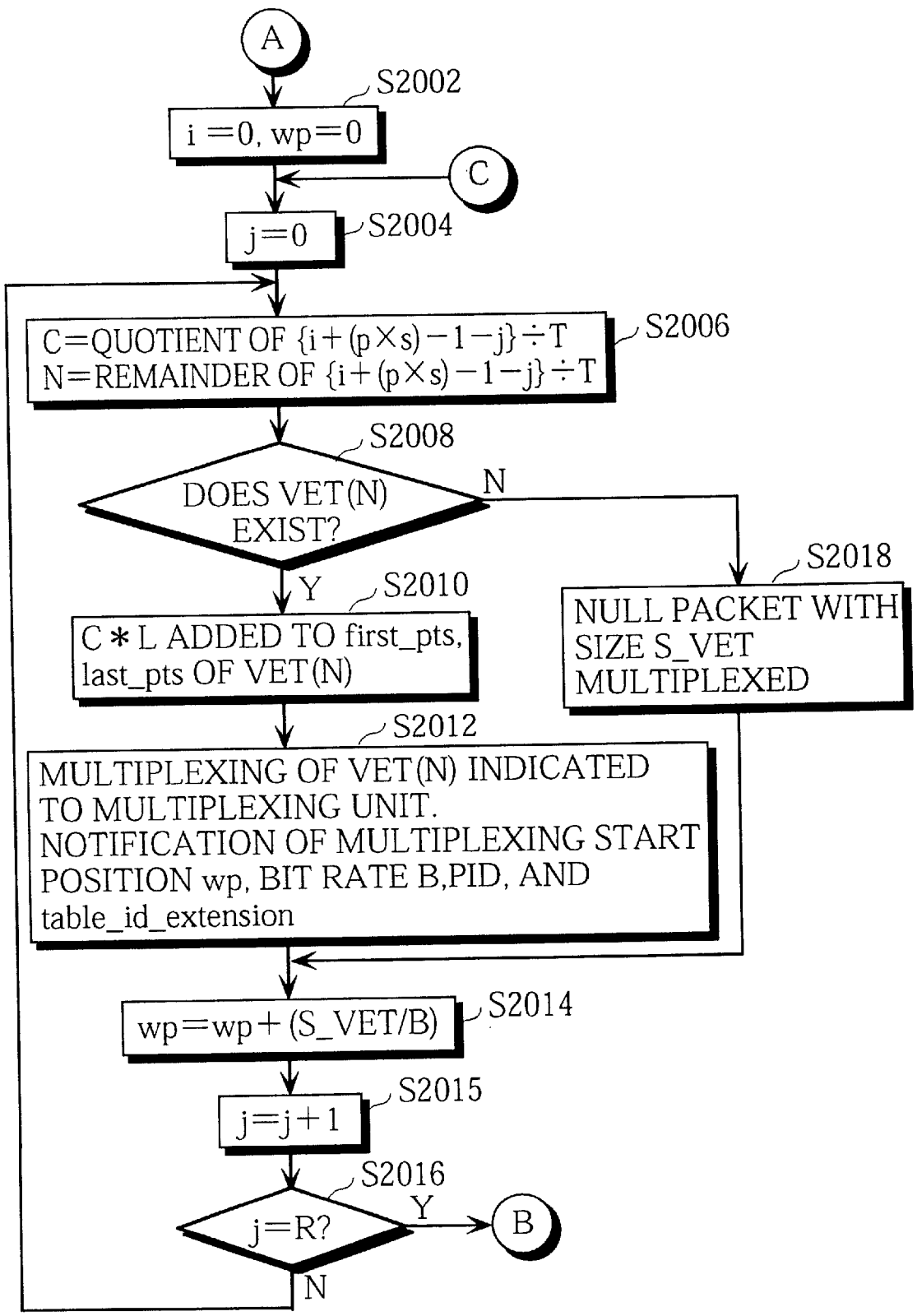
FIG. 24 is a flowchart showing the operation of the data transmission apparatus of the present embodiment.
Figure 25:
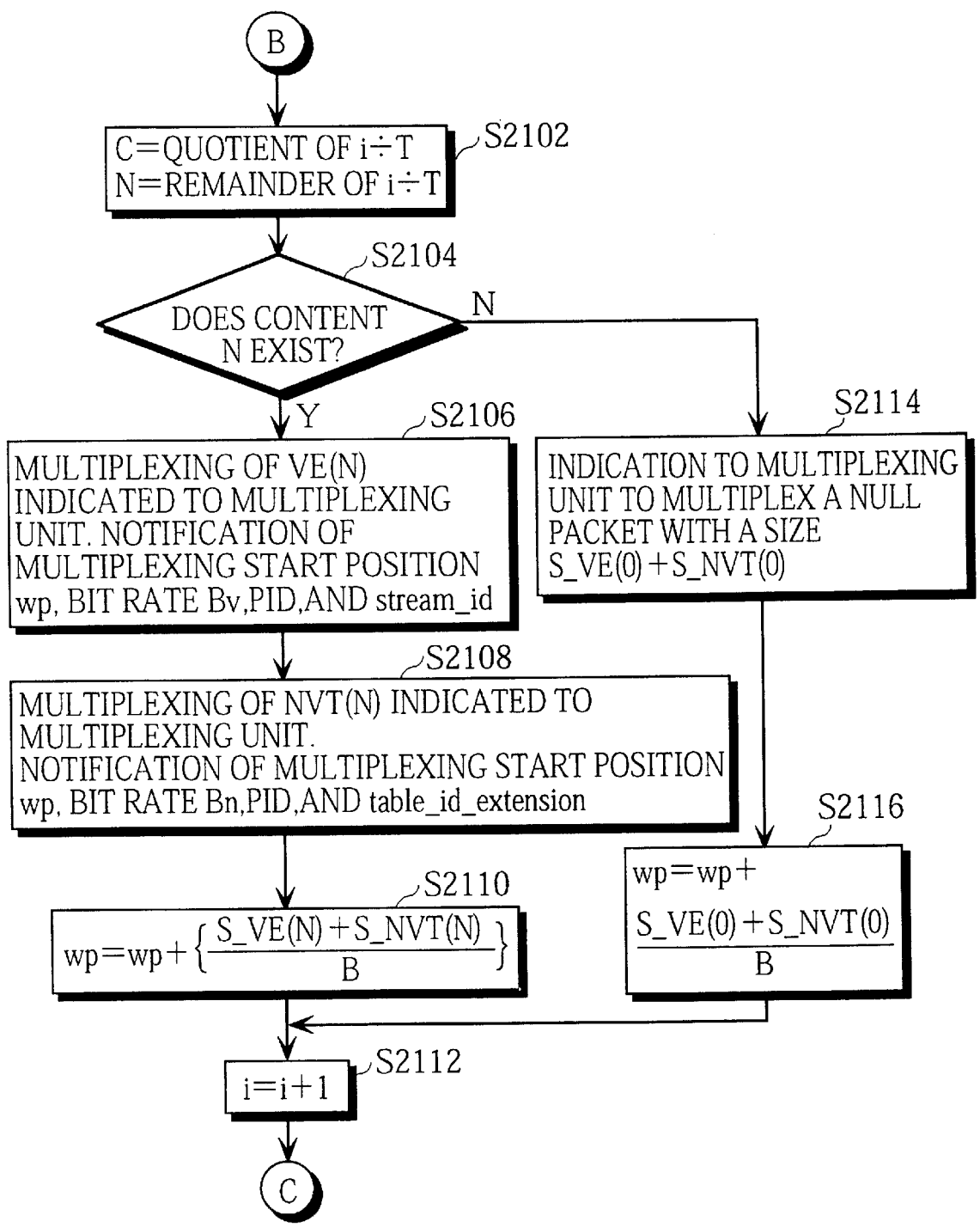
FIG. 25 is a flowchart showing the operation of the data transmission apparatus of the present embodiment.

The following is a description of the operation of the data transmission apparatus 101 in the present embodiment, with reference to FIGS. 23 through 25.

The multiplexing control unit 110 first generates the identifier assigning table which assigns a VE_id and an NE_id for each content number (S1902). Next, the multiplexing control unit 110 generates the display image information identifier assigning table 801 (S1904), before instructing the identifier information appending unit 112 to append the identifier information, instructing the navigation information table generating unit 113 to generate the navigation information table, and instructing the stream correspondence information table generating unit 111 to generate the stream correspondence table.

The identifier information appending unit 112 appends image data identifiers to the private area of the bit stream of image data stored in the presentation information storage unit 107 and stores the appended data. After appending identifiers to every set of image data, the identifier information appending unit 112 notifies the multiplexing control unit 110 of the completion of its processing (S1906).

The navigation information table generating unit 113 generates navigation information tables from the navigation information stored in the navigation information storage unit 108. After completing the generation of all navigation information tables, the navigation information table generating unit 113 notifies the multiplexing control unit 110 of the completion of its processing (S1908).

The stream correspondence information table generating unit 111 refers to the display image information identifier assigning table 801 generated by the multiplexing control unit 110 and generates the stream correspondence tables. On completing the generation of all of the stream correspondence tables, the stream correspondence information table generating unit 111 notifies the multiplexing control unit 110 of the completion of its processing (S1910).

The system information table generating unit 105 then generates the various system information tables, such as the NIT, the SDT, the EIT, the PAT, and the PMT (S1912).

The multiplexing control unit 110 determines the number of contents T in one repetition when the contents are multiplexed into a transport stream (S1914). Here, the multiplexing control unit 110 calculates the length L of one cycle composed of T contents in units of one ninety-thousandth of one second (this being the length of the transport stream when all contents plus a null packet of a size equivalent to (M−T contents) is multiplexed at the bit rate B stored in the multiplexing information storage unit 104)(S1916). The multiplexing control unit 110 then informs the multiplexing unit 114 of the PCR_PID and instructs the multiplexing unit 114 to multiplex the PCR (S1918). Following this, the multiplexing control unit 110 sets both the content counter i and the multiplexing start position pointer wp at "0" (S2002).

The multiplexing control unit 110 then sets the VET counter j at "0" (S2004). The multiplexing control unit 110 also finds the number of cycles C and content number N. Here, the number of cycles is given as the quotient (integer part) of the sum {i+(P*S)−1−j}, while the content N is given as the remainder (integer) (S2006).

The multiplexing control unit 110 then judges whether the stream correspondence table VET(N) is stored in the storage area of the stream correspondence information table generating unit 111 (S2008), and if so, adds a value given as C*L to the values of first_pts and last_pts of VET(N) (S2010).

The multiplexing control unit 110 instructs the multiplexing unit 114 to multiplex the stream correspondence table VET(N) into the transport stream, and informs the multiplexing unit 114 of the multiplexing start position wp, the bit rate B, the PID, and the table_id_extension (S2018), before proceeding to step S2014.

When the multiplexing control unit 110 judges in step S2008 that the stream correspondence table VET(N) is not stored in the stream correspondence information table generating unit 111, the multiplexing control unit 110 instructs the multiplexing unit 114 to multiplex a null packet which is the same size as S_VET, at the same time informing the multiplexing unit 114 of the multiplexing start position wp and the bit rate B. The multiplexing unit 114 then multiplexes a null packet into the transport stream (S2108) and the processing proceeds to step S2014.

In step S2014, the multiplexing control unit 110 calculates the multiplexing start position wp as wp=wp+{S_VET/B} and adds "1" to the value of the VET counter "1"(S2015). The multiplexing control unit 110 then compares the value of the VET counter j with the value of the number of repeated multiplexing R of the stream correspondence table VET(N) (S2016). Here, when j=R, the processing proceeds to S2120, while when j<R the processing returns to step S2006.

In step S2102, the multiplexing control unit 110 sets the number of cycles C at the quotient (integer part) of i/T, and sets the content number N at the remainder (integer). Following this, the multiplexing control unit 110 refers to the content identifier assigning table in the construction information storage unit 109 and judges whether a content with this content number N is present (S2104). If so, the multiplexing control unit 110 instructs the multiplexing unit 114 to multiplex the bit stream of the image data VE(N). At this point, the multiplexing control unit 110 calculates the bit rate Bv(N) and informs the multiplexing unit 114 of this bit rate Bv(N), together with the multiplexing start position wp and the values of the "PID" and the "stream_id" which are written in the display image information identifier assigning table 801. The multiplexing unit 114 then multiplexes this image data VE(N) into the transport stream (S2106).

The multiplexing control unit 110 then instructs the multiplexing unit 114 to multiplex the navigation information table NVT(N). In doing so, the multiplexing control unit 110 calculates the bit rate Bn(N) and informs the multiplexing unit 114 of this bit rate Bn(N), the multiplexing start position wp, the PID, and the table_id_extension. The multiplexing unit 114 then multiplexes the navigation information table NVT(N) into the transport stream (S2108).

The multiplexing control unit 110 then recalculates the multiplexing start position according to the formula wp=wp+{S_VE(N)+S_NVT(N)}/B (S2110). The multiplexing control unit 110 then adds "1" to the content counter i (S2112), and the processing returns to S2004.

When the multiplexing control unit 110 judges in step S2104 that there is no content with the content number N, the multiplexing control unit 110 instructs the multiplexing unit 114 to multiplex a null packet of a size given as S_VE(N)+S_NVT(N), while informing the multiplexing unit 114 of the multiplexing start position wp and the bit rate B. The multiplexing unit 114 then multiplexes a null packet of the indicated size into the transport stream (S2114).

The multiplexing control unit 110 recalculates the multiplexing start position wp according to the formula wp=wp+{S_VE(0)+S_NVT(N)}/B (S2116) and the processing returns to S2112.

When executing the above processing, the NIT, the RAT, and other tables will be multiplexed into the multiplexed stream shown in FIG. 16 for an example where the number of repeated multiplexing R for each stream correspondence table VET(N) is "1", or into the multiplexed stream shown in FIG. 17 for an example where the number of repeated multiplexing R is "16", so that a transport stream such as that shown in FIG. 22 will be transmitted.

1-2-7 Summary

As described above, the data transmission apparatus 101 of the present embodiment assigns identifiers to the image data and navigation information which compose each content and multiplexes them into a transport stream which it transmits repeatedly.

Here, identifiers for image data and navigation information of contents connected by hyperlinks, supplementary image information for displaying menus and the like, and script for performing switches of display are included in the navigation information. As a result, the data reception apparatus 121 can selectively extract and reproduced contents, thereby realizing an interactive display which uses only a one-directional communication path.

1-2-8 Additional Information

1-2-8-1

It should be noted here that while the above embodiment has described the case where the image data is composed of still images, it is also possible for the image data to be moving pictures (video). When the image data is video, Formula 1 used for calculating the "first_pts" and "last_pts", Formula 2 used for calculating the length L of the stream, Formula 3 used for calculating the bit rate Bv(N) assigned to the image data Bv(N), Formula 4 used for calculating the bit rate Bn(N) assigned to the navigation information table NVT(N), and the formula used by the multiplexing control unit 110 to recalculate the multiplexing start position wp after the multiplexing of the image data VE(N) and the navigation information table NVT(N) are changed to the formulas given below.

When the image data is video, the bit rate Bv(N) assigned to the image data VE(N) is decided by estimating the increase when converting the bit rate which is predetermined for a video elementary stream to a transport stream. Here, the navigation information table NVT(N) is assigned a remaining bit rate given by subtracting the bit rate Bv(N) assigned to the video data VE(N) from the overall bit rate.

When doing so, the "first_pts" of the image data VE(N) is calculated according to Formula 5 below.

$$\text{first\_pts}(N) = \left\lceil \sum_{x=0}^{N-1} \{\text{MAX}(S\_VE(x)/Bv(x),\right.$$
$$S\_NE(x)/(B - Bv(x)) + (S\_VET * R/B)\} +$$
$$S\_VE\_FIRST(N)/Bv(x) +$$
$$(S\_VET * R/B)\}] * 90000$$

Formula 5

Here, Bv(x) is the bit rate assigned to the image data VE(x), S_VE_FIRST(N) is the size of the first frame of the image data VE(x) when converted into the transport stream in accordance with MPEG2 system standard, and MAX{A, B} represents the largest values of A and B, respectively.

For video, the "last_pts" does not match the "first_pts". Here, the "last_pts" can be found according to Formula 6 below.

$$\text{last\_pts}(N) = \text{first\_pts}(N) + \{(N\_FRAME(x)/Frame\_per\_sec)*90000\}$$

Formula 6

Here, N_FRAME(x) is the number of frames in video data VE(x), while Frame_per_sec is the number of frames reproduced in one second (which can be 29.97 for NTSC standard, for example).

When doing so for a video image, the multiplexing control unit 110 informs the multiplexing unit 114 of VE(x) and NE(x), before recalculating the multiplexing start position wp according to Formula 7 below.

$$wp=wp+\text{MAX}(S\_VE(x)/Bv(x), S\_NE(x)/(B-Bv(x))$$

Formula 7

1-2-8-2

It should be noted here that the data transmission apparatus 101 is constructed so that the multiplexing unit 114 successively generates the transport stream 1701 during the transmission of an event, although the multiplexing unit 114 may generate a transport stream of one cycle length L and store it beforehand, so that when the transmission unit 106 transmits to the data reception apparatus 121, this transport stream is repeatedly read and repeatedly transmitted having been subjected to predetermined processing.

1-2-8-3

In the present embodiment, the corresponding sets of image data and navigation information are multiplexed at the same time, although this need not be the case. As described above, the navigation information table and the corresponding image data are separated from each other, so that they may be multiplexed at different times.

1-3 Data Reception Apparatus 121

As described above with reference to FIG. 1, the data reception apparatus 121 interactively selects contents from the MPEG2 transport stream transmitted by the data transmission apparatus 101 in accordance with user operations and reproduces them.

1-3-1 Reception Unit 122

The reception unit 122 receives the MPEG2 transport stream which corresponds to the transport stream identifier indicated by the reception control unit 126, and outputs it to the TS decoder unit 123.

1-3-2 TS Decoder Unit 123

The TS decoder 123 includes a filter condition storage unit 131 for storing the filter conditions set by the reception control unit 126, and operates in accordance with these filter conditions so as to only separate image data or audio data with a specified identifier from the transport stream outputted by the reception unit 122. The TS decoder unit 123 outputs the separated data to the AV decoder unit 124. The TS decoder unit 123 also separates table data with a specified identifier and outputs the table data to an area maintained in the received data storage unit 125, in accordance with the identifier. The TS decoder unit 123 separates a PCR (standard clock information) with the specified identifier and outputs it to the AV decoder unit 124. Here, the filter condition storage unit 131 is capable of simultaneously storing a plurality of filter conditions, and the TS decoder unit 123 is capable of simultaneously performing a plurality of separating operations.

FIGS. 26A and 26B show examples of the filter condition tables stored in the filter condition storage unit 131. Each line in filter condition table 2201 is one filter condition. The "filter identification column" 2202 is used for recording numbers which identify each filter condition. The "start/stop" column 2203 is set so that the entry "start" denotes the started state of a filter condition, while the entry "stop" denotes the stopped state of a filter condition. The TS decoder unit 123 executes separating processes based on the filter conditions in the started state, and does not preform separating based on filter conditions in the stopped state. The "PID" column 2204 is used to record the value of the PID of the data separated by each filter condition. The "stream_id" column 2205 is used to record the value of the stream_id of the data separated by each filter condition. The "table_id_extension" column 2206 is used to record the value of the table_id_extension of the data separated by each filter condition. When the entries in the "PID" column 2204, the "stream_id" column 2205, and the "table_id_extension" column 2206 are all set the value "–", unconditional separating, which is to say separating regardless of the value of the identifiers, will be performed. Finally, the "output destination" column 2207 is used to record the output destination to which the separated data is to be outputted.

The line corresponding to the filter identification number "0" in the filter condition table 2201 shows the filter condition for image data. The entry in the "output destination" column 2207 for this line indicates the AV decoder unit 124, with it not being possible to set an entry in the "table_id_extension" column 2206. The entries in the "PID" column 2204 and in the "stream_id" column 2205 are set at the values of the PID and stream_id of the image data which is to be separated by the reception control unit 126.

The line corresponding to the filter identification number "1" shows the filter condition for audio data. The entry in the "output destination" column 2207 for this line indicates the AV decoder unit 124, with it not being possible to set an entry in the "table_id_extension" column 2206. The entries in the "PID" column 2204 and in the "stream_id" column 2205 are set at the values of the PID and stream_id of the audio data which is to be separated by the reception control unit 126.

The line corresponding to the filter identification number "2" in the filter condition table 2201 shows the filter condition for the stream correspondence table VET. The entry in the "output destination" column 2207 for this line indicates the stream correspondence information table storage unit 132, with it not being possible to set an entry the "stream_id" column 2205. The entries in the "PID"column 2204 and in the "table_id_extension" column 2206 are set at the values of the PID and table_id_extension of the stream correspondence table which is to be separated by the reception control unit 126.

The line corresponding to the filter identification number "3" in the filter condition table 2201 shows the filter condition for the navigation information table. The entry in the "output destination" column 2207 for this line indicates the navigation information table storage unit 133, with it not being possible to set an entry the "stream_id" column 2205. The entries in the "PID" column 2204 and in the "table_id_extension" column 2206 are set at the values of the PID and table_id_extension of the navigation information table which is to be separated by the reception control unit 126.

The entry in the "start/stop" column 2203 for each filter condition is set at "start" or "stop" by the reception control unit 126 to set the separating process of the TS decoder unit 123 into a started state or stopped state for each filter condition.

In addition to the information described above, the filter condition storage unit 131 also stores filter conditions for the system information tables, such as the NIT, the SDT, the EIT, the PAT, and the PMT, and the PCR (standard clock information). These conditions have not been illustrated.

When the filter condition for image data corresponding to filter identification number "0" and the condition for audio data corresponding to filter identification number "1" are set in the stopped state in the filter condition table 2201 by the reception control unit 126, the TS decoder unit 123 does not separate image data or audio data.

Here, suppose that the filter condition for the stream correspondence table VET corresponding to filter identification number "2" has been set by the reception control unit 126 so that the value in the "PID" column 2204 is "0x0083", the value in the "table_id_extension" column 2206 is "0x0005", and the started state is set in the "start/stop" column 2203. In this case, the TS decoder unit 123 separates the stream correspondence table VET(5) from the transport stream 1801 (shown in FIG. 22) transmitted from the transmission unit 106, in accordance with this filter condition. The TS decoder unit 123 stores the separated stream correspondence table VET(5) in the stream correspondence information table storage unit 132 and notifies the reception control unit 126. Here, the content of VET(5) is as shown in FIG. 15A.

Next, suppose that the filter condition for the navigation information table NVT corresponding to filter identification number "3" has been set by the reception control unit 126 so that the value in the "PID" column 2204 is "0x0082", the value in the "table_id_extension" column 2206 is "0x0005", and the started state is set in the "start/stop" column 2203. In this case, the TS decoder unit 123 separates the navigation information table NVT(5) from the transport stream 1801 (shown in FIG. 22) transmitted from the transmission unit 106, in accordance with this filter condition. The TS decoder unit 123 stores the separated navigation information table NVT(5) in the navigation information table storage unit 133 and notifies the reception control unit 126. Here, the content of the navigation information table NVT(5) is as shown in FIG. 13.

Next, in filter condition table 2208, suppose that the filter condition for the image data corresponding to filter identification number "0" has been set by the reception control unit 126 so that the value in the "PID" column is "0x0084", the value in the "stream_id" column is "0xe5", and the started state is set in the "start/stop" column. In this case, the TS decoder unit 123 separates the image data VE(5), the image data VE(21), the image data VE(37), and the image data VE(53) in order from the transport stream 1801 (shown in FIG. 22) transmitted from the transmission unit 106, in accordance with this filter condition. The TS decoder unit 123 outputs the separated sets of image data to the AV decoder unit 124. Here, out of these four sets of image data, the first set of image data to be separated will depend on the timing at which the reception control unit 126 sets the started condition for the filter condition. Also, by setting the stopped condition at the proper timing, the reception control unit 126 can have the TS decoder unit 123 separate only the first out of these four sets of image data and output it to the AV decoder unit 124.

1-3-3 AV Decoder Unit 124

The AV decoder unit 124 includes a clock unit which is not illustrated. This clock unit is synchronized to a standard time using the value of the PCR outputted by the TS decoder unit 123, and is used to measure time which is used as the standard for synchronized decoding of image data and audio data.

On receiving image data and/or audio data from the TS decoder unit 123, the AV decoder unit 124 reads the identifier of the image data and/or audio data written in the private area, in accordance with an indication from the reception control unit 126, and notifies the reception control unit 126 of the identifier(s). Next, the AV decoder unit 124 decodes the image data and/or audio data in predetermined units in accordance with an indication from the reception control unit 126 and outputs the decoded data to the reproduction unit 128 in synchronization with the clock unit, before informing the reception control unit 126 of the completion of the decoding.

1-3-4 Construction of the Received Data Storage Unit 125

The received data storage unit 125 can be composed of RAM (Random Access Memory), for example, and is provided with a stream correspondence information table storage unit 132, a navigation information table storage unit 133, and a system information table storage unit 134.

The stream correspondence information table storage unit 132 stores stream correspondence tables which have been separated by the TS decoder unit 123. The navigation information table storage unit 133 stores navigation information tables which have been separated by the TS decoder unit 123. The system information table storage unit 134 stores the system information tables, such as the NIT, the SDT, the EIT, the PAT, and the PMT, which have been separated by the TS decoder unit 123.

1-3-5 Signal Reception Unit 127

The signal reception unit 127 receives signals, such as remote controller operations made by a user, and informs the reception control unit 126 of the received signals.

1-3-6 Reproduction Unit 128

The reproduction unit 128 superimposes graphics information included in the navigation information table outputted from the reception control unit 126 and image data decoded by the AV decoder unit 124 in accordance with indications from the reception control unit 126. The reproduction unit 128 outputs this combined image to the display unit 129. The reproduction unit 128 also outputs audio data decoded by the AV decoder unit 124 to the audio output unit 130.

1-3-7 Display Unit 129

The display unit 129 can be realized by a CRT (Cathode Ray Tube) or liquid crystal display, and is used to display the images outputted by the reproduction unit 128. Examples of such display are the contents 151, 152, and 153 shown in FIG. 1.

1-3-8 Audio Output Unit 130

The audio output unit 130 can be realized by a speaker, and is used to output the audio signal outputted by the reproduction unit 128.

1-3-9 Construction of the Reception Control Unit 126

The reception control unit 126 controls the reception unit 122 and has it receive a desired transport stream. On receiving a user operation signal via the signal reception unit 127, the reception control unit 126 refers to the navigation information table presently stored in the navigation information table storage unit 133 and sets the filter condition for the next navigation information table and the filter condition for the stream correspondence table for obtaining the image data in the filter condition storage unit 131 of the TS decoder unit 123. The reception control unit 126 then refers to the stream correspondence table which has been newly separated by the TS decoder unit 123 and stored in the stream correspondence information table storage unit 132, and sets the filter condition for the image data in the filter condition storage unit 131.

The reception control unit 126 judges whether the image data which has been separated by the reception control unit 126 is the appropriate image data by referring to the image data identifier written into the private area of the image data. When the image data is the appropriate image data, the reception control unit 126 has the image data decoded and outputted to the reproduction unit 128. When the image data is not the appropriate image data, the reception control unit 126 changes the filter condition in the filter condition storage unit 131 and gives another indication for the separation of a stream correspondence table.

The reception control unit 126 also reads bitmap data for objects included in the navigation information table separated by the TS decoder unit 123. The reception control unit 126 also informs the reproduction unit 128 of this data and has the reproduction unit 128 combine the bitmap data with the image data.

1-3-9-1 Initial Control

The reception control unit 126 is composed of a CPU and a program for controlling the CPU. When the user makes an initial selection of an event stored in the transmission data storage unit 102 and multiplexed into the transport stream transmitted by the transmission unit 106 of the data transmission apparatus 101, the reception control unit 126 first refers to the system information tables in accordance with a procedure which is standardized according to the DVB-SI and MPEG2 system standards which are generally used by satellite digital broadcast reception apparatuses. The reception control unit 126 then instructs the reception unit 122 to receive a transport stream transmitted by the transmission unit 106 and instructs the TS decoder unit 123 to separate the PMT corresponding to the event selected by the user.

The reception control unit 126 then refers to the PMT stored in the system information table storage unit 134 and obtains the identifier of the PCR, and sets this identifier in the filter condition storage unit 131. The reception control unit 126 also obtains the identifiers of the image data and the navigation information of the entry content and respectively sets these in the filter condition of the stream correspondence table and the filter condition of the navigation information table in the filter condition storage unit 131.

The reception control unit 126 then refers to the PMT stored in the system information table storage unit 134 and obtains the PIDs of the component which is used to transfer the stream correspondence table and the component which is used to transfer the navigation information table. The reception control unit 126 then respectively sets these PIDs in the filter condition of the stream correspondence table and the filter condition of the navigation information table in the filter condition storage unit 131, in addition to setting both of these filter conditions into the started state.

On receiving notification from the TS decoder unit 123 indicating that the stream correspondence table has been separated, the reception control unit 126 sets the filter condition for the stream correspondence table in the filter condition storage unit 131 into the stopped state. Following this, the reception control unit 126 refers to the stream correspondence table in the stream correspondence information table storage unit 132 and reads the value of the "stream_id" for the image data, before setting the filter condition for image data in the filter condition storage unit 131. After this, the reception control unit 126 refers to the stream correspondence table in the stream correspondence information table storage unit 132 and reads the value of the "component_tag", and refers to the PMT in the system information table storage unit 134 and obtains the value of the PID which corresponds to the "component_tag" it has read. The reception control unit 126 then sets this PID in the filter condition for the image data in the filter condition storage unit 131, and sets this filter condition into the started state.

1-3-9-2 Judgement of Validity of Image Data

The data transmission apparatus 101 is constructed to transmit a plurality of different sets of image data with the same values of the PID and stream_id, so that having transmitting a stream correspondence table corresponding to a given set of image data, a predetermined time later the data transmission apparatus 101 will send a different set of image data with the same PID and stream_id as the given set of image data. This being the case, if the reception control unit 126 can complete the setting of the filter condition for the image data within a predetermined time period after receiving the stream correspondence table, the TS decoder unit 123 will be able to separate the desired image data without error and output it to the AV decoder unit 124.

Following this, the reception control unit 126 obtains the value of the image data identifier written into the private area of the image data outputted from the TS decoder unit 123 via the AV decoder unit 124. The reception control unit 126 then investigates whether this value matches the identifier of the image data to be obtained. When the values do not match the reception control unit 126 sets the filter condition for the image data in the filter condition storage unit 131 into the stopped state, and sets the PID of the component which transfers the stream correspondence table and the identifier of the image data which it is presently trying to obtain into the filter condition of the stream correspondence table, as well as setting the filter condition for the stream correspondence table into the started condition. It should be noted here that the value of the identifier "table_id_extension" for the stream correspondence table is the same as the value of the identifier "VE_id" for the image data. By doing so, when, for whatever reason, the processing whereby the reception control unit 126 refers to the stream correspondence table and sets the filter condition of the image data is delayed, the mistaken display of other image data can still be avoided.

When the identifier written in the private area of the image data outputted by the TS decoder unit 123 matches the value of the identifier of the image data which the reception control unit 126 is attempting to obtain, the reception control unit 126 refers to the stream correspondence table in the stream correspondence information table storage unit 132 and reads the value of the "first_pts". After this, the reception control unit 126 refers to the clock unit of the AV decoder unit 124 and checks whether notification of the completion of frame decoding has been received from the AV decoder unit 124. When no such notification has been received, the reception control unit 126 sets the filter condition of the image data in the filter condition storage unit 131 into the stopped state, and resets the PID of the component for transferring the stream correspondence table and the identifier of the image data to be obtained, before setting the filter condition of the stream correspondence table into the started state.

By performing the above processes, unintentional reproduction of image data which skips the beginning and starts midway can be avoided, even when, for whatever reason, there is a delay in the reception control unit 126 referring to the stream correspondence table and setting the filter condition for the image data.

When notification of the completion of frame decoding has been received from the AV decoder unit 124, the reception control unit 126 refers to the stream correspondence table in the stream correspondence information table storage unit 132 and reads the value of the "last_pts". After this, the reception control unit 126 refers to the clock unit of the AV decoder unit 124 and, once the time of the read "last_pts" has been reached, sets the filter condition for the image data in the filter condition storage unit 131 into the stopped condition. By doing so, only the desired image data will be separated and outputted to the AV decoder unit 124. As a result, other sets of image data with the same PID and stream_id will not be separated.

1-3-9-3 Generation of Graphics Information

On receiving notification from the TS decoder unit 123 indicating the separation of a navigation information table, the reception control unit 126 sets the filter condition for the navigation information table in the filter condition storage unit 131 into the stopped state. Following this, the reception control unit 126 refers to the object definition table in the navigation information table of the navigation information table storage unit 133 and obtains the display coordinates "X" and "Y" of the button object. For a button whose index number is "0", the reception control unit 126 obtains an index number for a "Focused Bitmap", while for other buttons, the reception control unit 126 obtains an index number for a "Normal Bitmap", before referring to the bitmap table and obtaining bitmap data corresponding to the obtained index number. The reception control unit 126 then uses this bitmap data to generate graphics information for buttons and outputs this graphics information to the reproduction unit 128.

1-3-9-4 Interpretation of User Operations

The reception control unit 126 resets the variable "cur_focus" which represents the index number of the button object which is presently displayed in the selection state to "0".

On receiving a signal for a user operation from the signal reception unit 127, the reception control unit 126 judges whether the signal is for an "Up" user operation, a "Down" user operation, or an "Enter" user operation. When the signal is for an "Up" user operation or a "Down" user operation, the reception control unit 126 adds or subtracts "1" to/from the value of the variable cur_focus. Following this, the reception control unit 126 refers to the navigation information table in the navigation information table storage unit 133 and first refers to the object definition table to obtain the "X" and "Y" display coordinates of the button object. The reception control unit 126 next obtains the index number of the "Focused Bitmap" for the button whose index number corresponds to the value of variable cur_focus and the index numbers of the "Normal Bitmap" for all other buttons, before referring to the bitmap table and obtaining the sets of bitmap data which correspond to these index numbers. The reception control unit 126 generates graphics information for buttons using the obtained bitmap data and outputs the graphics information to the reproduction unit 128.

When the signal is for an "Enter" user operation, the reception control unit 126 refers to the object definition table in the navigation information table NVT in the navigation information table storage unit 133 and obtains the index number of handler of the button object whose index number matches the value of cur_focus. The reception control unit 126 then refers to the handler definition table and reads the instruction word from the handler that corresponds to the index number. When the instruction word is "goto_content", the reception control unit 126 reads the index number which is the argument of this instruction word and refers to the hyperlink table, before reading the identifier of the content which is the link destination corresponding to the read index number as the identifier of the next content to be reproduced.

When the instruction word is "goto_entry" the reception control unit 126 refers to the system information table storage unit 134 to find the PMT of the event to which the navigation information table of the currently reproduced content belongs, and reads the identifier of the entry content as the identifier of the next content to be reproduced.

1-3-9-5 Setting of the Filter Conditions

When the identifier of the next content to be reproduced is equal to the identifier of the content presently being reproduced, the reception control unit 126 performs no action. When the original_network_id and transport_stream_id of the next content to be reproduced are different to the transport stream presently being received, the reception control unit 126 refers to the system information table and instructs the reception unit 122 to receive the desired transport stream, in accordance with a predetermined procedure for MPEG2 system standard and DVB-SI standard. On receiving instruction which indicate the reception of a transport stream which belongs to a different network, the reception unit 122 performs the necessary processes, such as the changing of the orientation of an antenna, and receives the indicated transport stream.

When the event to which the image data for the next content to be displayed belongs is different to the event to which the image display of the presently display content belongs, the reception control unit 126 refers to the system information table as described above and sets the identifier of the PMT of the event to which the image data of the next content belongs into the filter condition storage unit 131 of the TS decoder unit 123.

The TS decoder unit 123 separates the PMT in accordance with the filter condition and stores the PMT in the system information table storage unit 134, before notifying the reception control unit 126.

On receiving notification of the separation of the PMT of the event to which the image data belongs from the TS decoder unit 123, the reception control unit 126 refers to the PMT and sets the value of the "PCR_PID" into the filter condition storage unit 131.

The reception control unit 126 refers to the system information tables as described above and sets the identifier of the PMT of the event to which the navigation information of the next content to be reproduced belongs into the filter condition storage unit 131 in the TS decoder unit 123. This procedure is executed even when the event to which the navigation information of the next content to be reproduced belongs differs from the event to which the navigation information of the presently reproduced content belongs.

When the value of the identifier "VE_id" of the image data of the next content to be displayed is different to the value of the identifier "VE_id" of the image data of the content which is presently being reproduced, the reception control unit 126 refers to the system information table storage unit 134 to find the PMT of the event to which the image data of the next content to be displayed belongs and obtains the PID of the component to which the VE_Information_Component_Descriptor is attached. The reception control unit 126 then sets this PID and the value "VE_id" into the filter condition for the stream correspondence table in the filter condition storage unit 131, in addition to setting this filter condition into the started condition.

When the value of the identifier "NE_id" of the image data of the next content to be displayed is different to the value of the identifier "VE_id" of the image data of the content which is presently being reproduced, the reception control unit 126 refers to the system information table storage unit 134 to find the PMT of the event to which the navigation information of the next content to be displayed belongs and obtains the PID of the component to which the NE_Component_Descriptor is attached. The reception control unit 126 then sets this PID and the value "NE_id" into the filter condition for the navigation information table in the filter condition storage unit 131, in addition to setting this filter condition into the started condition.

1-3-10 Specific Example of Content Display by the Data Reception Apparatus 121

When, as one example, the user initially selects the event multiplexed into the transport stream 1801 (shown in FIG. 22) which is identified by the original_network_id "0x0001", the transport_stream_id "0x0001", the service_id "0x0001", and the event_id "0x0001", the reception control unit 126 refers to NIT 1301 in FIG. 18A and obtains the information for the transfer preface, such as the frequency of the transport stream 1801 identified by the original_network_id "0x0001" and the transport_stream_id "0x0001", in accordance with a procedure which is standardized in accordance with MPEG2 system standard and DVB-SI standard.

Next, the reception control unit 126 instructs the reception unit 122 to receive the transport stream 1801 and refers in the same way to the PAT 1401 in FIG. 19 to obtain the value "0x0080" of the PID of the PMT for the program whose "program_no" is equal to the service_id (here, "1"). The reception control unit 126 then sets this value in the filter condition for the PMT in the filter condition storage unit 131.

The TS decoder unit 123 separates the PMT 1501 shown in FIG. 20 and stores it in the system information table storage unit 134, before notifying the reception control unit 126. The reception control unit 126 reads the value "0x0081" of the "PCR_PID" from the PMT 1501 stored in the system information table storage unit 134 and sets this value in the filter condition of the PCR in the filter condition storage unit 131. Following this, the reception control unit 126 refers to the Entry_Descriptor (shown in FIG. 21A) of the PMT 1501 and obtains the value "0x0005" of the "entry_VE_id", before setting this in the "table_id_extension" entry of the filter condition for the stream correspondence table in the filter condition storage unit 131. After this, the reception control unit 126 obtains the value "0x0083" of the PID of the component attached to the VE_Information_Component_Descriptor from the PMT 1501 and sets this in the "PID" entry in the filter condition for the stream correspondence table, in addition to setting the filter condition for the stream correspondence table into the started state.

Following this, the reception control unit 126 refers to the Entry_Descriptor (shown in FIG. 21A) of the PMT 1501 and obtains the value "0x0005" of the "entry_NE_id", before setting this in the "table_id_extension" entry of the filter condition for the navigation information table in the filter condition storage unit 131. After this, the reception control unit 126 obtains the value "0x0082" of the PID of the component attached to the NE_Component_Descriptor from the PMT 1501 and sets this in the "PID" entry for the navigation information table, in addition to setting the filter condition for the navigation information table into the started state.

The TS decoder unit 123 separates the stream correspondence table 1201 shown in FIG. 15A, stores it in the stream correspondence information table storage unit 132, and notifies the reception control unit 126, in addition to separating the navigation information table 1001, storing it in the navigation information table storage unit 133, and informing the reception control unit 126.

On receiving notification of the separation the stream correspondence table, the reception control unit 126 refers to the stream correspondence table 1201 in the stream correspondence information table storage unit 132 and obtains the value "0xe5" of the "stream_id" which it then sets as the "stream_id" entry of the filter condition for image data. Following this, the reception control unit 126 obtains the value "0x00" of the "component_tag" from the stream correspondence table 1201, before obtaining the value "0x0084" of the "PID" of the component whose "component_tag" has been appended with the stream_identifier_descriptor of the value "0x00", meaning that its data type is image data. The reception control unit 126 then sets this value "0x0084" in the "PID" entry of the filter condition for image data in the filter condition storage unit 131, in addition to setting this filter condition into the started state.

It should be noted here that when the value of the "PID" is written directly into the stream correspondence table in place of the "component_tag", the reception control unit 126 does not need to refer to the PMT and so can instead obtain the "stream_id" and "PID" directly from the stream correspondence table, before setting the filter condition for the image data in the filter condition storage unit 131.

The TS decoder unit 123 separates the bitstream 901 for the image data shown in FIG. 12 and outputs it to the AV decoder unit 124. This bitstream 901 for the image data has the value "0x0005" of the "VE_id" written into the private area for the still image data 201 shown the FIG. 5A.

The reception control unit 126 receives, via the AV decoder unit 124, notification of the value "0x0005" of the identifier written into the private area of the separated image data, and confirms that this value matches the value "0x0005" set beforehand in the table_id_extension of the stream correspondence table. After this, the reception control unit 126 refers to the clock unit of the AV decoder unit 124 and having confirmed that notification of the successful decoding to image data has been received from the AV decoder unit 124 has been received by the time indicated by the value "112500" of the "first_pts" in the stream correspondence table 1201, waits until the time indicated by the value "112500" of the "last_pts" in the stream correspondence table 1201, before setting the filter condition for image data in the filter condition storage unit 131 into the stopped state.

On receiving notification of the separation of the navigation information table, the reception control unit 126 sets the variable cur_focus at "0", before referring to the navigation information table 1001 in the navigation information table storage unit 133 and obtaining the display coordinates of a button corresponding to the index number "0", the bitmap data corresponding to the index number of the item "Focused bitmap", the display coordinates of a button corresponding to the index number "1", and the bitmap data corresponding to the index number of the item "Normal bitmap". The reception control unit 126 then uses these to generate graphics information for buttons which it outputs to the reproduction unit 128. The reproduction unit 128 superimposes this graphics information outputted by the reception control unit 126 onto the image data outputted by the AV decoder unit 124, and has the display image 2301 shown in FIG. 27A displayed on the display unit 129.

Figure 27B:
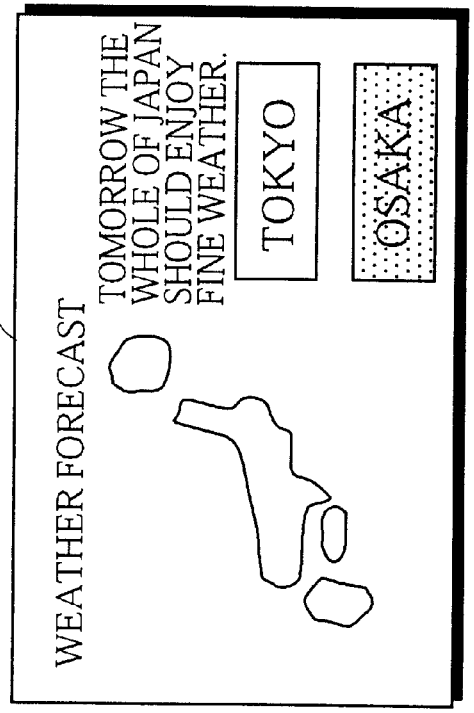
FIG. 27B shows another example display screen which is displayed by the display unit in the present embodiment.

When a "Down" signal is inputted due to a user operation made via a remote controller or the like during the display of display image 2301, the reception control unit 126 receives notification of the "Down" input signal via the signal reception unit 127 and increases the value of "cur_focus" by one to "1". The reception control unit 126 then refers to the navigation information table 1001 in the navigation information table storage unit 133 and obtains the display coordinates corresponding to the index number "0"

and the bitmap data corresponding to the index number for the "Normal Bitmap", as well as the display coordinates corresponding to the index number "1" and the bitmap data corresponding to the index number for the "Focused Bitmap", before using this information to generate graphics information for the buttons which it outputs to the reproduction unit 128. The reproduction unit 128 superimposes this graphics information outputted by the reception control unit 126 onto the image data outputted by the AV decoder unit 124, and has the display image 2302 shown in FIG. 27B displayed on the display unit 129.

When an "Enter" signal is inputted due to a user operation made via a remote controller or the like during the display of display image 2301, the reception control unit 126 receives notification of the "Enter" input signal via the signal reception unit 127. The reception control unit 126 then obtains the index number "0" of the handler of the button whose index number ("0") coincides with the value of the variable cur_focus from the object definition table 1002 in the navigation information table 1001 in the navigation information table storage unit 133. The reception control unit 126 refers to the handler definition table 1003 and obtains the script, instruction word "goto_content", and the argument index number "0" which correspond to index number "0".

The reception control unit 126 next refers to the hyperlink table 1004 and fetches the value "0x0001" of the "VE_id" of the content which is the link destination corresponding to the index number "0". The reception control unit 126 sets this extracted value in the "table_id_extension" of the filter condition for the stream correspondence table in the filter condition storage unit 131. The reception control unit 126 then fetches the value "0x0083" of the PID of the component attached to the VE_Information_Component_Descriptor and sets this in the "PID" entry of the filter condition for the stream correspondence table, before setting this filter condition into the started state.

The reception control unit 126 next fetches the value "0x0001" of the "NE_id" of the content which is the link destination corresponding to the index number "0", and sets this fetched value in the "table_id_extension" entry of the filter condition in the navigation information table in the filter condition storage unit 131. After this, the reception control unit 126 fetches the value "0x0082" of the PID of the component attached to the NE_Component_Descriptor from the PMT 1501, and sets this value in the "PID" entry in the filter condition for the navigation information table in the filter condition storage unit 131, before setting the filter condition for the navigation information table into the started state.

The TS decoder unit 123 separates the stream correspondence table 1202 shown in FIG. 15B, stores it in the stream correspondence information table storage unit 132, and notifies the reception control unit 126, in addition to separating the navigation information table 1101 shown in FIG. 14, storing it in the navigation information table storage unit 133, and notifying the reception control unit 126.

On receiving notification of the separation of the stream correspondence table from the TS decoder unit 123, the reception control unit 126 refers to the stream correspondence table 1202 and instructs the TS decoder unit 123 to separate the image data. On receiving notification of the separation of the navigation information table from the TS decoder unit 123, the reception control unit 126 refers to the navigation information table 1101, generates the graphics information for the button, and outputs it to the reproduction unit 128.

Figure 27A:
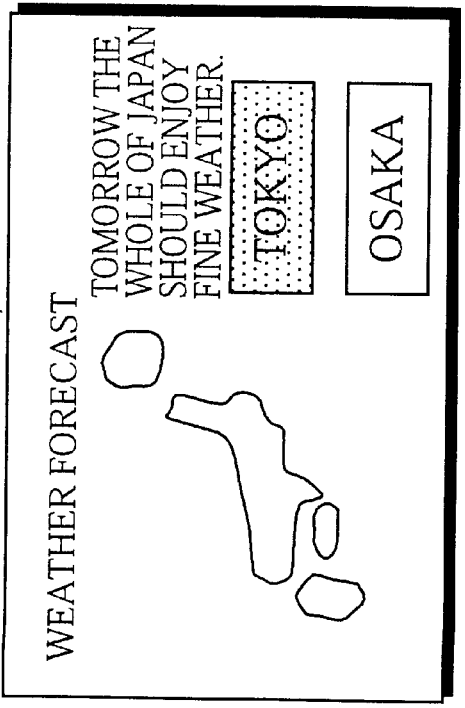
FIG. 27A shows an example display screen which is displayed by the display unit in the present embodiment.
Figure 27C:
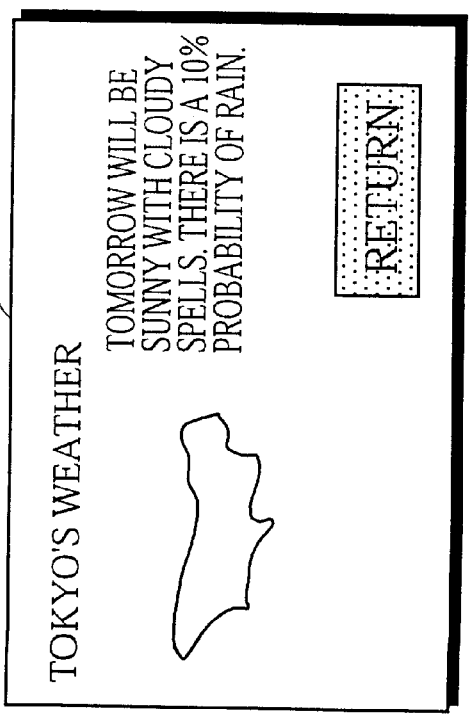
FIG. 27C shows another example display screen which is displayed by the display unit in the present embodiment.

The reproduction unit 128 superimposes the graphics information outputted by the reception control unit 126 onto the image data outputted by the AV decoder unit 124 and outputs the display image 2303 shown in FIG. 27C to the display unit 129.

When an "Enter" signal is inputted due to a user operation made via a remote controller or the like during the display of display image 2301, the reception control unit 126 receives notification of the "Enter" input signal via the signal reception unit 127. The reception control unit 126 then refers to the navigation information table 1101 in the navigation information table storage unit 133 and obtains the script, instruction word "goto_entry". After this, the reception control unit 126 obtains the value "0x0005" of the "entry_VE_id" from the PMT 1501 stored in the system information table storage unit 134 and sets this value in the "table_id_extension" entry of the filter condition for the stream correspondence table in the filter condition storage unit 131.

The reception control unit 126 next receives the value "0x0083" of the component attached to the VE_Information_Component_Descriptor from the PMT 1501 and sets this value in the "PID" entry of the filter condition for the stream correspondence table, before setting the filter condition for the stream correspondence table into the started state.

Next, the reception control unit 126 refers to PMT 1501 and fetches the value "0x005" of the "entry_NE_id" which it sets in the "table_id_extension" of the filter condition of the navigation information table in the filter condition storage unit 131. Following this, the reception control unit 126 obtains the value "0x0082" of the PID of the component to which the NE_Component_Descriptor has been attached from the PMT 1501, before setting this value in the "PID" entry of the filter condition for the navigation information table and setting the filter condition for the navigation information table into the started state.

The TS decoder unit 123 separates the stream correspondence table 1201 shown in FIG. 15A, stores it in the stream correspondence information table storage unit 132, and notifies the reception control unit 126, in addition to separating the navigation information table 1001 shown in FIG. 13, storing it in the navigation information table storage unit 133, and notifying the reception control unit 126.

On receiving notification of the separation of the stream correspondence table from the TS decoder unit 123, the reception control unit 126 refers to the stream correspondence table 1201 and instructs the TS decoder unit 123 to separate the image data. On receiving notification of the separation of the navigation information table from the TS decoder unit 123, the reception control unit 126 refers to the navigation information table 1001, generates the graphics information for the button, and outputs it to the reproduction unit 128.

The reproduction unit 128 superimposes the graphics information outputted by the reception control unit 126 onto the image data outputted by the AV decoder unit 124 and outputs the display image 2303 shown in FIG. 27A to the display unit 129.

1-3-11 Operation of the Data Reception Apparatus 121

The following is an explanation of the operation of the data reception apparatus 121, with reference to the flowcharts in FIGS. 28 to 31.

1-3-11-1 Entire Operation

Figure 28:
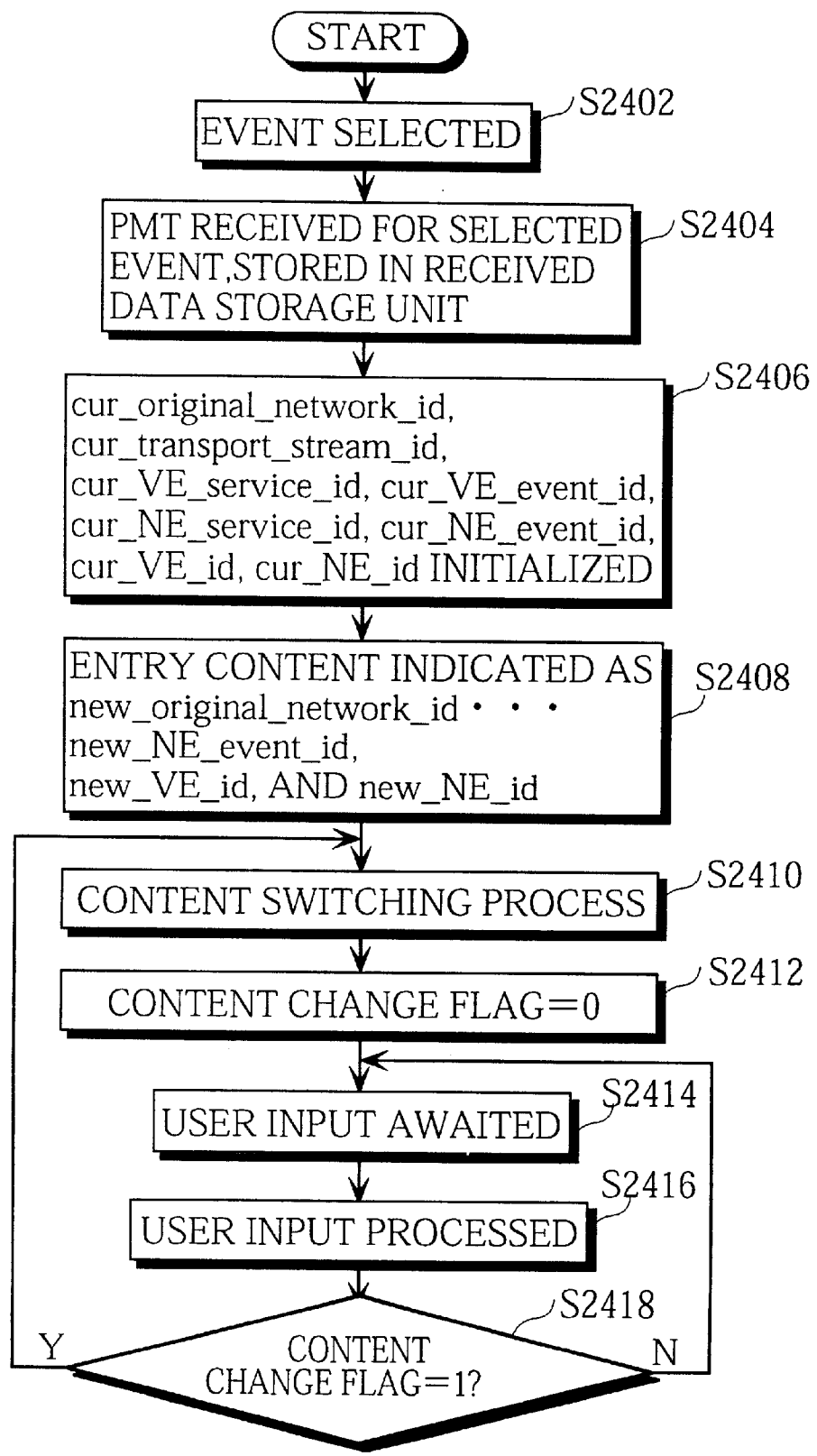
FIG. 28 is a flowchart showing the showing the entire operation of the data receiver apparatus of the present embodiment.

The following is a description of the entire operation procedure for the data reception apparatus 121 with reference to FIG. 28.

When the user switches the data reception apparatus 121 on, the reception control unit 126 operates in accordance with a predetermined procedure for MPEG2 system standard and DVB-SI standard to control the reception unit 122 and the TS decoder unit 123 so that the system information tables are received, with the reproduction unit 128 having a program table displayed on the display unit 129 to enable the user to select a program using an operation unit such as a remote controller. On receiving a selection signal from the operation unit via the signal reception unit 127, the reception control unit 126 selects an event out of the transmission data stored in the transmission data storage unit 102 sent in the transport stream transmitted by the transmission unit 106 of the data transmission apparatus 101. In doing so, the reception control unit 126 obtains the identifier of the event, the original_network_id, the transport_stream_id, the service_id, and the event_id (S2402).

When an event which has been multiplexed into the transmission data stored in the transmission data storage unit 102 is selected, the reception control unit 126 operates in accordance with a predetermined procedure for MPEG2 system standard and DVB-SI standard to refer to the system information tables. The reception control unit 126 then instructs the reception unit 122 to receive the transport stream transmitted by the transmission unit 106 and instructs the TS decoder unit 123 to separate the PMT corresponding to the selected event. The reception unit 122 receives the transport stream transmitted by the transmission unit 106 and outputs it to the TS decoder unit 123. The TS decoder unit 123 separates the PMT corresponding to the selected event and writes it into the system information table storage unit 134 in the received data storage unit 125, before notifying the reception control unit 126. On receiving notification of the reception of the PMT from the TS decoder unit 123, the reception control unit 126 refers to the PMT in the system information table storage unit 134 and obtains the PID of the PCR, before storing it in the filter condition storage unit 131 (S2404).

The reception control unit 126 sets the original_network_id of the selected event in the variable cur_original_network_id and set the transport_stream_id of the selected event into the variable cur_transport_stream_id. The reception control unit 126 also sets the service_id of the selected service into the variable cur_VE_service_id and the variable cur_NE_service_id, sets the event_id of the selected event into the variable cur_VE_event_id and the variable cur_NE_event_id, and clears the variable cur_VE_id and the variable cur_NE_id. These variables indicate the information for the identifiers of the content which is currently being reproduced (S2406).

The reception control unit 126 next sets the original_network_id of the selected event in the variable new_original_network_id, sets the transport_stream_id of the selected event into the variable new_transport_stream_id, sets the service_id into the variable new_VE_service_id and the variable new_NE_service_id, and sets the event_id of the selected event into the variable new_VE_event_id and the variable new_NE_event_id. The reception control unit 126 also refers to the PMT in the system information table storage unit 134 and sets the respective values of the entry_VE_id and the entry_NE_id into the variable new_VE_id and the variable new_NE_id (S2408).

Following this, the reception control unit 126 performs the content switching processing. The details of the contents switching processing are given later in this specification (S2410).

The reception control unit 126 next clears the value of the content change flag, which shows the content switching is necessary, to zero (S2412).

After this, the reception control unit 126 waits for notification from the signal reception unit 127 of an input of a signal for a selection operation made the user (S2414). When a signal is inputted from the signal reception unit 127, the reception control unit 126 processes the user input signal. The details of this processing are given later in this specification (S2416). The reception control unit 126 then judges whether the content change flag is set at "1" (S2418), and if so the processing returns to step S2410, or otherwise returns to step S2414.

1-3-11-2 Content Switching Processing

Figure 29:
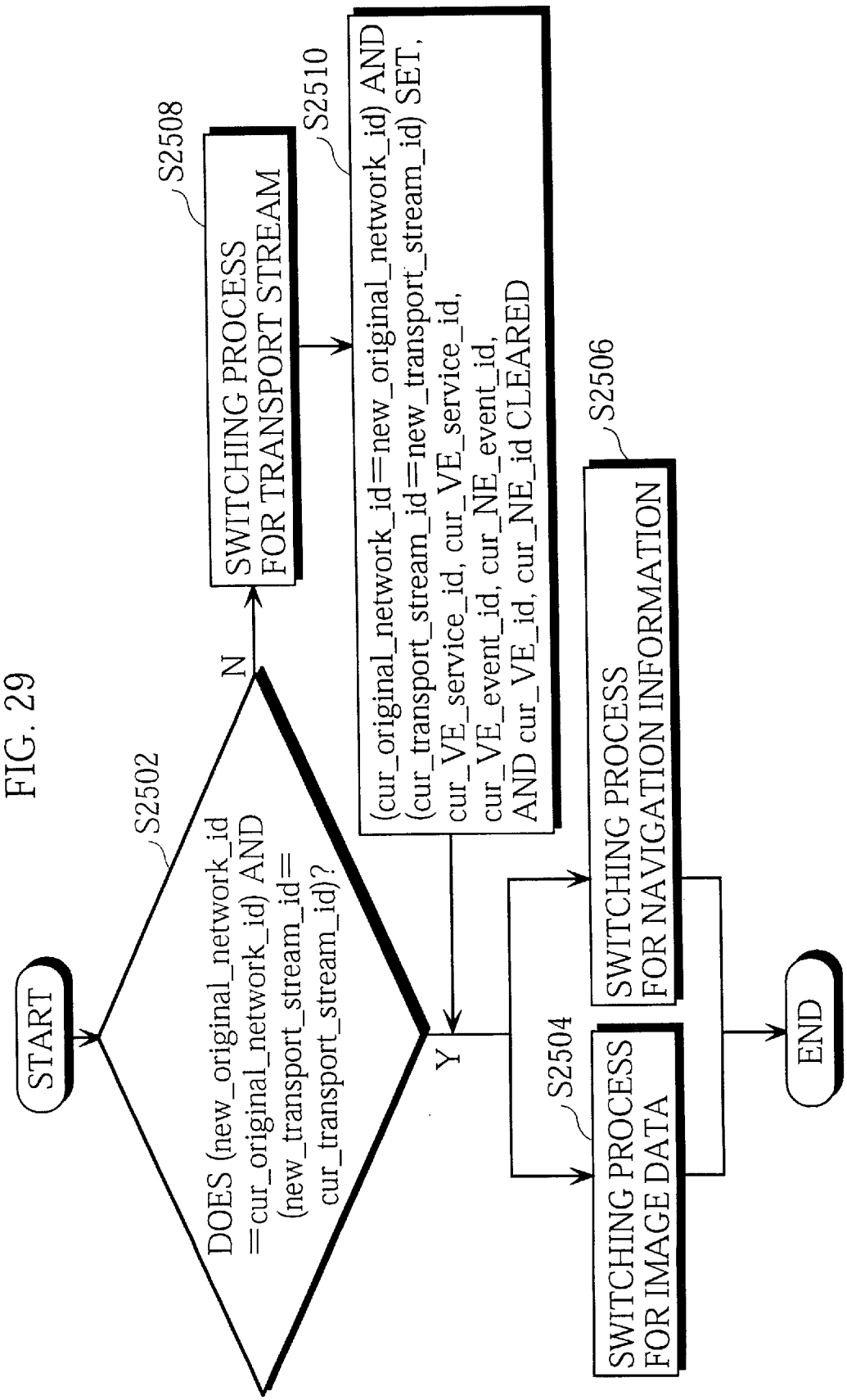
FIG. 29 is a flowchart showing the details of the processing in S2410 of the present embodiment.

The following is an explanation of the details of the contents switching processing in S2410, with reference to the flowchart in FIG. 29.

First, the reception control unit 126 judges whether the value of the variable new_original_network_id stored by the reception control unit 126 is the same as cur_original_network_id and whether the value of the variable new_transport_stream_id is the same as the cur_transport_stream_id (S2502). When both are affirmative, the reception control unit 126 performs the switching process for image data (S2504) and the switching process for navigation information (S2506) in parallel before terminating the procedure. When the variables are not equal, the reception control unit 126 refers to the system information tables and performs a switching process for the transport stream identified by the variable new_original_network_stream_id and the variable new_transport_stream_id (S2508), sets the value of the variable cur_original_network_id at the variable new_original_network_id, sets the value of the variable cur_transport_stream_id at the variable new_transport_stream_id, clears the values of the variables, cur_VE_event_id, cur_VE_id, cur_NE_event_id, cur_NE_id (S2510), and performs the switching process for image data (S2504) and the switching process for navigation information (S2506) in parallel before terminating the procedure.

1-3-11-3 Image Data Switching Processing

Figure 30:
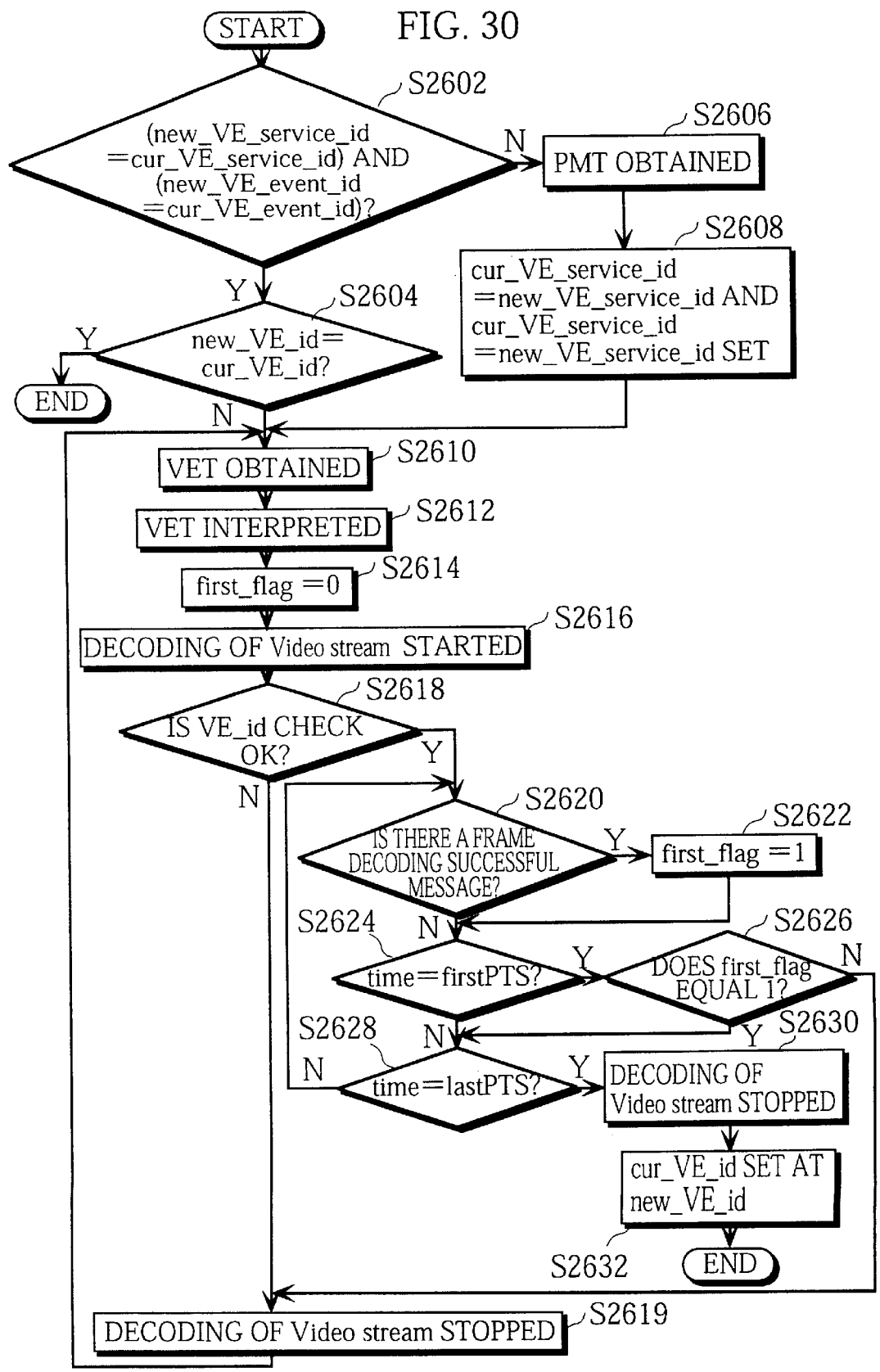
FIG. 30 is a flowchart showing the details of the processing in S2504 of the present embodiment.

The following is an explanation of the details of the image data switching processing in S2504, with reference to the flowchart in FIG. 30.

First, the reception control unit 126 judges whether the value of the variable new_VE_service_id stored by the reception control unit 126 is the same as cur_VE_service_id and whether the value of the variable new_VE_event_id is the same as the cur_VE_event_id (S2602). When both are affirmative, the reception control unit 126 judges whether the variable new_VE_id is equal to the cur_VE_id (S2604). If so, the reception control unit 126 terminates the processing, or if not, the reception control unit 126 advances to S2610. When the judgement in S2602 is negative, the reception control unit 126 refers to the system information tables corresponding to the variables new_VE_service_id and new_VE_event_id and instructs the TS decoder unit 123 to separate the PMT corresponding to the event identified by the variables new_VE_service_id and new_VE_event_id. The TS decoder unit 123 separates the indicated PMT and writes it into the system information table storage unit 134 of the received data storage unit 125, before notifying the reception control unit 126. On receiving notification of the separation of the PMT from the TS decoder unit 123, the reception control unit 126 refers to the received PMT and obtains the PID of the PCR which it then sets in the filter condition storage unit 131 (S2606). The reception control unit 126 then sets the value of the variable new_VE_service_id in the variable cur_VE_service_id and the value of the variable new_VE_event_id into the cur_VE_event_id (S2608).

The reception control unit 126 next refers to the PMT corresponding to the event identified by the variables cur_VE_service_id and cur_VE_event_id in the system information table storage unit 134 and obtains the PID of the component attached to the VE_Information_Component_Descriptor and sets the value of the variable new_VE_id as the table_id_extension in the filter condition for the stream correspondence table. The reception control unit 126 also sets this filter condition into the started condition. The TS decoder unit 123 then separates the stream correspondence table VET corresponding to the value of the variable new_VE_id from the transport stream in accordance with the filter condition, stores it in the stream correspondence information table storage unit 132, and notifies the reception control unit 126 (S2610).

The reception control unit 126 interprets the stream correspondence table VET in the stream correspondence information table storage unit 132 which was obtained in step S2610 and sets the value of "first_pts" in the variable firstPTS and the value of "last_pts" in the variable "lastPTS", before obtaining the values of the "stream_id" and the "component_tag" (S2612). Following this, the reception control unit 126 resets the value of the flag "first flag", which shows whether the decoding of the first frame of image data is complete, to zero (S2614).

After this, the reception control unit 126 refers to the PMT corresponding to the event identified by the variables cur_VE_service_id, cur_VE_event_id in the system information table storage unit 134, and obtains the PID of the component which transfers data of the data type "image data" and which has been given a stream_identifier descriptor of the same value as the "component_tag" obtained in S2612. The reception control unit 126 sets this PID and the "stream_id" obtained in S2612 in the filter condition for image data in the filter condition storage unit 131, and sets this filter condition for image data into the started state. The TS decoder unit 123 then separates the image data in accordance with this filter condition and outputs it to the AV decoder unit 124 (S2616).

The reception control unit 126 sends a message to the AV decoder unit 124 and so obtains the value of the image data identifier written into the private area of the image data separated by the TS decoder unit 123, which it then compares with the value of the variable new_VE_id (S2618). When these values match, the processing advances to S2620, while when they do not match, the processing switches to S2619.

The reception control unit 126 sets the filter condition for image data in the filter condition storage unit 131 into the stopped state (S2619), and the processing returns to S2610.

On completing the decoding of the image data outputted by the TS decoder unit 123, the AV decoder unit 124 notifies the reception control unit 126 of the completion of decoding. The reception control unit 126 judges whether it has received a decoding completion signal (S2620). When it has, the processing advances to S2622, or if not, the processing advances to S2624.

The reception control unit 126 sets the value of the flag first_flag at "1" (S2622).

The reception control unit 126 refers to the value of the clock unit of the AV decoder unit 124 and obtains the present time expressed in units of one ninety-thousandth of one second. The reception control unit 126 then compares the obtained value with the value of the variable firstPTS (S2624). When the value of the present time is greater than or equal to the value of the variable firstPTS, the processing advances to S2626, while when it is less than firstPTS, the processing advances to S2628. The reception control unit 126 judges whether the value of the flag first_flag is "1" (S2626). When the value of first_flag is "0", the processing proceeds to S2619, while when the value is "1", the processing advances to S2628.

In step S2628, the reception control unit 126 refers to the value of the clock unit of the AV decoder unit 124 and obtains the present time expressed in units of one ninety-thousandth of one second. The reception control unit 126 then compares the obtained value with the value of the variable lastPTS. When the value of the present time is less than the variable lastPTS, the processing returns to S2620. When, however, the value of the present time is greater than or equal to the value of the variable lastPTS, the reception control unit 126 sets the filter condition for the image data in the filter condition storage unit 131 into the stopped state (S2630) and sets the variable cur_VE_id at the value of the variable new_VE_id (S2632). The reception control unit 126 then terminates the reproduction processing of the image data.

1-3-11-4 Switching Process for Navigation Information

Figure 31:
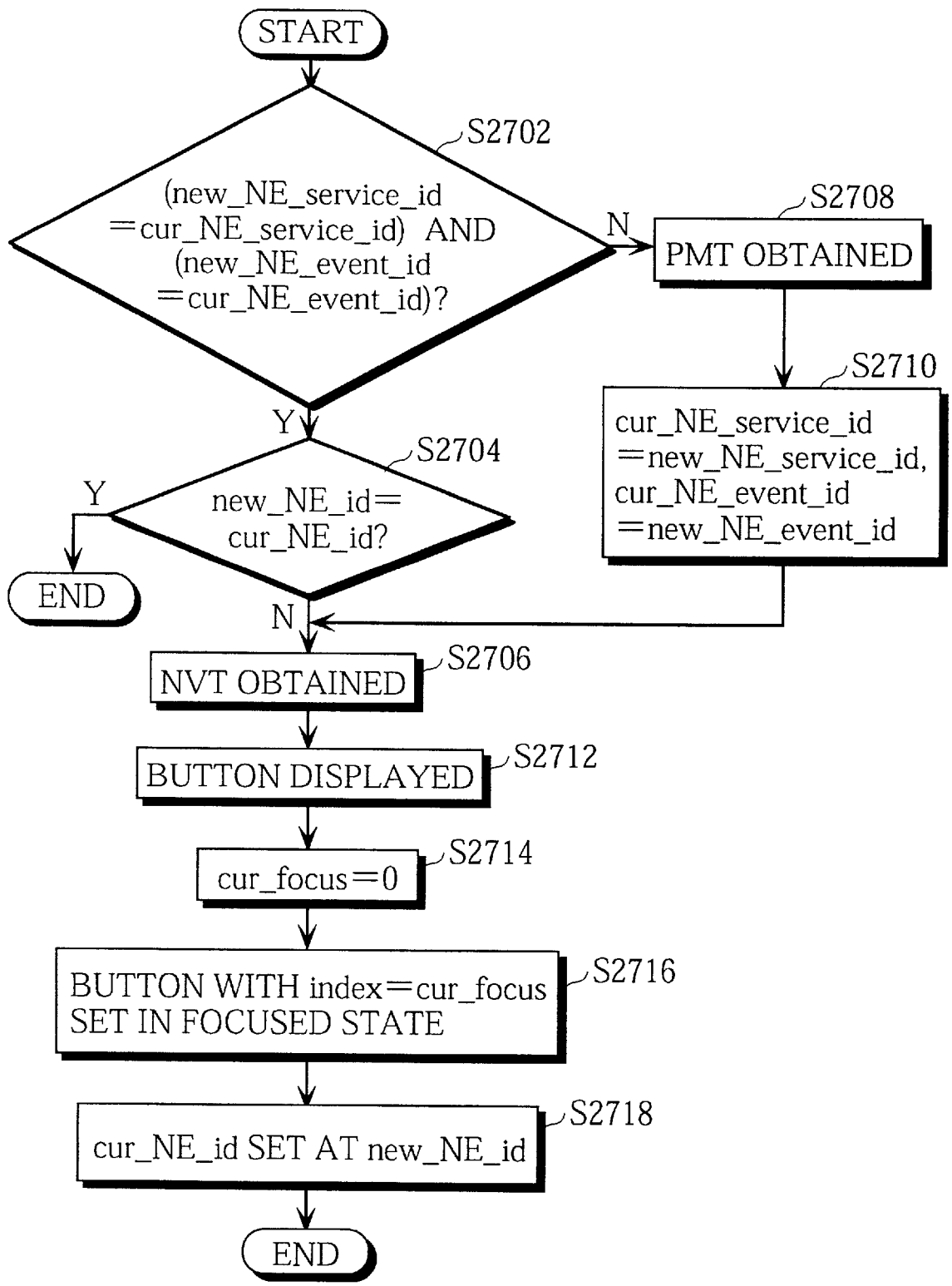
FIG. 31 is a flowchart showing the details of the processing in S2506 of the present embodiment.

The following is an explanation of the details of the navigation information switching processing in S2506, with reference to the flowchart in FIG. 31.

First, the reception control unit 126 judges whether the value of the variable new_NE_service_id stored by the reception control unit 126 is the same as cur_NE_service_id and whether the value of the variable new_NE_event_id is the same as the cur_NE_event_id (S2702). When both are affirmative, the reception control unit 126 judges whether the variable new_NE_id is equal to the cur_NE_id (S2704). If so, the reception control unit 126 terminates the processing, or if not, the reception control unit 126 advances to S2706. When the judgement in S2702 is negative, the reception control unit 126 refers to the system information tables corresponding to the variables new_NE_service_id and new_NE_event_id and instructs the TS decoder unit 123 to separate the PMT corresponding to the event identified by the variables new_NE_service_id and new_NE_event_id. The TS decoder unit 123 separates the indicated PMT and writes it into the system information table storage unit 134 of the received data storage unit 125, before notifying the reception control unit 126 (S2708).

The reception control unit 126 sets the value of the variable new_NE_service_id in the variable cur_NE_service_id and the value of the variable new_NE_event_id into the variable cur_NE_event_id (S2710).

In S2706, the reception control unit 126 refers to the PMT corresponding to the event identified by the variables cur_NE_service_id and cur_NE_event_id in the system information table storage unit 134 and obtains the PID of the component attached to the NE_Component_Descriptor and sets the value of the variable new_NE_id as the table_id_extension in the filter condition for the navigation information table. The reception control unit 126 also sets this filter condition into the started condition. The TS decoder unit 123 then separates the navigation information table NVT corresponding to the value of the variable new_NE_id from the transport stream in accordance with the filter condition, stores it in the navigation information table storage unit 133, and notifies the reception control unit 126 (S2706).

The reception control unit 126 next refers to the object definition table in the navigation information table NVT in the navigation information table storage unit 133 which was obtained in S2706 and obtains the display coordinates "X", "Y" of the button object. The reception control unit 126 next obtains the index number of the "Normal Bitmap" and refers to the bitmap table so that it can obtain the bitmap data corresponding to this index number. The reception control unit 126 uses this bitmap data to generate graphics information for buttons which it outputs to the reproduction unit 128. The reproduction unit 128 superimposes this graphics information onto the image data decoded by the AV decoder unit 124 and has the combined image displayed on the display unit 129 (S2712).

The reception control unit 126 resets the variable cur_focus which expresses the index number of the button object currently in the selected state to zero (S2714). The reception control unit 126 then refers to the object definition table of the navigation information table NVT obtained in S2706 and obtains the display coordinates "X", "Y" of the button object which has an index number equal to the value of the variable cur_focus. The reception control unit 126 next obtains the index number of the "Focused Bitmap" and refers to the bitmap table so that it can obtain the bitmap data corresponding to this index number. The reception control unit 126 sets the bitmap of the button with the index number corresponding to the value of the variable cur_focus as the bitmap for the selected state and generates graphics information for the button objects which it outputs to the reproduction unit 128. The reproduction unit 128 superimposes this graphics information onto the image data decoded by the AV decoder unit 124 and has the combined image displayed on the display unit 129 (S2716). The reception control unit 126 then sets the variable cur_NE_id at the value of the variable new_NE_id (S2718) and completes the switching processing for navigation information.

1-3-11-5 Processing for a User Input Signal

Figure 32:
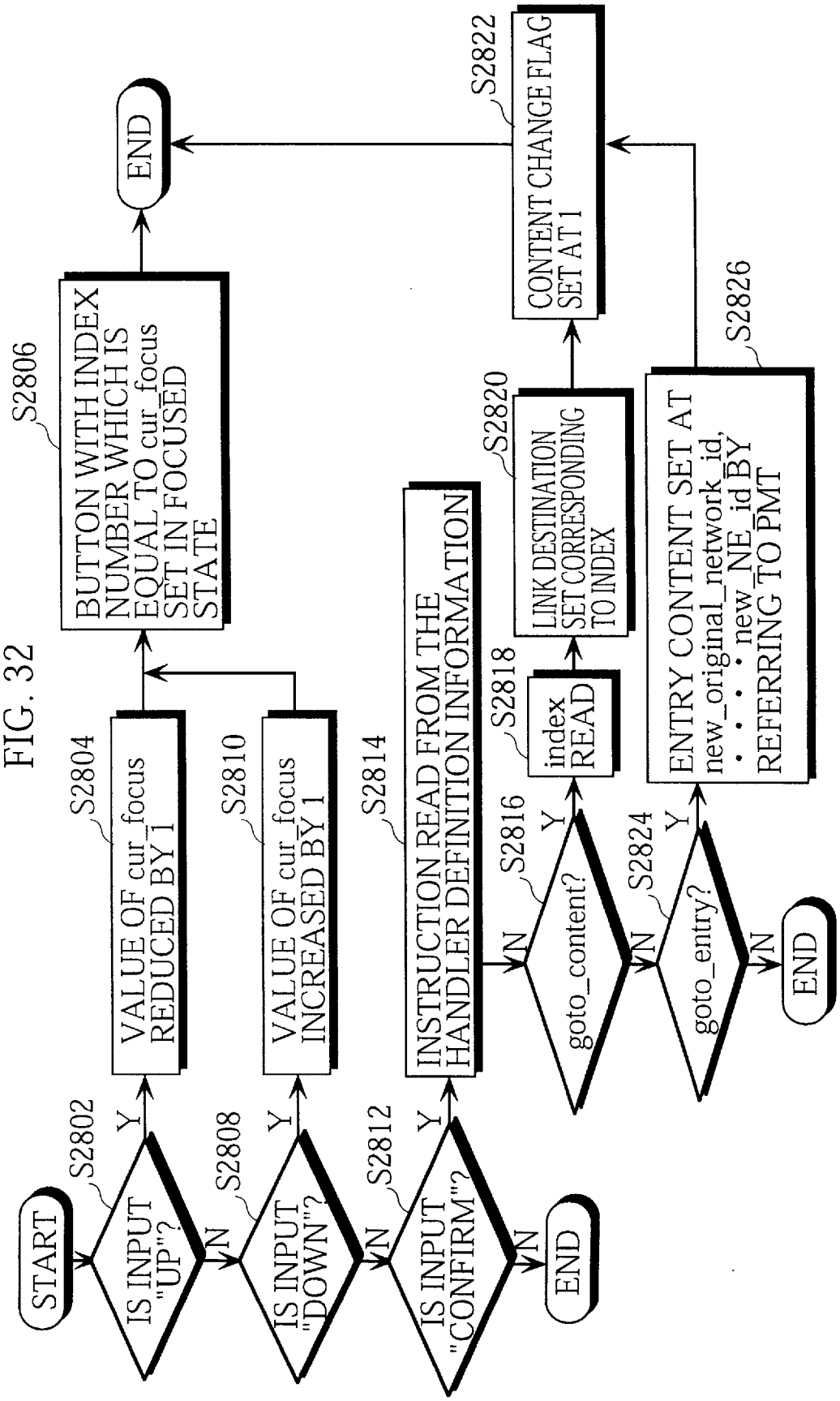
FIG. 32 is a flowchart showing the details of the processing in S2416 of the present embodiment.

The following is an explanation of the details of the processing for a user input signal in S2416, with reference to the flowchart in FIG. 32.

The reception control unit 126 first judges whether the user input reported by the signal reception unit 127 was an "up" signal. When it is an "up" signal, the processing advances to S2804, or if not, the processing advances to S2808 (S2802). In S2804, the reception control unit 126 reduces the value of the variable cur_focus by one. However, when the value of the variable cur_focus is already at zero, it is not reduced further and stays at zero.

The reception control unit 126 refers to the object definition table of the navigation information table NVT which was obtained in S2706 and which is stored in the navigation information table storage unit 133, and obtains the display coordinates "X", "Y" of the button object whose index number is equal to the variable cur_focus. Next, the reception control unit 126 obtains the index number of the "Focused Bitmap" and refers to the bitmap table so that it can obtain the bitmap data corresponding to this index number. Based on this information, the reception control unit 126 sets the bitmap of the button with the index number corresponding to the value of the variable cur_focus as the bitmap in the selected state, as well as setting the bitmap for the button corresponding to the index number which corresponds to the value of cur_focus as the bitmap in the normal state, before generating graphics information for the button objects and outputting the graphics information to the reproduction unit 128. The reproduction unit 128 superimposes the graphics information on the image data decoded by the AV decoder unit 124 and has the combined image displayed on the display unit 129 (S2806), and the reception control unit 126 terminates the user input processing.

In S2808 the reception control unit 126 judges whether the user input reported by the signal reception unit 127 was a "down" signal. When it is a "down" signal, the processing advances to S2810, or if not, the processing advances to S2812 (S2802). In S2810, the reception control unit 126 increases the value of the variable cur_focus by one. However, when the value of the variable cur_focus is already equal to the highest value out of the identifiers of the button objects in the navigation information table, it is not increased further and stays as it is with the processing proceeding to S2806.

In S2812 the reception control unit 126 judges whether the user input reported by the signal reception unit 127 was an "enter" signal. When it is an "enter" signal, the processing advances to S2814, or if not, the user input processing is terminated.

In S2814, the reception control unit 126 refers to the object definition table in the navigation information table NVT and obtains the index number of the handler of the button object whose index number is equal to the value of the variable cur_focus. The reception control unit 126 then refers to the handler definition table and reads the instruction word from the handler which corresponds to this index number. When the instruction word is "goto_content", the processing advances to S2818, while when this is not the case, the processing advances to S2824 (S2816).

In S2818, the reception control unit 126 reads the index number of the argument of the goto_content instruction from the handler.

After this, the reception control unit 126 refers to the hyperlink table for the navigation information table and sets the values of the original_network_id, the transport_stream_id, the VE_service_id, the VE_event_id, the VE_id, the NE_service_id, the NE_event_id, and the NE_id of the content which corresponds to the index number read in S2818 at the respective values of the new_original_network_id, the new_transport_stream_id, the new_VE_service_id, the new_VE_event_id, the new_VE_id, the new_NE_service_id, the new_NE_event_id, and the new_NE_id. However, when the identifiers have not been set values in the hyperlink table, which is to say the identifiers are given as "–", the original values are left unchanged (S2820).

The reception control unit 126 set the value of the content change flag at "1" (S2822) and terminates the user input processing.

In S2824, the reception control unit 126 judges whether the script instruction word is "goto_entry", and if not, terminates the user input processing. When the script instruction word is "goto_entry", the reception control unit 126 refers to the PMT corresponding to the event identified by the cur_NE_service_id and the cur_NE_event_id in the system information table storage unit 134, and sets the variable new_VE_id and the variable new_NE_id at the values of the "entry_VE_id" and the "entry_NE_id". The reception control unit 126 also sets the variables new_VE_service_id and new_VE_event_id at the values of the variables cur_NE_service_id and cur_event_id (S2826), before proceeding to step S2822.

As described above, the display can be switched between the display image 2301 shown in FIG. 27A and the display image 2303 shown in FIG. 27C in accordance with user operations.

1-3-12 Summary

As described above, the data reception apparatus 121 of the present invention can extract the presentation information and navigation information which are necessary for the reproduction of a specified content from the transport stream at the necessary time. By doing so, link destination contents can be extracted and reproduced in accordance with user operations, so that programs which allow user interaction can be achieved on a system which performs only one-directional communication.

It should be noted here that the reception unit 122, the TS decoder unit 123, the AV decoder unit 124, the reproduction unit 128, the display unit 129, the audio output unit 130, and the signal reception unit 127 in the data reception apparatus 121 may be provided using the same construction as a conventional digital TV broadcast receiver apparatus.

Accordingly, by merely adding the received data storage unit 125 and the reception control unit 126 described above to the reception unit, TS decoder unit and AV decoder unit of a conventional digital TV broadcast receiver apparatus, the interactive functions for programs of the present invention can be achieved.

By using such a conventional construction as it is, a reception apparatus is capable of receiving conventional digital satellite broadcasts in addition to achieving the interactive functions of the present invention.

1-3-13 Modifications

1-3-13-1

The present embodiment describes the case where all of the image data is for still images, although reproduction by the data reception apparatus 121 of the present embodiment is still possible when the image data is moving pictures.

1-3-13-2

The above explanation also describes the case when each content is the combination of image data and navigation information, although audio data may also be included. In such a case, the reception control unit 126 may be constructed so as to perform a switching process for audio data at the same time as the switching process for image data, and to output the audio data to an audio output unit 130. The switching process for audio data may be performed using the same method as the switching process for image data.

1-3-13-3

The above embodiment also describes an example where the script which is included in the handler definition table of the navigation information and which denotes the operation to be taken by the data reception apparatus 121 merely indicates switching of contents, although complex script which is made up of a plurality of instruction words is also possible.

As one example, when a program is for shopping information, the script may represent the calculation of the total cost of the products selected by the user. To do so, the reception control unit 126 of the data reception apparatus 121 is provided with the suitable functions for script execution. These functions may calculate the total cost, and output the result to the reproduction unit 128 which has the total cost displayed by the display unit 129.

For the example of shopping, script for the ordering of products may also be included. To achieve this, the script may contain an instruction for a modem (not illustrated) of the data reception apparatus 121, which is connected to a telephone line, to connect to the retailer's computer system and transmit data which is used to order the desired products. With this construction, the user is able to first view the product information, and then confirm the total cost of the products before placing the actual order.

Second Embodiment

Figure 33:
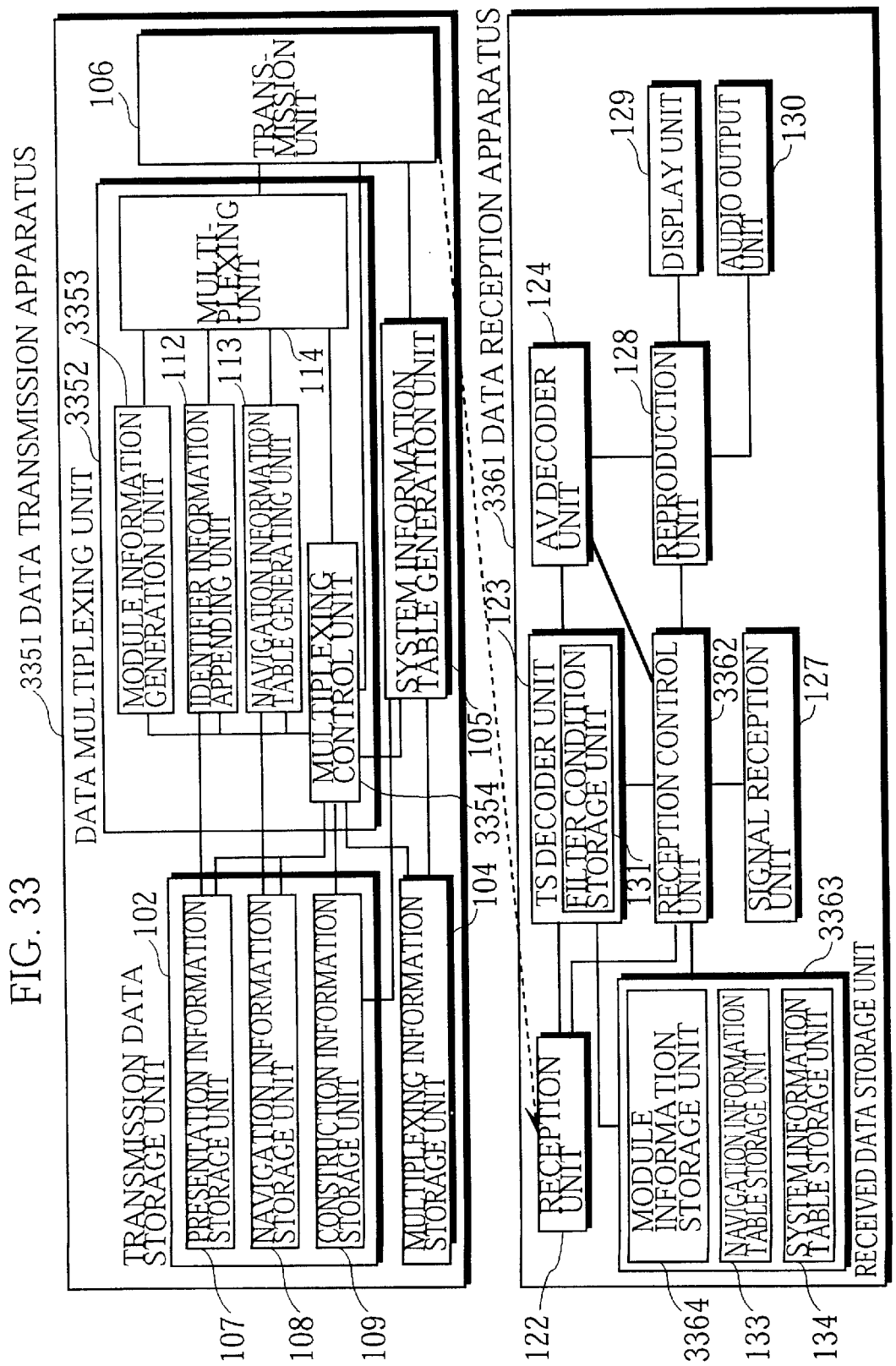
FIG. 33 shows the construction of the data transmission apparatus and the data reception apparatus of the digital broadcasting system in the second embodiment of the present invention.

FIG. 33 shows the construction of the digital broadcasting system of the second embodiment of the present invention. This digital broadcasting system is composed of a data transmission apparatus 3351 and a data reception apparatuses 3361. While the data transmission apparatus 101 multiplexes and transmits a stream correspondence table for each set of image data, the data transmission apparatus 3351 multiplexes and transmits module information tables for pluralities of sets of image data. These module information tables are used by the data reception apparatus 3361 to extract one set of image data from the stream transmitted from the data transmission apparatus 3351. While each stream correspondence table in the first embodiment only expressed identification information for one set of image data, each module information table expresses identification information for a plurality of sets of image data. Based on this difference, the data transmission apparatus 3351 is provided with a module information generation unit 3353 in place of the stream correspondence information table generating unit 111, and the data multiplexing unit 3352 which includes a multiplexing control unit 3354 in place of the multiplexing control unit 110.

In the same way, the data reception apparatus 3361 is provided with a data storage unit 3363 which includes a module information storage unit 3364 in place of the stream correspondence information table storage unit 132 of the first embodiment, and a reception control unit 3362 in place of the reception control unit 126.

The remaining components which are the same as in the first embodiment have been given the same reference numerals and their description has been omitted. The following explanation will instead focus on the differences with the first embodiment.

2-2 Construction of the Data Transmission Apparatus 3351

As described above, the data transmission apparatus 3351 includes a transmission data storage unit 102, a data multiplexing unit 3352 including a module information generation unit 3353 and a multiplexing control unit 3354, a multiplexed information storage unit 104, a system information table generating unit 105, and a transmission unit 106. The transmission data storage unit 102, multiplexed information storage unit 104, system information table generating unit 105, and transmission unit 106 are the same as in the first embodiment, and so will not be described.

2-2-1 Data Multiplexing Unit 3352

The data multiplexing unit 3352 includes a multiplexing control unit 3354, a module information generation unit 3353, an identifier information appending unit 112, a navigation information table generating unit 113, and a multiplexing unit 114. Of these, the identifier information appending unit 112, the navigation information table generating unit 113, and the multiplexing unit 114 are the same as in the first embodiment, and so will not be described.

2-2-1-1 Multiplexing Control Unit 3354 (part 1)

On being activated by the transmission unit 106, the multiplexing control unit 3354 generates the content identifier assigning table 701 and display image information identifier assigning table 801 according to the same procedure as the multiplexing control unit 110 in the first embodiment. On completing the generation, the multiplexing control unit 3354 instructs the module information generation unit 3353 to generate a module information table, instructs the identifier information appending unit 112 to add the identifier VE_id to the private area of the image data, and instructs the navigation information table generating unit 113 to generate a navigation information table.

2-2-1-2 Module Information Generation Unit 3353

On being instructed by the multiplexing control unit 3354 to generate a module information table, the module information generation unit 3353 refers to the display image information identifier assigning table 801 generates a module information table for U sets of image data. Here, "U" represents the number of sets of identification information for image data which are included in one module information table, with the value of U being given by the equation $U=P*S/2$. Here, in the same way as the first embodiment, P is the number of PIDs assigned to components which transfer image data, which S is the number of stream_ids which are assigned to image data. Here, U must be an integer. This can easily be ensured by setting at least one of P and S as an even number. In the present example, P=1 and S=16 in the same way as the first embodiment, so that the value of U becomes "8".

Module information table are used by the data reception apparatus 3361 to extract sets of image data from the stream transmitted by the data transmission apparatus 3351. Examples of module information tables where U=8 are shown in FIGS. 34A, 34B, and 34C. The module information table "MIT(0)" 3451 expresses the values of the component_tag and the stream_id which are respectively assigned to sets of image data whose VE_id identifiers are "0" to "7", so that this module information table is used when extracting any of image data "VE(0)" to "VE(7)" from the transport stream.

These module information tables can be generated according to the processes described below. Firstly, the module information generation unit 3353 sets the values of variables i and n at "0", and then investigates whether identifier information for U sets of image data can be extracted starting from the nth set of image data in the display image information identifier assigning table 801. When this is possible, the module information generation unit 3353 extracts the VE_id, component_tag, and stream_id for U sets of image data, before storing these items in a storage area (not illustrated) as the module information table "MIT(i)". The module information generation unit 3353 then adds "1" to the value of the variable i and adds U to the value of the variable "n", before repeating the process until identifier information can no longer be extracted, at which point the module information generation unit 3353 terminates the processing.

On terminating the generation of the module information generation unit 3353, the module information generation unit 3353 informs the multiplexing control unit 3354 of the completion of its processing.

2-2-2-3 Multiplexing Control Unit 3354 (part 2)

On receiving notification indicating the completion of the processing of the identifier information appending unit 112, the navigation information table generating unit 113, and the module information generation unit 3353, the multiplexing control unit 3354 determines the number of contents T to be repeatedly transmitted in one cycle. Here, T is given by $M \leq U*2n=T$ with M as the total number of contents stored in the transmission data storage unit 102. Here, n is the smallest integer which allows $M \leq T$ to be satisfied. In the present embodiment, M=63 and U=8 so that T is set at "64". In the same way as in the first embodiment, when the number of contents T in one cycle is greater than the total number of contents M, the multiplexing control unit 3354 multiplexes a null packet of a size given as at least the size of T−M times the size of the smallest content after first multiplexing all of the contents. By doing so, it can be ensured that a predetermined interval (at least U*smallest content size) will be maintained between the module information table and the image data identified by identification information included in the module information table.

Next, the multiplexing control unit 3354 refers to the multiplexed information storage unit 104 and informs the multiplexing unit 114 of the PCR_PID.

The multiplexing control unit 3354 then sets the multiplexing start position wp and the content counter i at "0", before finding the content number N and the module information number Q. Here, the content number N is given as the remainder of (i+U)/T (integer), while the module information number Q is given as the quotient of i/U (integer part). The multiplexing control unit 3354 judges whether the module information table MIT(Q) is stored in the module information generation unit 3353 and, when it is, instructs the multiplexing unit 114 to multiplex the module information table MIT(Q). In doing so, it informs the multiplexing unit 114 of the multiplexing start position wp, the bitrate B, and the "VE_information_component_pid" in the multiplexing information table 601 as the PID.

On being instructed the module information table MIT (N), the multiplexing unit 114 multiplexes the module information table into the transport stream using the indicated start position wp, bitrate B, and PID, in the same way as with a stream correspondence table VET.

When the module information table MIT(Q) is not stored in the module information generation unit 3353, the multiplexing control unit 3354 instructs the multiplexing unit 114 to multiplex a null packet of the same size as S_MIT, in doing so informing the multiplexing unit 114 of the bitrate B and the multiplexing start position wp. Here, S_MIT is the size given when a module information table MIT is converted into a transport packet. After this, the multiplexing control unit 3354 recalculates the multiplexing start position wp according to the equation wp=wp+S_MIT/B.

The multiplexing control unit 3354 next judges whether the image data VE(N) and the navigation information table NVT(N) are stored in the identifier information appending unit 112 or the navigation information table generating unit 113. When this information is stored, the multiplexing control unit 3354 instructs the multiplexing unit 114 to multiplex the image data VE(N) and the navigation information table NVT(N) in the same way as in the first embodiment, before recalculating the multiplexing start position wp. When the information is not stored, the multiplexing control unit 3354 instructs the multiplexing unit 114 to multiplex a null packet, in the same way as in the first embodiment, and recalculates the multiplexing start position wp. The multiplexing control unit 3354 has the multiplexing of image data VE(N) and the navigation information table NVT(N) repeated, incrementing the content number N by one each time until the content number N is equal to i+U. When N=i+U, the multiplexing control unit 3354 adds U to the value of i and repeats the processing from the calculation of the content number N and the module information number Q onwards.

2-2-1-4 Multiplexing Unit 114

Figure 35:
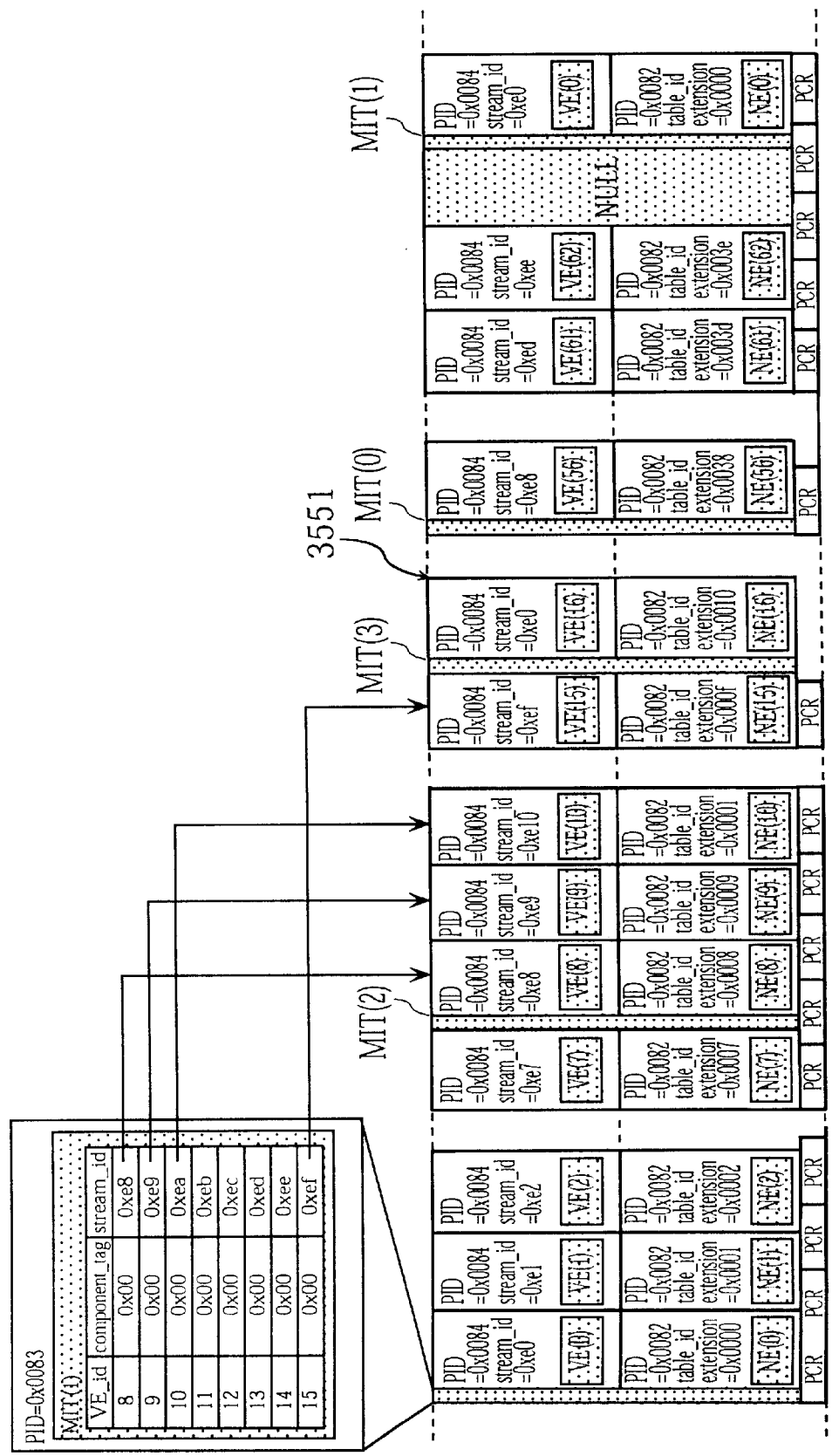
FIG. 35 is a model representation of a transport stream generated by the multiplexing unit of the present embodiment.

FIG. 35 shows an example of the transport stream generated by the multiplexing unit 114. While the transport stream 1701 in the first embodiment is such that one stream correspondence table is multiplexed for each set of image data, the transport stream 3551 of the present embodiment is such that one module information table is multiplexed for eight sets of image data. Here, each module information table MIT(N) is multiplexed at a position which is a distance equivalent to eight sets of image data ahead of the image data VE(N*8) to VE(N*8+7). Here, no image data with the same PID and stream_id as the image data corresponding to the module information table MIT(N) is multiplexed in this interval between the module information table MIT(N) and its corresponding image data. As a result, the data reception apparatus 3361 is able to extract the desired image data VE(N) by merely separating the first set of image data to appear, out of the plurality of sets of image data with the indicated PID and stream_id.

2-2 Operation of the Data Transmission Apparatus 3351

Figure 36:
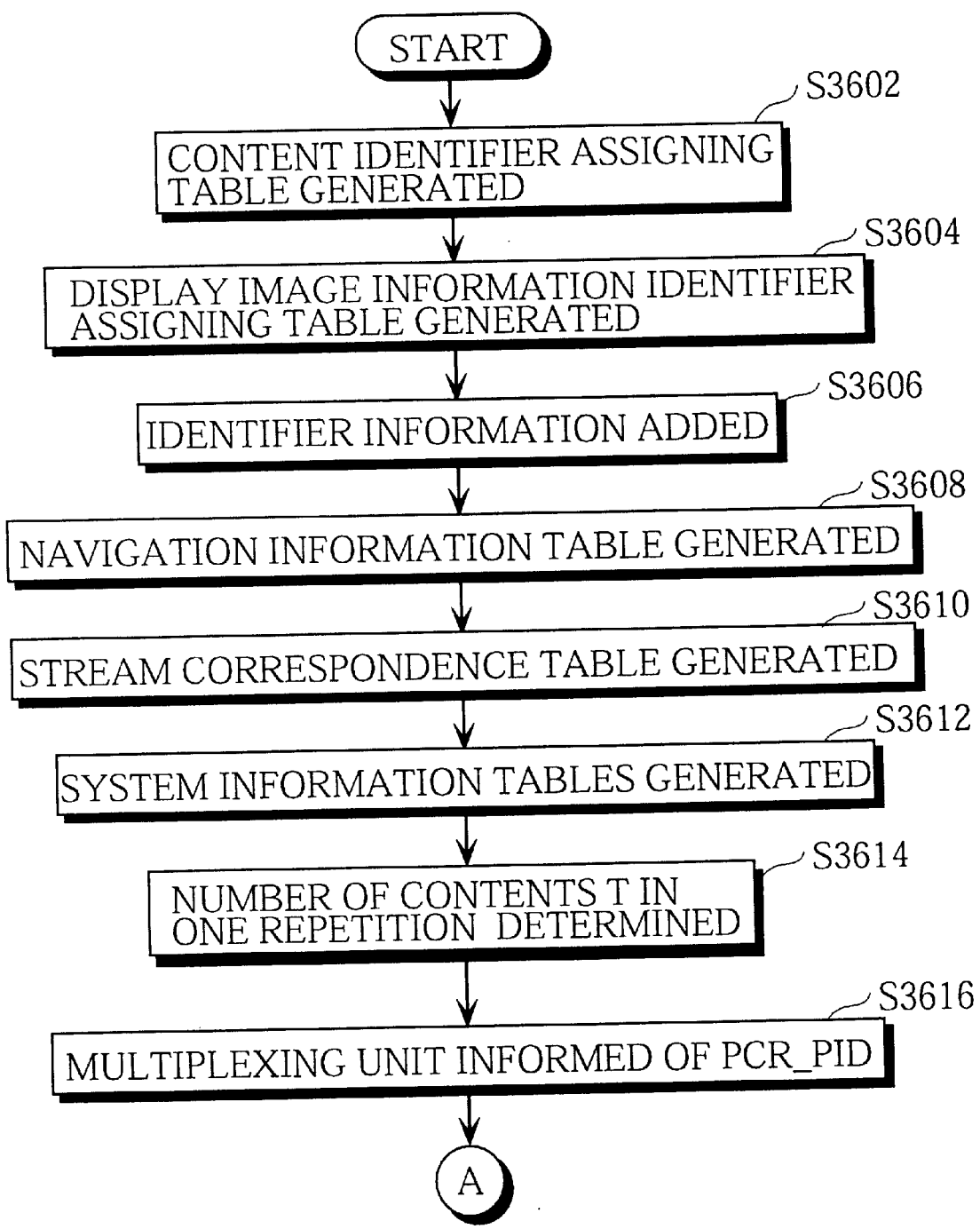
FIG. 36 is a flowchart for the operation of the data transmission apparatus in the present embodiment.
Figure 37:
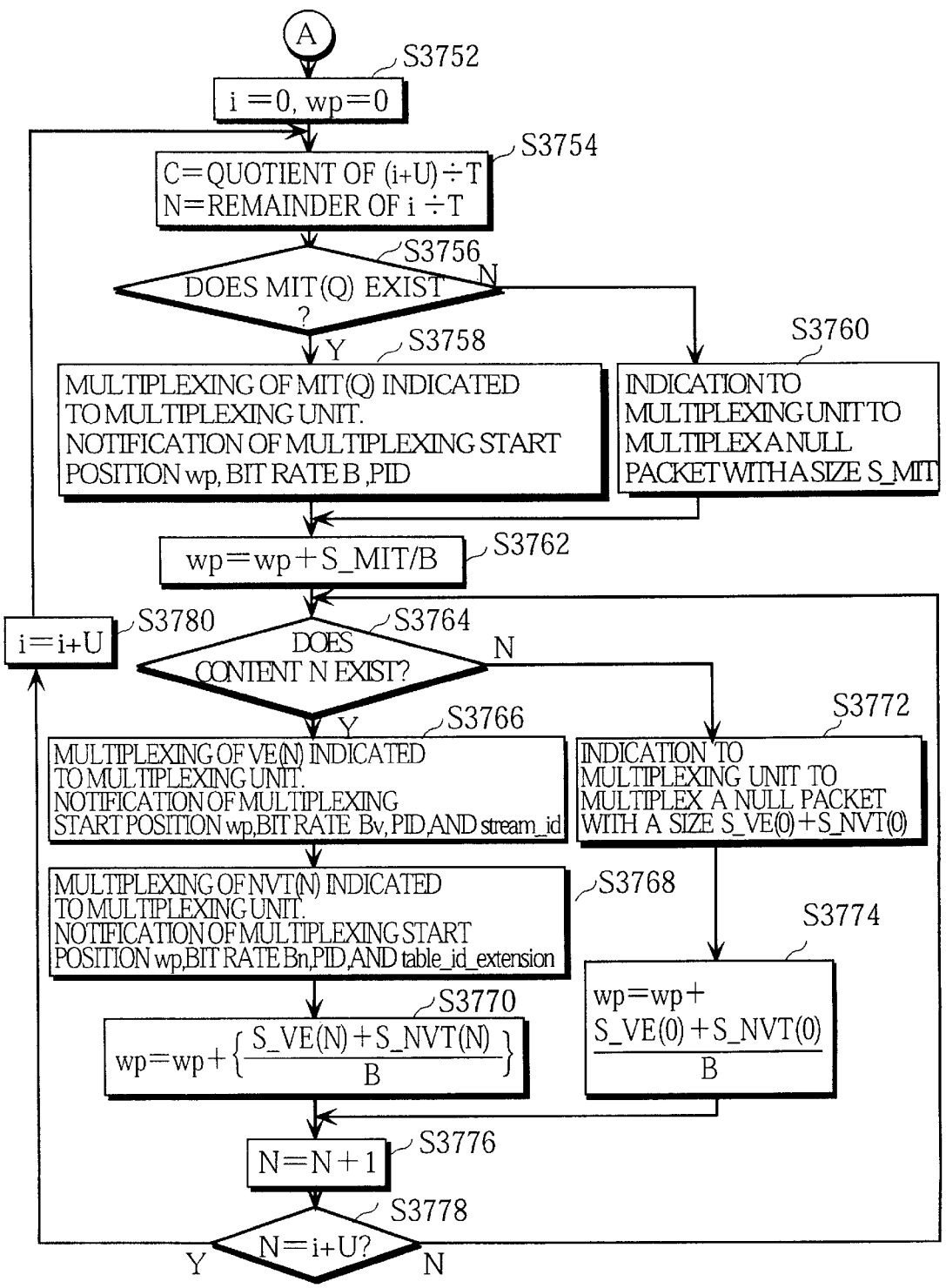
FIG. 37 is a flowchart for the operation of the data transmission apparatus in the present embodiment.

The following is an explanation of the operation of the data transmission apparatus 3351 of the present embodiment, with reference to FIGS. 36 and 37.

First, the multiplexing control unit 3354 generates the content identifier assigning table 701 (S3602), and then generates the display image information identifier assigning table 801 (S3604). The multiplexing control unit 3354 then activates the identifier information appending unit 112, the navigation information table generating unit 113, and the module information generation unit 3353.

The identifier information appending unit 112 appends image data identifiers to the private area of the image data and stores the appended data (S3606). The identifier information appending unit 112 then notifies the multiplexing control unit 110 of the completion of its processing. The navigation information table generating unit 113 generates navigation information tables (S3608) and notifies the multiplexing control unit 110 of the completion of its processing. The module information generation unit 3353 generates the module information tables (S3610) and notifies the multiplexing control unit 110 of the completion of its processing.

The system information table generating unit 105 then generates the various system information tables, such as the NIT, the SDT, the EIT, the PAT, and the PMT (S3612).

The multiplexing control unit 3354 determines the number of contents T in one repetition for when the contents are multiplexed into a transport stream (S3614), informs the multiplexing unit 114 of the PCR_PID, and instructs the multiplexing unit 114 to multiplex the PCR (S3616).

The multiplexing control unit 3354 next sets the content counter i and the multiplexing start position wp at "0" (S3752).

The multiplexing control unit 3354 finds the content number N and the module information number Q (S3754).

The multiplexing control unit 3354 judges whether the module information table MIT(Q) is present in the module information generation unit 3353 (S3756). If so, the multiplexing control unit 3354 informs the multiplexing unit 114 of the multiplexing start position wp, the bitrate B, and the PID and instructs the navigation information table generating unit 113 to multiplex the module information table MIT(Q) (S3758). When no module information table MIT(Q) is present, the multiplexing control unit 3354 instructs the multiplexing unit 114 to multiplex a null packet of a size S_MIT (S3760).

The multiplexing control unit 3354 then recalculates the multiplexing start position wp according to the equation wp=wp+S_MIT/B (S3762), investigates the identifier information appending unit 112 and the navigation information table generating unit 113 and judges whether the content N exists (S3764).

When the content N exists, the multiplexing control unit 3354 instructs the multiplexing unit 114 to multiplex the image data VE(N). In doing.so, the multiplexing control unit 3354 informs the multiplexing unit 114 of the multiplexing start position wp, bitrate Bv, PID, and stream_id (S3766). The multiplexing control unit 3354 also instructs the multiplexing unit 114 to multiplex the navigation information table NVT(N). In doing so, the multiplexing control unit 3354 informs the multiplexing unit 114 of the multiplexing start position wp, bitrate Bv,. PID, and table_id_extension (S3768). The multiplexing control unit 3354 then recalculates the multiplexing start position wp according to the equation wp=wp+{S_VE(N)+S_NVT(N)}/B (S3770), and advances to S3776.

When it judges in S3764 that no content N exists, the multiplexing control unit 3354 instructs the multiplexing unit 114 to multiplex a null packet of a size equivalent to S_VE(0)+S_NVT(0) (S3772), and recalculates the multiplexing start position wp according to the equation wp=wp+{S_VE(0)+S_NVT(0)}/B (S3774), and advances to S3776.

In S3776, the multiplexing control unit 3354 adds "1" to the content number N. The multiplexing control unit 3354 then judges whether the content number N matches the total of the value of the content counter i plus the number U of sets of identification information of image data included in one module information table (S3778). When the numbers match, the multiplexing control unit 3354 adds the value of U to the value of i (S3780) and returns to S3754. When the numbers do not match, the processing returns to S3764.

2-3 Construction of the Data Reception Apparatus 3361

The data reception apparatus 3361 is provided with a data storage unit 3363 which includes a module information storage unit 3364, which stores module information tables _separated by the TS decoder unit 123, in place of the stream correspondence information table storage unit 132 of the first embodiment, and a reception control unit 3362 which differs from that of the first embodiment, but is otherwise the same as the data reception apparatus 121 of the first embodiment.

2-3-1 Switching Process for Image Data

Figure 38:
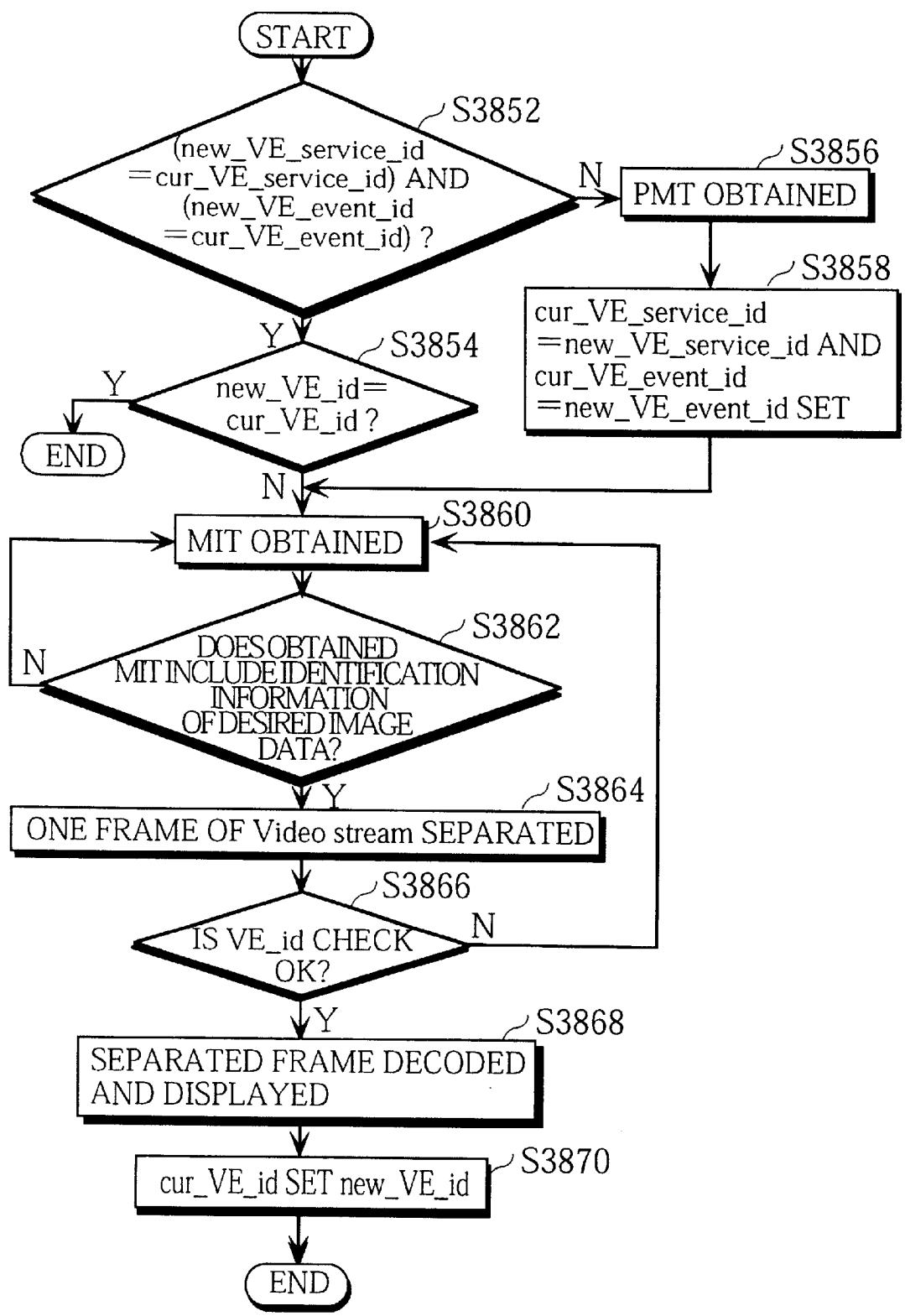
FIG. 38 is a flowchart for the image data switching process by the data reception apparatus in the present embodiment.

The processing of the reception control unit 3362 in the data reception apparatus 3361 differs from the reception control unit 126 in the first embodiment only in the switching process for image data which is part of the content switching process of S2504 shown in FIG. 29. Accordingly, the following explanation will only focus on the operation of the data reception apparatus 3361 when performing the switching of image data. This is explained with reference to the flowchart shown in FIG. 38.

On receiving an indication for the switching of image data, the reception control unit 3362 judges whether the variables new_VE_service_id is equal to the value of the cur_VE_service_id and whether the variable new_VE_event_id is equal to the cur_VE_event_id (S3852), in the same way as in the first embodiment. When this is the case, the reception control unit 3362 judges whether the new_VE_id is equal to the cur_VE_id (S3854). When this is the case, the reception control unit 3362 terminates the switching process, while when not the case, the reception control unit 3362 advances to S3860. When the judgement in S3852 is negative, the reception control unit 3362 refers to the system information tables corresponding to the variables new_VE_service_id and new_VE_event_id, and instructs the TS decoder unit 123 to separate the PMT corresponding to the event identified by the variables new_VE_service_id and new_VE_event_id. The TS decoder unit 123 then separates the indicated PMT and writes it into the system information table storage unit 134 in the received data storage unit 125, before notifying the reception control unit 3362. On receiving notification of the separation of the PMT, the reception control unit 3362 refers to the new PMT and obtains the PID of the PCR, which it then sets in the filter condition storage unit 131 (S3856). The reception control unit 3362 then sets the value of the value of the cur_VE_service _id at the value of the new_VE_service_id and the value of the cur_VE_event_id at the value of the new_VE_event_id (S3858).

The reception control unit 3362 refers to the PMT in the system information table storage unit 134 corresponding to the event identified by the variables cur_VE_service_id and cur_VE_event_id, and obtains the PID of the component to which the VE_Information_Component_Descriptor is attached. The reception control unit 3362 sets this PID in the filter condition for the module information in the filter condition storage unit 131 and sets this filter condition into the started state. Here, the filter condition for the module information has an output destination which, unlike the filter condition for the stream correspondence table in the first embodiment, is the module information storage unit 3364. The TS decoder unit 123 separates the module information MIT from the transport stream in accordance with the set filter condition and stores it in the module information storage unit 3364, before notifying the reception control unit 3362 (S3860).

Following this, the reception control unit 3362 judges whether the module information includes identification information of a set of image data which has a VE_id which is equal to the value of the variable new_VE_id (S3862). When such image data is included, the reception control unit 3362 obtains the "stream_id" and the "component_tag" of the of the image data from the module information. After this, the reception control unit 3362 refers to the PMT in the system information table storage unit 134 corresponding to the event identified by the variables cur_VE_service_id and cur_VE_event_id and, in the same way as the first embodiment, obtains the value of the PID which corresponds to the value of "component_tag", before setting this stream_id and PID in the filter condition for image data in the filter condition storage unit 131 and setting this filter condition into the started state. The TS decoder unit 123 separates one frame of image data in accordance with this filter condition and outputs it to the AV decoder unit 124, in addition to notifying the reception control unit 3362. On receiving notification of the separation of one frame of image data, the reception control unit 3362 sets the filter condition for image data into the stopped state (S3864).

The reception control unit 3362 gives an indication to the AV decoder unit 124 and obtains the value of the identifier of the image data given in the private area of the image data separated by the TS decoder unit 123, before comparing this value with the value of the variable new_VE_id (S3866). When the values match, the reception control unit 3362 advances to S3868, while if not, the process advances to S3860.

The reception control unit 3362 then instructs the AV decoder unit 124 to decode the separated image data. The AV decoder unit 124 then separates the image data separated by the TS decoder unit 123, with the image data being displayed by the display unit 129 via the reproduction unit 128 (S3868).

The reception control unit 3362 then sets the value of the variable new_VE_id into the variable cur_VE_id, before terminating the reproduction process for image data.

2-4 Summary

As described above, the present embodiment features a module information table in which a plurality of sets of identification information for image data are written, with the a module information table being multiplexed and transmitted for each of the plurality of sets of image data. The data reception apparatus 3361 is able to separate the desired image data and reproduce it, in accordance with the identification information of image data given in the module information table. As a result, interactive programs which allow user operations can be provided using a one-directional communication path.

2-5 Modifications 2-5-1

The present embodiment describes module information tables which includes component_tags and stream_ids for each set of image data, although, like the stream correspondence table of the first embodiment, reproduction start time information "first_pts" and reproduction end time information "last_pts" may also be included, so that the reception control unit 3362 may_be constructed to re-execute the obtaining of image data when, referring to the value of the "first_pts", the setting of the filter condition of image data is delayed. The reception control unit 3362 may also stop the decoding of image data after referring to the value of "last_pts".

2-5-2

The present embodiment has described the case where each content is composed of a combination of image data and navigation information, although audio data may also be included. When audio data is included, the data transmission apparatus 3351 multiplexes and transmits a module information table for audio data in the same way as image data, with the data reception apparatus 3361 performing a switching process for audio data at the same time as the switching process for image data, and having the audio data outputted by the audio output unit 130. Here, the multiplexing of audio data and the switching process for audio data may be achieved using the same process as the multiplexing of image data and the switching process for image data.

Third Embodiment

3-1 Outline Construction

The digital broadcast system of the third embodiment has largely the same construction as the digital broadcast system of the first embodiment, so that the present digital broadcast system will be explained with reference to the construction shown in FIG. 4.

The difference with the first embodiment lies in the inclusion of audio data in the presentation information in the presentation information storage unit 107 of the transmission data storage unit 102. As a result, contents in the present embodiment are composed of a combination of image data, audio data, and navigation information. The following explanation will only focus on the differences with the first embodiment.

3-2 Data Transmission Apparatus 101

3-2-1 Transmission Data Storage Unit 102

3-2-1-1 Presentation Information Storage Unit 107

Figure 39:
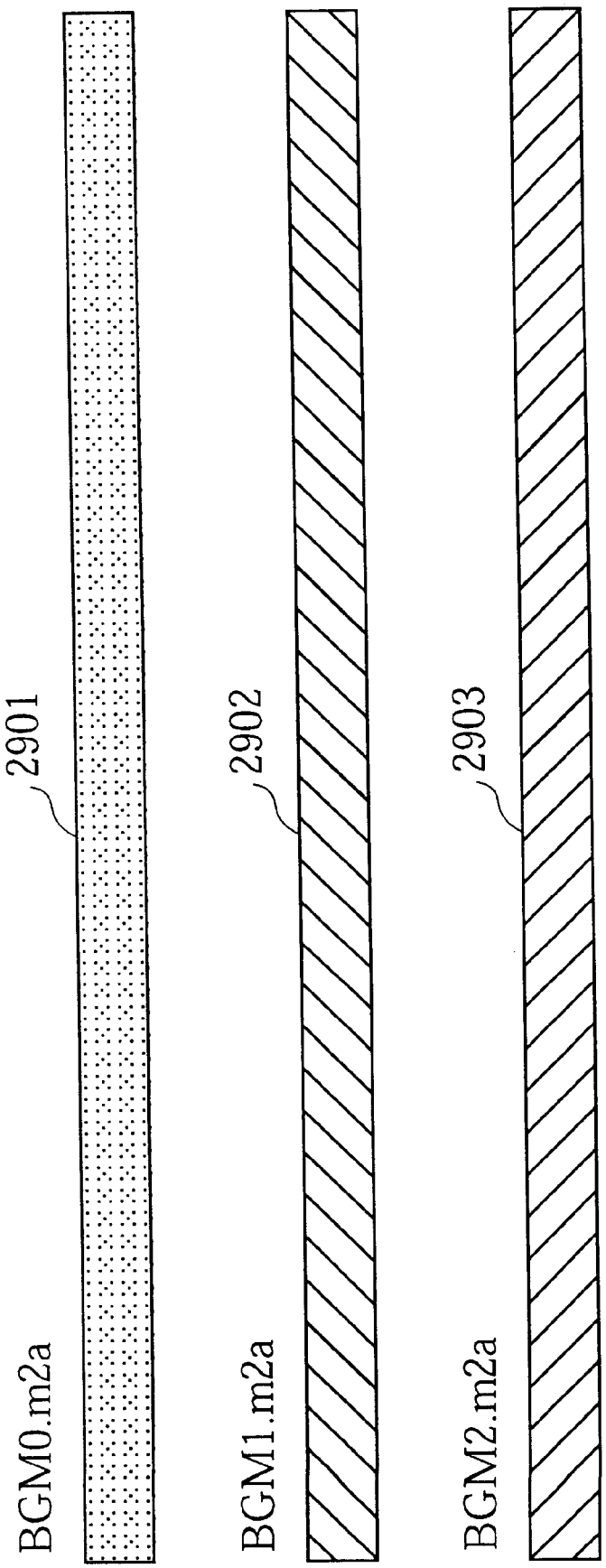
FIG. 39 shows examples of the audio data stored in the presentation information storage unit of the digital broadcasting system of the third embodiment of the present invention.

The presentation information storage unit 107 stores audio data, such as the audio data which is to be reproduced by the data reception apparatus 121 together with the corresponding image data as BGM (background music) or audio guidance, in addition to the image data stored by the presentation information storage unit 107 in the first embodiment. Examples of the audio data stored in the presentation information storage unit 107 are the audio data 2901 with the filename "BGM0.m2a", the audio data 2902 with the filename "BGM1.m2a", and the audio data 2903 with the filename "BGM2.m2a" which are shown in FIG. 39. These files are sources of music which is to be reproduced by the data reception apparatus 121 as BGM.

3-2-1-2 Construction Information Storage Unit 109

The construction information storage unit 109 stores the construction information table 3001 and the entry information 3002 shown in FIG. 40. Each content in the construction information table 3001 is given a content number, with this table showing the filenames of the image data 3004, audio data 3005, and navigation information 3006 which correspond to each content number. This is the equivalent of the addition of the item for the audio data 3005 to the construction information table 501 in the first embodiment, with the audio data in each content being reproduced at the same time as the image data of the content. As one example, reproduction of the audio data 2901 with the filename "BGM0.m2a" is indicated for the content with the content number "1" in the construction information table 3001, while reproduction of the audio data 2902 with the filename "BGM1.m2a" is indicated for the content with the content number "5".

3-2-2 Multiplexed Information Storage Unit 104

The multiplexed information storage unit 104 stores the multiplexing information table 3101 shown in FIG. 41. In addition to the multiplexing information table 601 of the first embodiment, the present multiplexing information table 3101 includes the values of the "AE_component_bitrate0" 3102, the "AE_component_pid0" 3103, the "AE_component_bitrate1" 3104, the "AE_component_pid1" 3105, "AE_component bitrate2" 3106, the "AE_component_pid2" 3107 for the audio data. This bitrate shows the transfer rate to be assigned when multiplexing the audio data 2901, the audio data 2902, and the audio data 2903 into an MPEG2 transport stream. The AE_component_pid (audio data component identifier), meanwhile, shows the value of the PID assigned to the component used to multiplex the audio data 2901, the audio data 2902, and the audio data 2903 stored in the presentation information storage unit 107.

3-2-3 Data Multiplexing Unit 103

3-2-3-1 Multiplexing Control Unit 110

On being activated by the transmission unit 106, the multiplexing control unit 110 reads the construction information table 3001 and the multiplexing information table 3101, and generates the content identifier assigning table which assigns the image data identifier VE_id and the navigation information identifier NE_id to each content number. This content identifier assigning table 3201 is shown in FIG. 42. The multiplexing control unit 110 then writes the values of the "service_id" and "event_id" read from the multiplexing information table 3101 into the AE_svc_id (audio data service identifier) 3202 and the AE_event_id (audio data event identifier) 3203 which were not entered in the content identifier assigning table 701 of the first embodiment. Here, instead of writing the value of the "AE_id" (audio data identifier), the multiplexing control unit 110 writes the value of the AE_comp_tag (audio data component tag) 3204. The value of this AE_comp_tag is the value of a component_tag which is assigned one-to-one to a PID of a component used for multiplexing the audio data assigned in the multiplexing information table 3101. As examples, the component_tag "0x00" is assigned to the PID "0x0085" and the component_tag "0x01" is assigned to the PID "0x0086". Here, the correspondence between the values of AE_comp_tag and the values of the PIDs is given in the PMT. The reason the AE_comp_tag 3204 is given instead of the AE_id is that the audio data 2901, the audio data 2902, and the audio data 2903 is background music or audio guidance which is to be continuously reproduced, and so is multiplexed into only one component. It should be noted that in the present embodiment, only a component_tag is assigned to audio data for background music, although a stream_id may also be assigned.

The multiplexing control unit 110 generates a same display image information identifier assigning table as the display image information identifier assigning table 801 of the first embodiment.

3-2-3-2 Navigation Information Table Generating Unit 113

On receiving an instruction from the multiplexing control unit 110 to generate a navigation information table, the navigation information table generating unit 113 reads the navigation information (see FIG. 6) stored in the navigation information storage unit 108 and, when it includes a hyperlink table, also refers to the content identifier assigning table 3201 to generate the navigation information table. FIG. 43 shows the generated navigation information table 3301 with the filename "NVT(5)". Unlike the navigation information table 1001 in the first embodiment, the identifiers for the audio data include the AE_comp_tag in place of the AE_id, with the multiplexing control unit 110 writing the value of the component_tag assigned to the PID of the component used to multiplex the audio data for the background music.

3-2-3-3 Multiplexing Unit 114

Figure 44:
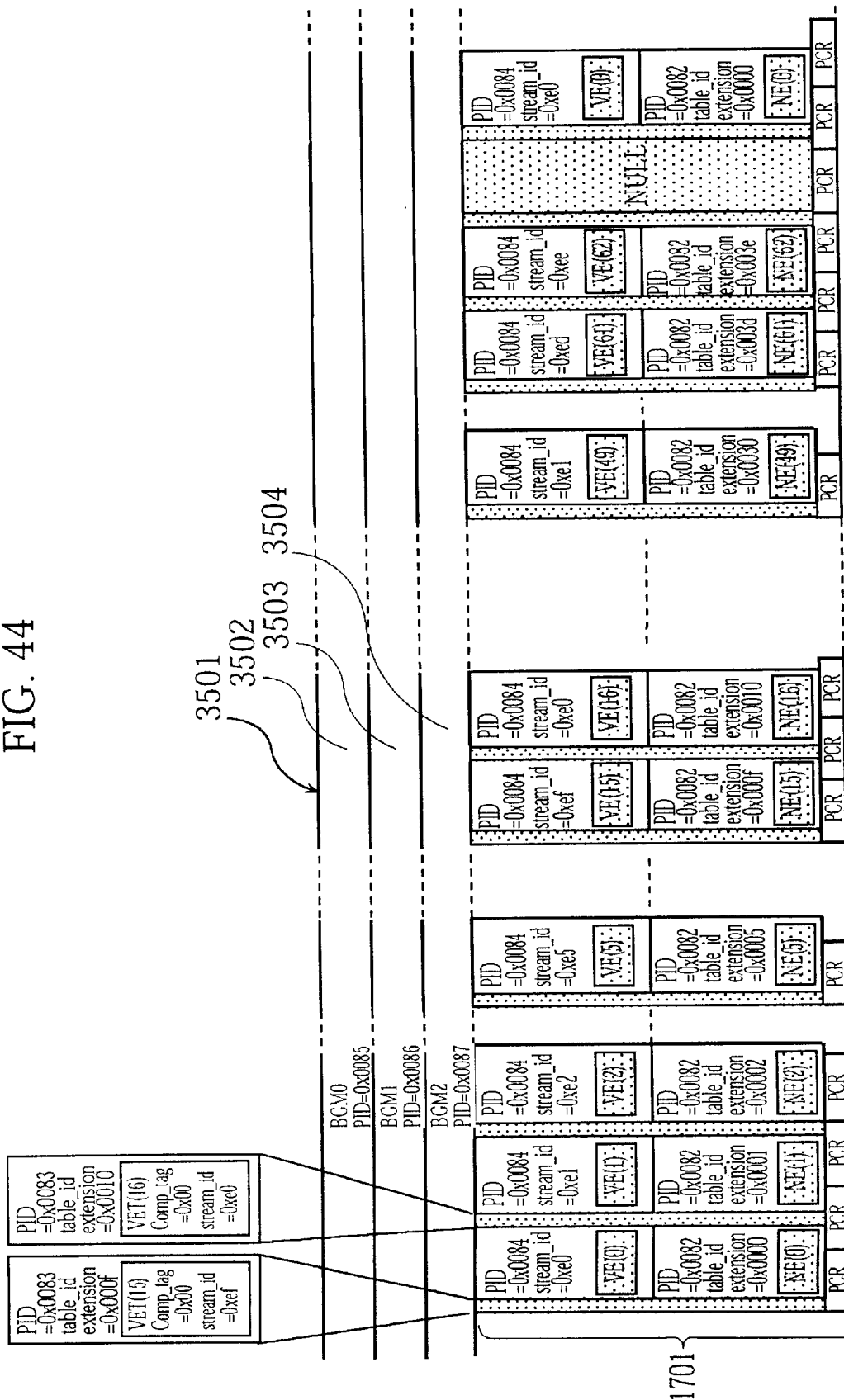
FIG. 44 is a model representation of the transport stream which is multiplexed by the multiplexing unit of the present embodiment.

The multiplexing unit 114 multiplexes the stream correspondence table VET(N), the image data VE(N) and navigation information table NE(N) into the transport stream, in the same way as in the first embodiment, and is first instructed by the multiplexing control unit 110 to perform multiplexing of the audio data 2901 from the multiplexing start position WP=0, with bitrate "0.5 Mbps" given as the "AE_component_bitrate" in the multiplexing information table 3101, and the PID "0x0085" given as the AE_component_pid. In the same way, the multiplexing unit 114 is instructed to multiplex the audio data 2902 using the PID "0x0086" and the audio data 2903 using the PID "0x0087". As shown by the transport stream 3501 in FIG. 44, the multiplexing unit 114 additionally multiplexes the stream 3502 of the audio data 2901, stream 3503 of the audio data 2902, and stream 3504 of the audio data 2903 into the transport stream 1701 of the first embodiment.

3-2-4 System Information Table Generating Unit 105

The system information table generating unit 105 generates the stream information table and PMT in the same way as in the first embodiment. The generated PMT 3401 is shown in FIG. 45A. In addition to the PMT 1501 of the first embodiment, the multiplexing control unit 110 refers to the multiplexing information table 3101 and writes the PIDs "0x0085", "0x0086", and "0x0087" of the components used to multiplex the audio data 2901, 2902, and 2903, as well as the value "0x03" of the "stream_type" showing that the data multiplexed into this component is audio data, and the stream_identifier_descriptor showing the values "0x00", "0x01", and "0x02" of the "component_tag" for these components. The multiplexing control unit 110 also writes the value "0x01" into the "entry_AE_comp_tag" which is the identifier of the audio data to be reproduced first when this event is selected, as shown by the Entry_descriptor 3402 in FIG. 45B.

3-2-5 Transmission Unit 106

Figure 46:
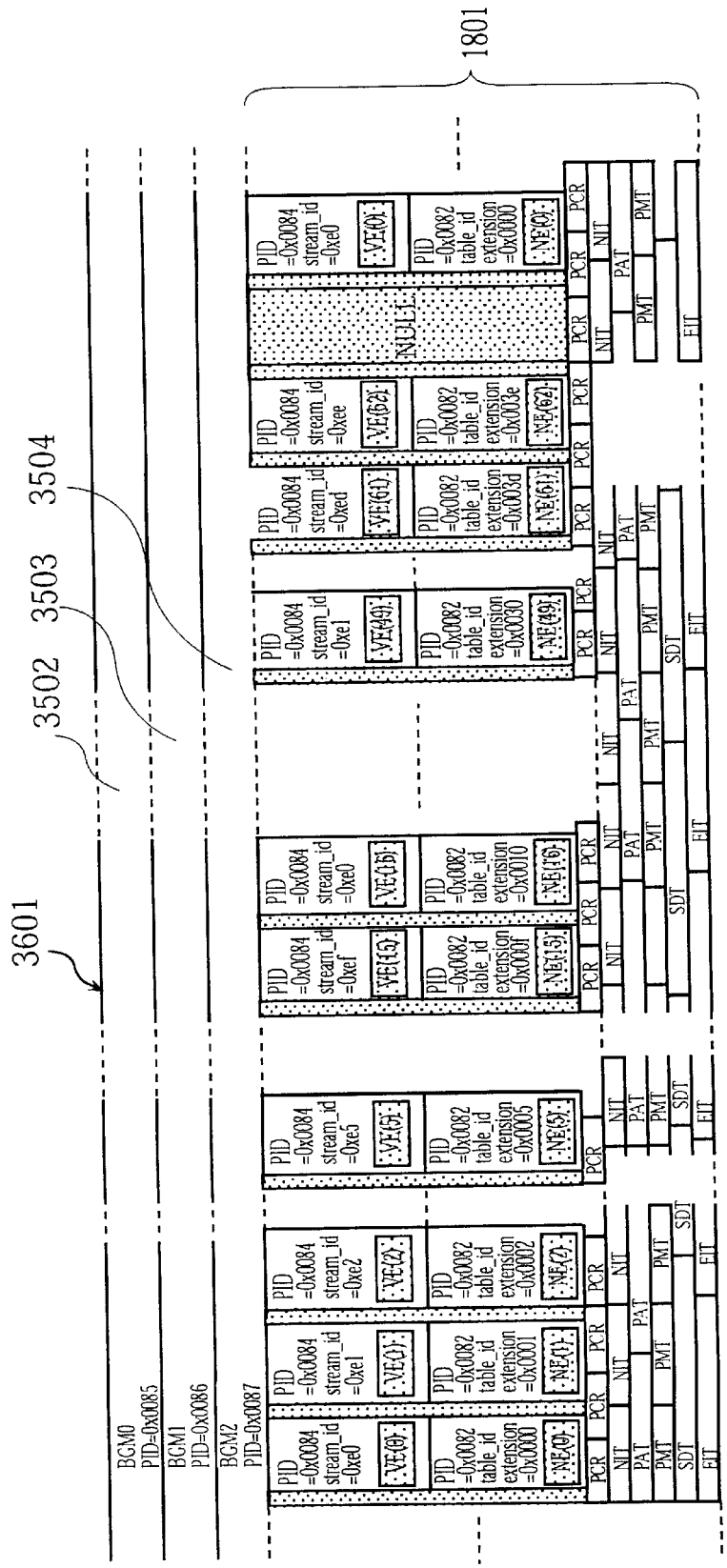
FIG. 46 is a model representation of the transport stream which is transmitted by the transmission unit of the present embodiment.

FIG. 46 shows the transport stream 3601 which is transmitted by the transmission unit 106. Here, the stream 3502 for the audio data 2901 which is assigned the identifier "0x0085", the stream 3503 for the audio data 2902 which is assigned the identifier "0x0086", and the stream 3504 for the audio data 2903 which is assigned the identifier "0x0087" are multiplexed, in addition to the transport stream 1801 of the first embodiment.

3-2-6 Operation of the Data Transmission Apparatus 101

The following is an explanation of the operations of the data transmission apparatus 101 of the present embodiment which differ to the operation in the first embodiment. After S1918 of the first embodiment (shown in FIG. 23), the multiplexing control unit 110 informs the multiplexing unit 114 of the bitrate "0.5 Mbps", the PID "0x0085", and the multiplexing start position wp "0", as well as indicating the multiplexing of the audio data 2901. The multiplexing unit 114 is also instructed to multiplex the audio data 2902 with the bitrate "0.5 Mbps", the PID "0x0086" and the multiplexing start position wp "0", and the audio data 2903 with the bitrate "0.5 Mbps", the PID "0x0087" and the multiplexing start position wp "0".

The multiplexing unit 114 then multiplexes this information in accordance with the instructions from the multiplexing control unit 110.

3-3 Data Reception Apparatus 121

3-3-1 Reception Control Unit 126

When an event multiplexed into the transmission data stored in the transmission data storage unit 102 is selected out of the transport stream 3601, the reception control unit 126 obtains the image data for the entry content and the navigation information table in the same way as the first embodiment and performs reproduction, in addition to referring to the PMT 3401 in the system information table storage unit 134 and obtaining the value "0x0086" of the PID for the component whose data type is "0x03" indicating audio data and which is attached the stream_identifier_descriptor which has a component_tag equal to the value "0x00" of the "entry_AE_comp_tag". After this, the reception control unit 126 sets the value "0x0086" into the "PID" entry of the filter condition for audio data in the filter condition storage unit 131 and sets this filter condition into the started state.

By doing so, the audio data 2902 with the file name "BGM1.m2a" shown in FIG. 39 can be reproduced by the audio output unit 130 at the same time as the display image 2301 shown in FIG. 27A is displayed by the display unit 129.

When the user inputs an operation signal, the reception control unit 126 performs the processing to obtain and reproduce the new image data and navigation information table, in the same way as in the first embodiment, as well as obtaining the identifier for the audio data from the hyperlink table of the navigation information table and setting it in the filter condition storage unit 131, so that new audio data can be obtained and reproduced. Here, for example, the display image 2301 shown in FIG. 27A for the national weather of Japan is displayed by the display unit 129 and the audio data 2902 for the background music is reproduced by the audio output unit 130, with the button "Tokyo" being in the selected state. Here, if the user presses the "Enter" key, the display image 2303 shown in FIG. 27C will be displayed by the display unit 129 as in the first embodiment. At the same time, the audio data 2901 with the filename "BGM0.m2a" shown in FIG. 39 will be reproduced as background music by the audio output unit 130, in accordance with the value "0x00" of the "AE_comp_tag" of the audio data corresponding to the content of the link destination indicated in the hyperlink table 3302 of the navigation information table NVT(5) 3301 in FIG. 43.

3-3-2 Operation of the Data Reception Apparatus 121

3-3-2-1 Entire Operation

Figure 47:
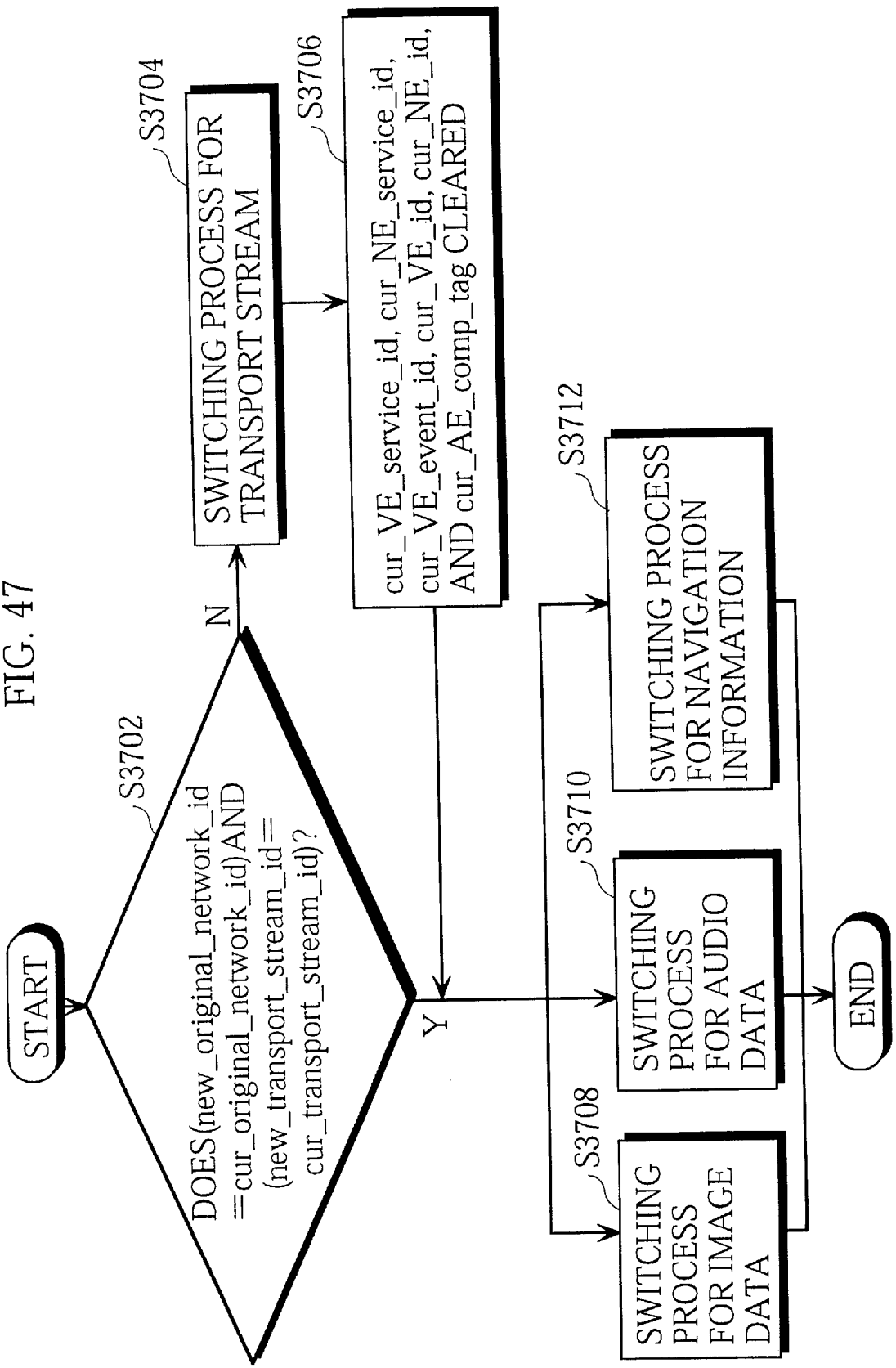
FIG. 47 is a flowchart for the audio switching operation of the present embodiment.

The following is an explanation of the operations of the data reception apparatus 121 which are particular to this embodiment, with reference to the flowchart in FIG. 47.

The reception control unit 126 performs the same judgement as in S2502 of the first embodiment (S3702), and when negative, performs the same process as in S2508 (S3704), before performing the process in S2510. In doing so, the reproduction control unit 126 also clears the variable cur_AE_comp_tag (S3706). After this, the reproduction control unit 126 performs the same switching of image data as S2504 (S3708), the same switching of navigation information as S2506 (S3712), and a switching of audio data (S3710) in parallel, before terminating the process.

3-3-2-2 Switching process for Audio data

Figure 48:
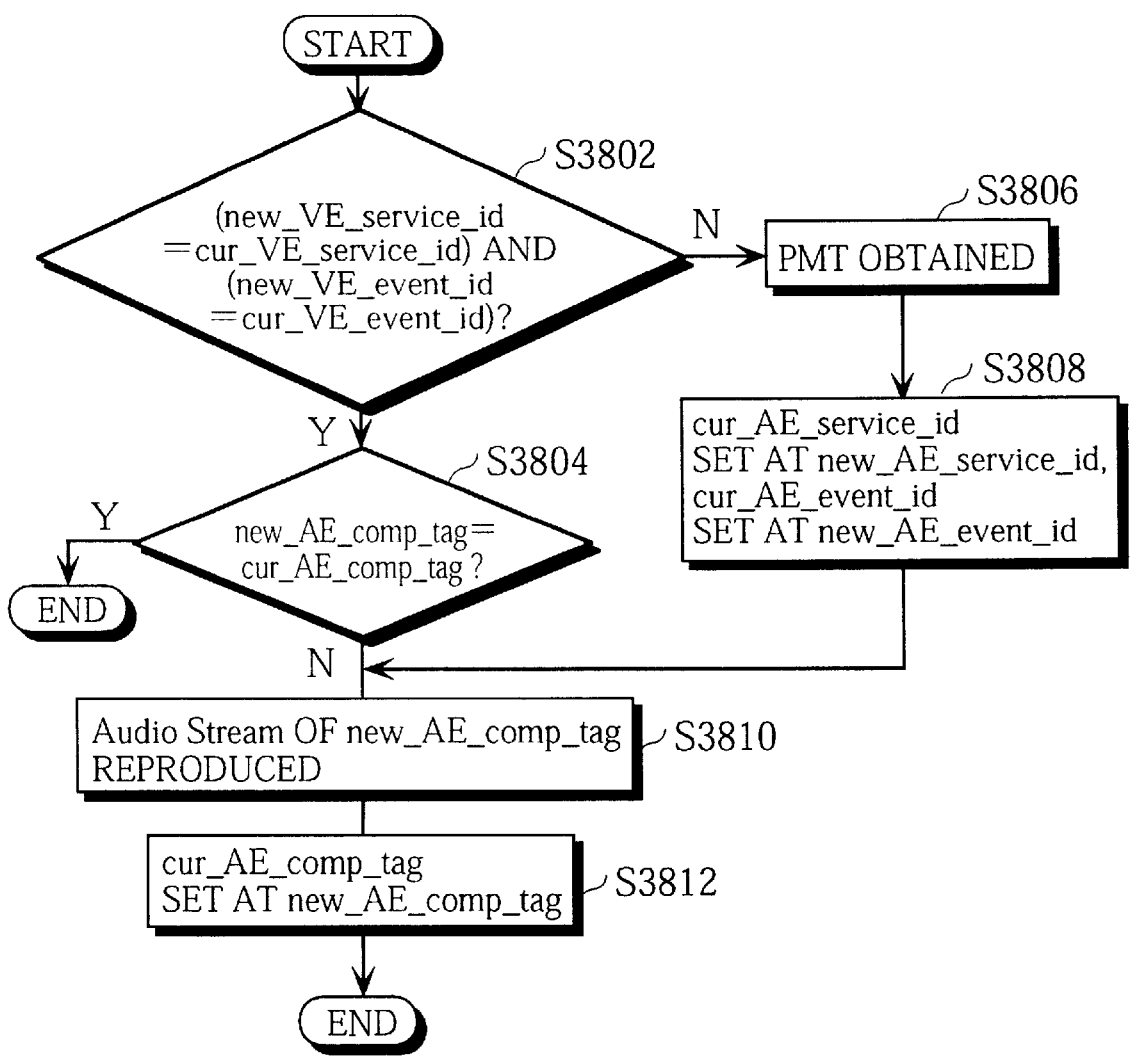
FIG. 48 is also a flowchart for the audio switching operation of the present embodiment.

The following is a detailed explanation of the switching process for audio data, with reference to the flowchart in FIG. 48.

The reception control unit 126 judges whether the variables new_AE_service_id is equal to the value of the cur_AE_service_id and whether the variable new_AE_event_id is equal to the cur_AE_event_id (S3802). When this is the case, the reception control unit 126 judges whether the new_AE_id is equal to the cur_AE_id (S3804). When this is the case, the reception control unit 126 terminates the switching process.

When the judgement in S3802 is negative, the reception control unit 126 obtains the PMT of the event identified by the variables new_AE_service_id and new_AE_event_id and obtains the PID of the component whose data type is "audio data" and which has a component_tag which is equal to the value of the variable new_AE_component_tag. The reception control unit 126 then sets the filter condition for audio data in the filter condition storage unit 131 and sets this filter condition in the started state (S3810). Following this, the reception control unit 126 sets the value of the variable new_AE_comp_tag into the variable cur_AE_comp_tag (S3812) and terminates the processing.

3-3-3 Summary

In addition to the functions of the first embodiment, the data transmission apparatus 101 of the present embodiment additionally transmits audio data, with the data reception apparatus 121 separating the audio data with the corresponding image data and navigation information and reproducing the image data and audio data. Accordingly, audio data, such as audio guidance and background music, can be additionally reproduced for the interactive programs described in the first embodiment. Since sets of audio data correspond to different contents, the background music and audio guidance can also be switched when switching image data.

4. Other Points of Note

It should be noted that the components of the data reception apparatus 121 of the first to third embodiments can be achieved by having a program which realizes the functions of the reception control unit shown in FIG. 4 recorded on a recording medium, such as a ROM card. This ROM card can then be inserted into a card slot provided in a data reception apparatus which is not provided with these functions, thereby converting the apparatus into the data reception apparatus of the present invention.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A digital broadcast reception apparatus for receiving a repeatedly transmitted digital broadcast of a plurality of sets of image data and sets of control information which correspond to the sets of image data, each set of control information including link destination for a link attached to a set of image data corresponding to the set of control information, the digital broadcast reception apparatus comprising:
reception means for receiving the digital broadcast;
extraction means for extracting one set of image data and a corresponding set of control information from the received digital broadcast;
storage means for storing the extracted set of control information;
reproduction means for reproducing the extracted set of image data;
operation means for receiving a user selection operation of link destination information included in the set of control information; and
extraction control means for reading the link destination information in the set of control information stored in the storage means and setting first and second extraction conditions for respectively controlling the extraction means to extract a set of image data based on said first extraction condition and a corresponding set of control information based on said second extraction condition which are indicated by the link destination information selected by the user selection operation.

2. The digital broadcast reception apparatus of claim 1, wherein each set of image data is appended with first image data identification information and each set of control information is appended with control information identification information, the operation means including an indication reception unit for receiving an operation indicating a switching from a currently displayed set of image data to a set of image data for a link destination, the extraction control means reading the link destination information in the set of control information stored in the storage means, and setting an extraction condition for the extraction means based on an image data identifier for a set of image data of the link destination to which switching has been indicated by the indication reception unit and a control information identifier for a corresponding set of control information, wherein each set of control information includes an image data identifier for identifying a set of image data for a link destination and a control information identifier for identifying a set of control information for the link destination as the link destination information, and wherein the extraction means extracts a set of image data and a set of control information according to the extraction condition set by the extraction control means.

3. The digital broadcast reception means of claim 2, wherein the plurality of sets of image data and plurality of sets of corresponding control information are transmitted having been multiplexed into a multiplexed stream, wherein the reproduction means includes a supplementary image reproduction unit for combining supplementary image information included in the control information stored in the storage means with a set of image data and reproducing the combined image, wherein the supplementary image information includes a supplementary image which is used to select a switching of image data from a present set of image data to a link destination set of image data.

4. The digital broadcast reception means of claim 2, wherein the plurality of sets of image data and plurality of sets of corresponding control information are transmitted having been multiplexed into a multiplexed stream, and each set of control information includes script information for supporting an interactive function, wherein the reproduction means includes:
a script information interpreting unit for interpreting script information; and
a script execution unit for executing scripts in the script information, in accordance with an interpretation of the script information interpreting unit.

5. The digital broadcast reception apparatus of claim 2,
wherein the plurality of sets of image data and corresponding sets of control information are transmitted having been multiplexed into a multiplexed stream,
wherein entry information, showing an image data identifier of a set of image data to be reproduced first when the reproduction of the multiplexed stream is commenced and a control information identifier of a set of control information corresponding to the set of image data, is multiplexed into the multiplexed stream,
wherein the extraction means includes an entry information extraction unit for receiving an indication from the extraction control means and extracting the entry information,
wherein the storage means includes an entry information storage unit for storing the entry information extracted by the entry information extraction unit, and
wherein the extraction control means sets the extraction condition in the extraction means based on the image data identifier and the control information identifier written in the entry information.

6. A digital broadcast reception apparatus for receiving a repeatedly transmitted digital broadcast of a plurality of sets of image data and sets of control information which correspond to the sets of image data, each set of control information including link destination information showing a set of image data which is a link destination for a link attached to a set of image data corresponding to the set of control information, each set of image data having first image data identification information, each set of control information having control information identification information, the plurality of sets of image data and corresponding sets of control information being multiplexed into a multiplexed stream and transmitted, the multiplexed stream including an image correspondence table for each set of image data, each image correspondence table including second image data identification information specifying a corresponding set of image data, each image correspondence table having identification information found from the image data identifier of the corresponding set of image data, the image correspondence tables being repeatedly transmitted in the same way as the sets of image data, the digital broadcast reception apparatus comprising:
reception means for receiving the digital broadcast;
extraction means for extracting one set of image data and a corresponding set of control information from the received digital broadcast,
the extraction means including an image correspondence table extraction unit for extracting an image correspondence table with image correspondence table identification information which matches a set extraction condition;
storage means for storing the extracted set of control information,
the storage means including an image correspondence table storage unit for storing the extracted image correspondence table;
reproduction means for reproducing an extracted set of image data;
operation means for receiving user selection operations for link destination information included in sets of control information,
the operation means including an indication receiving unit for receiving an indication for a switching from a set of image data presently being reproduced to a set of image data for a link destination; and
an extraction control means for controlling the extraction means to extract a set of image data and a set of corresponding control information indicated by the link destination information included in the control information, for reading the link destination information in the set of control information stored in the storage means, and for setting an extraction condition in the extraction means based on an image data identifier of a set of image data of a link destination to which switching has been indicated by the indication receiving unit and a control information identifier of a corresponding set of control information,
wherein each set of control information includes an image data identifier of a set of image data of a link destination and a control information identifier of a corresponding set of control information as the link destination information,
wherein the extraction means extracts a set of image data and a set of control information indicated by the extraction condition in the extraction means, and
wherein the extraction control means includes an extraction condition setting unit for setting image correspondence table identification information found from an image data identifier of a set of image data of the link destination as the extraction condition.

7. The digital broadcast reception apparatus of claim 6,
wherein the extraction control means further includes:
an image data extraction control unit for reading the second image data identification information written in the image correspondence table stored in the image correspondence table storage unit, and setting the extraction condition in the extraction means using the read second image data identification information;
and wherein the extraction means further includes:
an image data extraction unit for extracting a set of image data which matches the extraction condition set by the image data extraction control unit.

8. The digital broadcast reception apparatus of claim 7, wherein the sets of image data are such that identical first image data identification information have been repeatedly assigned to different sets of image data,
and wherein the reproduction means includes:
an identifier extraction unit for extracting an image data identifier included in the image data extracted by the image data extraction unit, the image data identifier having been written into a private area of the image data,
wherein the extraction control means further includes:
an image data judgement unit for judging whether the image data identifier of the set of image data extracted by the image data extraction unit matches the image data identifier of the set of image data for the link destination in the read link destination information;
a reproduction termination indicating unit for sending, when the image data judgement unit judges that the identifiers do not match, the reproduction means an indication to terminate reproduction, with the reproduction means terminating the reproduction on receiving the indication; and an image correspondence table extraction indicating unit for indicating an extraction of an image correspondence table to the image correspondence table extraction unit when the reproduction termination indicating unit has sent a reproduction termination indication.

9. The digital broadcasting reception apparatus of claim 8, wherein the extraction control means further includes an extraction termination indicating unit for indicating a termination of an extraction of a set of image data by the image data extraction unit when the image data judgement unit judges that the identifiers match, with the image data extraction unit terminating the extraction on receiving the indication.

10. The digital broadcast reception apparatus of claim 7, wherein each image correspondence table includes a reproduction start time for the corresponding set of image data, wherein the reproduction means further includes:
a clock unit for measuring time,
wherein the reproduction means decodes and reproduces the extracted set of image data, in doing so notifying the extraction control means of a completion of decoding on completing a decoding of one set of image data,
wherein the extraction control means further includes:
a reproduction start time judgement unit for judging whether a notification of the completion of decoding has been received from the reproduction means before the reproduction start time of the set of image data written in the image correspondence table; and
an extraction indicating unit for indicating a termination of an extraction of image data to the image data extraction unit when the reproduction start time judgement unit judges that no notification has been received, and for indicating an extraction of an image correspondence table to the image correspondence table extraction unit.

11. The digital broadcast reception apparatus of claim 7, wherein the first image data identification information is a combination of a stream identifier ("stream_id") and a packet identifier ("packet_id") according to MPEG2 (Moving Pictures Experts Group2) standard, wherein the second image data identification information is a combination of a stream identifier in accordance with MPEG2 standard and a component tag ("component_tag") in accordance with DVB (Digital Video Broadcasting) standard, with a correspondence table for the component tags and packet identifiers being multiplexed into the multiplexed stream and repeatedly transmitted, wherein the extraction means extracts the correspondence table and the extraction control means refers to the correspondence table, converts the second image data identification information to the first image data identification information, and sets the extraction condition in the image data extraction unit.

12. The digital broadcasting reception apparatus of claim 11, wherein the control information identification information is a table identifier extension ("table_id_extension"), in accordance with MPEG2 standard, which has a same value as the control information identifier.

13. The digital broadcasting reception apparatus of claim 7, wherein the first image data identification information and the second image data identification information are identical, with the image data extraction control unit setting the read second image data identification information as the extraction condition in the extraction means.

14. The digital broadcasting reception apparatus of claim 7, wherein a reproduction end time of the corresponding set of image data is written into the image correspondence table, wherein the reproduction means further includes a clock unit for measuring time,
and wherein the extraction control means further includes:
an end time judgement unit for judging whether the reproduction end time written in the image correspondence table has been reached; and
an extraction termination indicating unit for indicating a termination of extraction of a set of image data to the image data extraction unit, when the end time judgement unit judges that the reproduction end time has been reached.

15. A digital broadcast reception apparatus for receiving a repeatedly transmitted digital broadcast of a plurality of sets of image data and sets of control information which correspond to the sets of image data, each set of control information including link destination information showing a set of image data which is a link destination for a link attached to a set of image data corresponding to the set of control information, each set of image data having first image data identification information, each set of control information having control information identification information, the plurality of sets of image data and corresponding sets of control information being multiplexed into a multiplexed stream and transmitted, the multiplexed stream including an image correspondence table for each set of image data, each image correspondence table including second image data identification information specifying a corresponding set of image data, each image correspondence table having identification information found from the image data identifier of the set of image data, the image correspondence tables being repeatedly transmitted in the same way as the sets of image data, the digital broadcast reception apparatus comprising:
reception means for receiving the digital broadcast;
extraction means for extracting one set of image data and a corresponding set of control information from the received digital broadcast,
the extraction means including an image correspondence table extraction unit for extracting an image correspondence table with image correspondence table identification information which matches a set extraction condition, a reproduction end time for a corresponding set of image data being written in each image correspondence table;
an image data extraction unit for extracting sets of image data which match the set extraction condition from the multiplexed stream;
storage means for storing the extracted set of control information,
the storage means including an image correspondence table storage unit for storing the extracted image correspondence table;
reproduction means for reproducing an extracted set of image data, wherein the reproduction means includes a clock unit for measuring time;
operation means for receiving user selection operations for link destination information included in sets of control information,
the operation means including an indication receiving unit for receiving an indication for a switching from a set of image data presently being reproduced to a set of image data for a link destination; and an extraction control means for controlling the extraction means to extract a set of image data and a set of corresponding control information indicated by the link destination information included in the control information, for reading the link destination information in the set of control information stored in the storage means, and for setting an extraction condition in the extraction means based on an image data identifier of a set of image data of a link destination to which switching has been indicated by the indication receiving unit and a control information identifier of a corresponding set of control information, wherein each set of control information includes an image data identifier of a set of image data of a link destination and a control information identifier of a corresponding set of control information as the link destination information, wherein the extraction means extracts a set of image data and a set of control information indicated by the extraction condition in the extraction means, and wherein the extraction control means includes:
an extraction condition setting unit for setting image correspondence table identification information found from an image data identifier of a set of image data as the extraction condition;

an end time judgement unit for judging whether the reproduction end time of a set of image data which is written in the image correspondence table has been reached; and an extraction state control unit for controlling the image data extraction unit to extract sets of image data which correspond to the extraction condition from the multiplexed stream, for a time period from a setting of the extraction condition by the extraction condition setting unit to a point when the end time judgement unit judges that the reproduction end time of the image data has been reached.

16. A digital broadcast reception apparatus for receiving a repeatedly transmitted digital broadcast of a plurality of sets of image data, a plurality of sets of audio data and sets of control information which each correspond to one set of image data and one set of audio data, each set of control information including link destination information showing a set of image data and a set of audio data of a link destination for a link attached to a set of image data corresponding to the set of control information, the digital broadcast reception apparatus comprising:
reception means for receiving the digital broadcast;
extraction means for extracting one set of image data, one set of audio data and a corresponding set of control information from the received digital broadcast;
storage means for storing the extracted set of control information;
reproduction means for reproducing the extracted set of image data and extracted set of audio data;
operation means for receiving a user selection operation of link destination information included in the set of control information; and
extraction control means for reading the link destination information in the set of control information stored in the storage means and setting first, second, and third extraction conditions for respectively controlling the extraction means to extract a set of image data based on said first extraction condition, a set of audio data based on said second extraction condition, and a corresponding set of control information based on said third extraction condition which are indicated by the link destination information selected by the user selection operation.

17. The digital broadcast reception apparatus of claim 16, wherein the operation means includes:
an indication reception unit for receiving an operation indicating a switching from a currently displayed set of image data to a set of image data for a link destination, the extraction control means reading the link destination information in the set of control information stored in the storage means, and setting an extraction condition for the extraction means based on an image data identifier for a set of image data of the link destination to which switching has been indicated by the indication reception unit, an audio data identifier for a corresponding set of audio data, and a control information identifier for a corresponding set of control information, wherein each set of control information includes an image data identifier for identifying a set of image data for a link destination, an audio data identifier for identifying a set of audio data for a link destination, and a control information identifier for identifying a set of control information for the link destination as the link destination information, and wherein the extraction means extracts a set of image data, a set of audio data, and a set of control information in accordance with the extraction condition set by the extraction control means.

18. The digital broadcast reception apparatus of claim 17, wherein the multiplexed stream includes: an image correspondence table for each set of image data, each image correspondence table having image correspondence table identification information found from the image data identifier of the corresponding set of image data and each image correspondence table including second image data identification information for the corresponding set of image data; and an audio correspondence table for each set of audio data, each audio correspondence table having audio correspondence table identification information found from the audio data identifier of the corresponding set of audio data and each audio correspondence table including second audio data identification information for the corresponding set of audio data, the image correspondence tables and audio correspondence tables being multiplexed into the multiplexed stream and repeatedly transmitted, wherein the extraction control means includes:
an extraction condition setting unit for setting image correspondence table identification information found from an image data identifier of a set of image data and audio correspondence table identification information found from an audio data identifier of a set of audio data as the extraction condition, wherein the extraction means includes:
an image correspondence table extraction unit for extracting an image correspondence table with image correspondence table identification information which matches the extraction condition set by the extraction condition setting unit from the multiplexed stream; and
an audio correspondence table extraction unit for extracting an audio correspondence table with audio correspondence table identification information which matches the extraction condition set by the extraction condition setting unit from the multiplexed stream, and wherein the storage means includes:

an image correspondence table storage unit for storing the image correspondence table extracted by the image correspondence table extraction unit; and an audio correspondence table storage unit for storing the audio correspondence table extracted by the audio correspondence table extraction unit.

19. The digital broadcasting reception apparatus of claim 18, wherein the extraction control means further includes:

an image data extraction control unit for reading the second image data identification information written in the image correspondence table stored in the image correspondence table storage unit, and setting the extraction condition in the extraction means using the read second image data identification information;

an audio data extraction control unit for reading the second audio data identification information written in the audio correspondence table stored in the audio correspondence table storage unit, and setting the extraction condition in the extraction means using the read second audio data identification information;

and wherein the extraction means further includes:

an image data extraction unit for extracting a set of image data which matches the extraction condition set by the image data extraction control unit; and an image data extraction unit for extracting a set of image data which matches the extraction condition set by the image data extraction control unit.

20. The digital broadcast reception means of claim 17, wherein the plurality of sets of image data and plurality of sets of corresponding control information are transmitted having been multiplexed into a multiplexed stream, wherein the reproduction means includes a supplementary image reproduction unit for combining supplementary image information included in the control information stored in the storage means with a set of image data and reproducing the combined image, wherein the supplementary image information includes a supplementary image which is used to select a switching of image data from a present set of image data to a link destination set of image data.

21. A digital broadcast reception apparatus for receiving a repeatedly transmitted digital broadcast of a plurality of sets of image data and sets of control information which each correspond to one set of image data, each set of control information including link destination information showing a set of image data of a link destination for a link attached to a set of image data corresponding to the set of control information, each set of image data having first image data identification information, each set of control information having control information identification information, the plurality of sets of image data and corresponding sets of control information being multiplexed into a multiplexed stream and transmitted, a plurality of sets of module information, into which correspondence between a plurality of image data identifiers and a plurality of second image data identification information is written, being multiplexed into the multiplexed stream, the digital broadcast reception apparatus comprising:

reception means for receiving the digital broadcast;

extraction means for extracting one set of image data and a corresponding set of control information from the received digital broadcast, the extraction means including a module information extraction unit for extracting module information after an extraction condition for module information has been set;

storage means for storing the extracted set of control information, the storage means including a module information storage unit for storing the extracted module information;

reproduction means for reproducing an extracted set of image data;

operation means for receiving user selection operations for link destination information included in sets of control information, the operation means including an indication receiving unit for receiving an indication for a switching from a set of image data presently being reproduced to a set of image data for a link destination; and an extraction control means for controlling the extraction means to extract a set of image data and a set of corresponding control information indicated by the link destination information included in the control information, for reading the link destination information in the set of control information stored in the storage means, and for setting an extraction condition in the extraction means based on an image data identifier of a set of image data of a link destination to which switching has been indicated by the indication receiving unit and a control information identifier of a corresponding set of control information, wherein each set of control information includes an image data identifier of a set of image data of a link destination and a control information identifier of a corresponding set of control information as the link destination information, wherein the extraction means extracts a set of image data and a set of control information indicated by the extraction condition in the extraction means, and wherein the extraction control means further includes an image data identifier judgement unit for judging whether there is an image data identifier, which matches an image data identifier of the set of image data of the link destination read from the link destination information, in the module information stored in the module information storage unit, an image data extraction control unit for reading, when the image data identifier judgement unit judges that a matching image data identifier is present, second image data identification information corresponding to the image data identifier from the module information and for setting an extraction condition for image data in the extraction means, using the second image data identification information, and a module information re-extraction indicating unit for indicating an extraction of new module information to the module information extraction unit when the image data identifier judgement unit judges that a matching image data identifier is not present, wherein on receiving an indication from the module information re-extraction indicating unit, the module information extraction unit extracts new module information, and updates the module information stored in the module information storage unit, at which point the image data identifier judgement unit performs a judgement for the updated module information.

22. A digital broadcasting system, which achieves simulated interaction using a digital broadcast, including a digital broadcasting apparatus and a digital reception apparatus, wherein the digital broadcasting apparatus comprises:
image information storage means for storing a plurality of sets of image data, each of which has an image data identifier;
control information storage means for storing a plurality of sets of control information, each of which has a control information identifier, and each of which includes link destination information that shows a set of image data and a set of control information for a link destination for a corresponding set of image data; and
transmission means for repeatedly transmitting a plurality of sets of the image data and a plurality of sets of the control information,
and wherein digital reception apparatus comprises:
reception means for receiving the digital broadcast;
extraction means for extracting one set of image data and a corresponding set of control information from the received digital broadcast;
storage means for storing the extracted set of control information;
reproduction means for reproducing the extracted set of image data;
operation means for receiving a user selection operation of link destination information included in the set of control information; and
extraction control means for reading the link destination information in the set of control information stored in the storage means and setting first and second extraction conditions for respectively controlling the extraction means to extract a set of image data based on said first extraction condition and a corresponding set of control information based on said second extraction condition which are indicated by the link destination information selected by the user selection operation.

23. A digital broadcasting system, which achieves simulated interaction using a digital broadcast, including a digital broadcasting apparatus and a digital reception apparatus,
wherein the digital broadcasting apparatus comprises:
image information storage means for storing a plurality of sets of image data, each of which has an image data identifier;
control information storage means for storing a plurality of sets of control information, each of which has a control information identifier, and each of which includes link destination information that shows a set of image data and a set of control information for a link destination for a corresponding set of image data, the link destination information being a combination of an image data identifier for the set of image data of the link destination and a control information identifier for the set of control information for the link destination;
correspondence information storage means for storing correspondence information showing correspondence between the sets of image data and the sets of control information; and
multiplexing transmission means for reading a set of image data and a corresponding set of control information given in the correspondence information, and for repeatedly transmitting the read set of image data and the read set of control information as a multiplexed stream, having assigned image data identification information and written the image data identification information into the image data, and having assigned control information identification information and written the control information identification information into the control data,
wherein the digital broadcast reception means comprises:
reception means for receiving the digital broadcast;
extraction means for extracting one set of image data and a corresponding set of control information from the received digital broadcast;
storage means for storing the extracted set of control information;
reproduction means for reproducing the extracted set of image data;
operation means for receiving a user selection operation of link destination information included in the set of control information; and
extraction control means for controlling the extraction means to extract a set of image data and a corresponding set of control information which are indicated by the link destination information selected by the user selection operation.

24. A recording medium for use by a reception apparatus, the reception apparatus including:
reception means which receives a repeatedly transmitted digital broadcast of a plurality of sets of image data and sets of control information which correspond to the sets of image data, each set of control information including link destination information showing a set of image data which is a link destination for a link attached to a set of image data corresponding to the set of control information; extraction means for extracting one set of image data and a corresponding set of control information from the received digital broadcast; storage means for storing the extracted set of control information; reproduction means for reproducing the extracted set of image data; operation means for receiving a user operation; and program execution means for executing a program recorded on the recording medium,
the program including the following steps:
a selection operation judgement step for judging a user selection operation for link destination information included in a set of control information; and
an extraction control step for reading the link destination information in the set of control information stored in the storage means and setting first and second extraction conditions for controlling the extraction means to extract a set of image data based on said first extraction condition and a corresponding set of control information based on said second extraction condition indicated by the link destination information selected by the user.

25. A digital broadcast reception apparatus for receiving a repeatedly transmitted digital broadcast of a plurality of sets of image data and sets of control information which correspond to the sets of image data, each set of control information including link destination information showing a set of image data which is a link destination for a link attached to a set of image data corresponding to the set of control information,
the digital broadcast reception apparatus comprising:
reception means for receiving the digital broadcast;
extraction means for storing an extraction condition which identifies a set of image data and a corresponding set of control information in the received digital broadcast, for analyzing the received digital broadcast to determine a set of image data and a corresponding set of control information which possess said stored identifying extraction condition, and extracting one set of image data and a corresponding set of control information from the received digital broadcast determined to possess said stored identifying extraction condition;

storage means for storing the extracted set of control information;

reproduction means for reproducing the extracted set of image data;

operation means for receiving a user selection operation of link destination information included in the set of control information; and extraction control means for reading the link destination information in the set of control information stored in the storage means and setting said stored identifying extraction condition for controlling the extraction means to extract a set of image data and a corresponding set of control information which are indicated by the link destination information.

26. A digital broadcast reception apparatus for receiving a repeatedly transmitted digital broadcast of a plurality of sets of image data and sets of control information which correspond to the sets of image data, each set of control information including link destination information showing a set of image data which is a link destination for a link attached to a set of image data corresponding to the set of control information and a filter condition associated with the link destination information, the digital broadcast reception apparatus comprising:

reception means for receiving the digital broadcast;

extraction means for receiving a set of filter conditions for filtering a respective set of image data and a set of control information from the digital broadcast, and for extracting one set of image data and a corresponding set of control information from the received digital broadcast based upon a selected filter condition;

storage means for storing the received set of filter conditions and extracted set of control information;

reproduction means for reproducing the extracted set of image data;

operation means for receiving a user selection operation of link destination information included in the set of control information; and extraction control means for reading the filter condition in the set of control information associated with the user selected link destination information, for setting an extraction conditions based on the read filter condition, and for controlling the extraction means to extract a set of image data and a corresponding set of control information which are indicated by the link destination information stored with the read filter condition.

* * * * *